US008009218B2

(12) United States Patent
Hirota et al.

(10) Patent No.: US 8,009,218 B2
(45) Date of Patent: Aug. 30, 2011

(54) METHOD FOR DRIVING SEMICONDUCTOR DEVICE HAVING CAPACITIVE LOAD, METHOD AND APPARATUS FOR DRIVING LOAD, AND ELECTRONIC APPARATUS

(75) Inventors: Isao Hirota, Kanagawa (JP); Masahiro Segami, Kanagawa (JP); Kenji Nakayama, Fukuoka (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/461,953

(22) Filed: Aug. 28, 2009

(65) Prior Publication Data

US 2010/0039541 A1 Feb. 18, 2010

Related U.S. Application Data

(62) Division of application No. 11/524,452, filed on Sep. 21, 2006, now Pat. No. 7,750,964.

(30) Foreign Application Priority Data

Sep. 30, 2005 (JP) ................. 2005-286061
Feb. 15, 2006 (JP) ................. 2006-038448

(51) Int. Cl.
*H04N 3/14* (2006.01)
*H04N 5/335* (2011.01)
(52) U.S. Cl. .................. 348/312; 348/294; 348/317
(58) Field of Classification Search .............. 348/312
See application file for complete search history.

(56) References Cited

U.S. PATENT DOCUMENTS

| 5,199,053 | A * | 3/1993 | Hirama ........................ 377/60 |
| 6,400,404 | B2 * | 6/2002 | Hirota et al. ................ 348/314 |
| 6,760,067 | B1 * | 7/2004 | Sano et al. .................. 348/241 |
| 7,133,075 | B2 * | 11/2006 | Ishida et al. ................ 348/312 |
| 7,586,526 | B2 * | 9/2009 | Kurokawa et al. ........... 348/243 |

FOREIGN PATENT DOCUMENTS

| JP | 01-077380 A | 3/1989 |
| JP | 05-291310 A | 11/1993 |
| JP | 10-013742 A | 1/1998 |
| JP | 10-290003 A | 10/1998 |
| JP | 2000-138943 A | 5/2000 |
| JP | 2001-103380 A | 4/2001 |
| JP | 2004-282725 A | 10/2004 |
| JP | 2004-328314 A | 11/2004 |
| JP | 2005-269060 A | 9/2005 |
| WO | WO-03/090374 A1 | 10/2003 |

\* cited by examiner

*Primary Examiner* — Ngoc-Yen T Vu
(74) *Attorney, Agent, or Firm* — Rader, Fishman & Grauer PLLC

(57) ABSTRACT

When a signal is read from a CCD solid-state image pickup element, the CCD solid-state image pickup element is driven with at least two driving voltages so that high-speed reading is performed with generation of noise due to interference between the driving voltages reduced. The CCD solid-state image includes a charge storage section between a vertical transfer register and a horizontal transfer register. By performing the transfer of charge in the direction of columns during an effective transfer period of the transfer in the direction of rows, signal charge of one row generated by a light receiving sensor is transferred to the charge storage section, and by performing the transfer outside the effective transfer period in the transfer in the direction of the row, the signal charge of one row transferred to the charge storage section is transferred to the horizontal transfer register.

6 Claims, 39 Drawing Sheets

φV1 IDENTICAL TO φV3 AND
φV2 IDENTICAL TO φV4 IN STRUCTURE

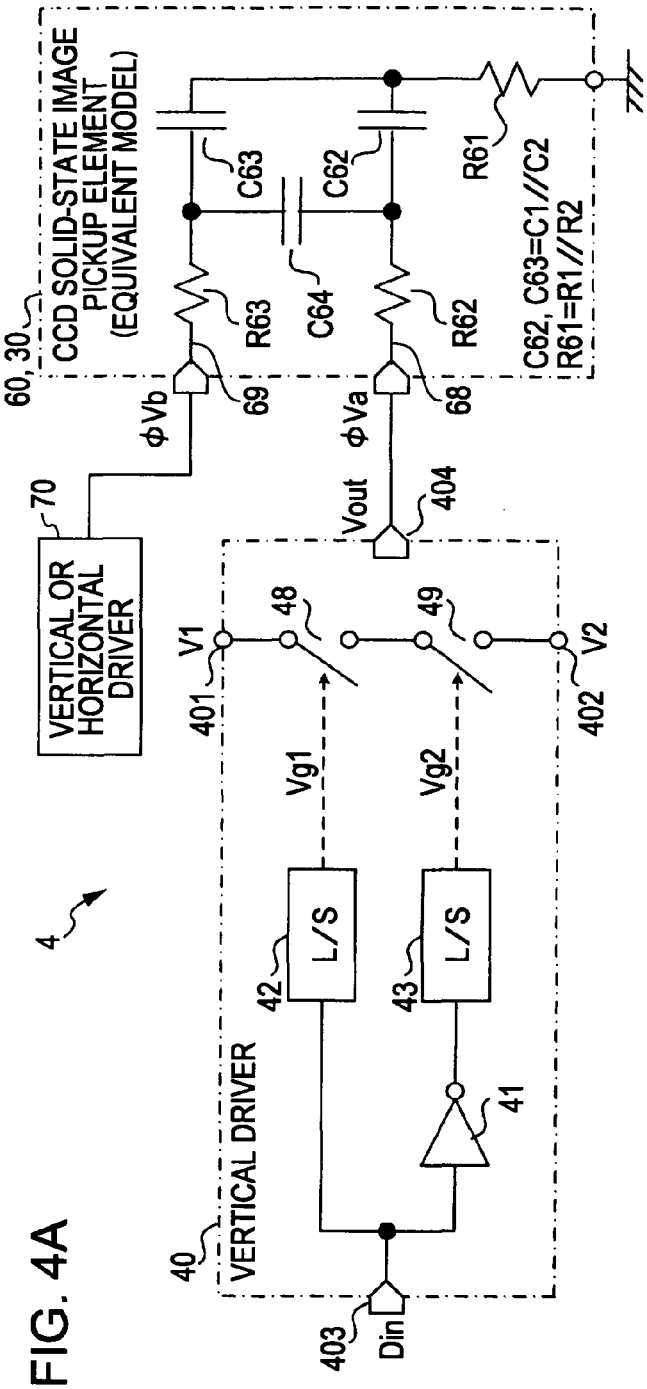

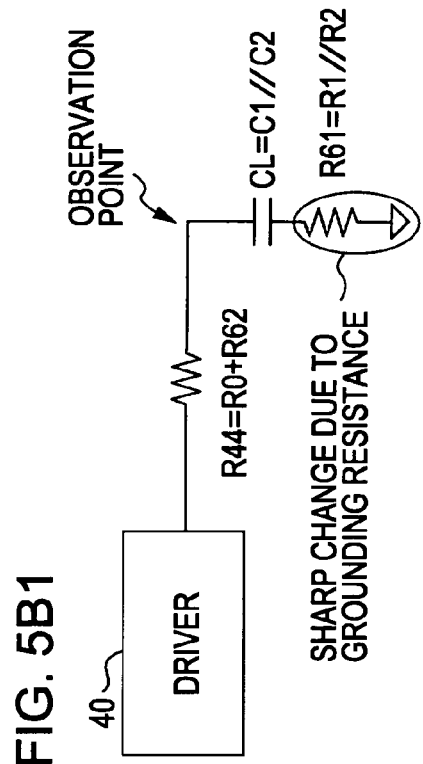
FIG. 5A1
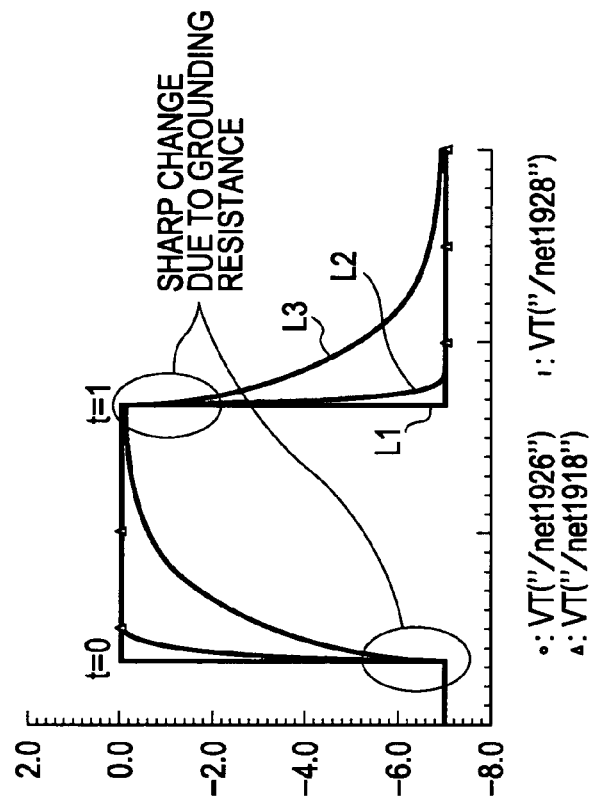
FIG. 5B1
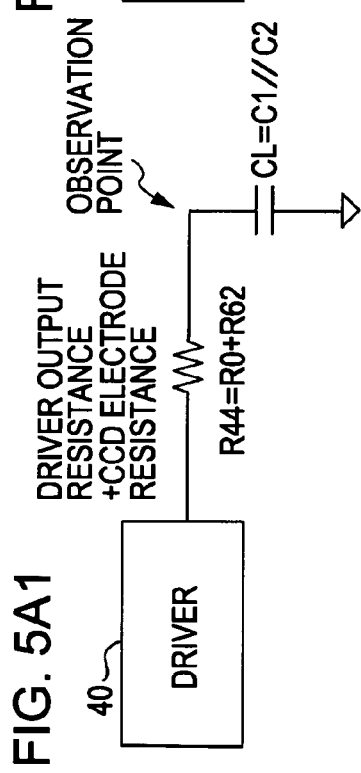
FIG. 5A2
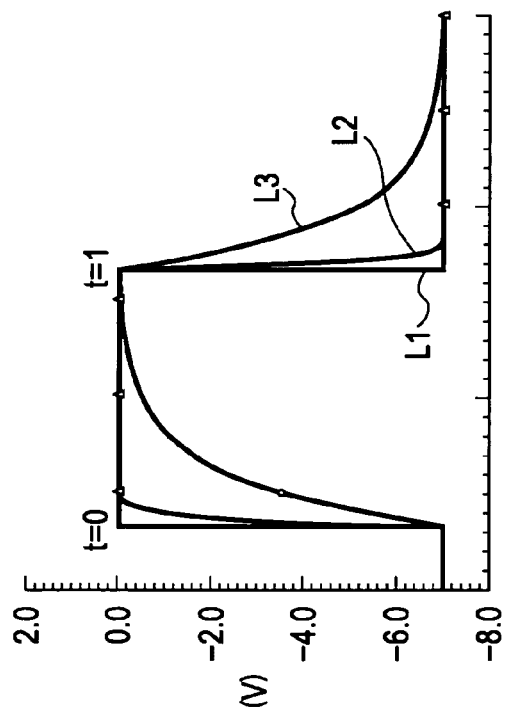
FIG. 5B2

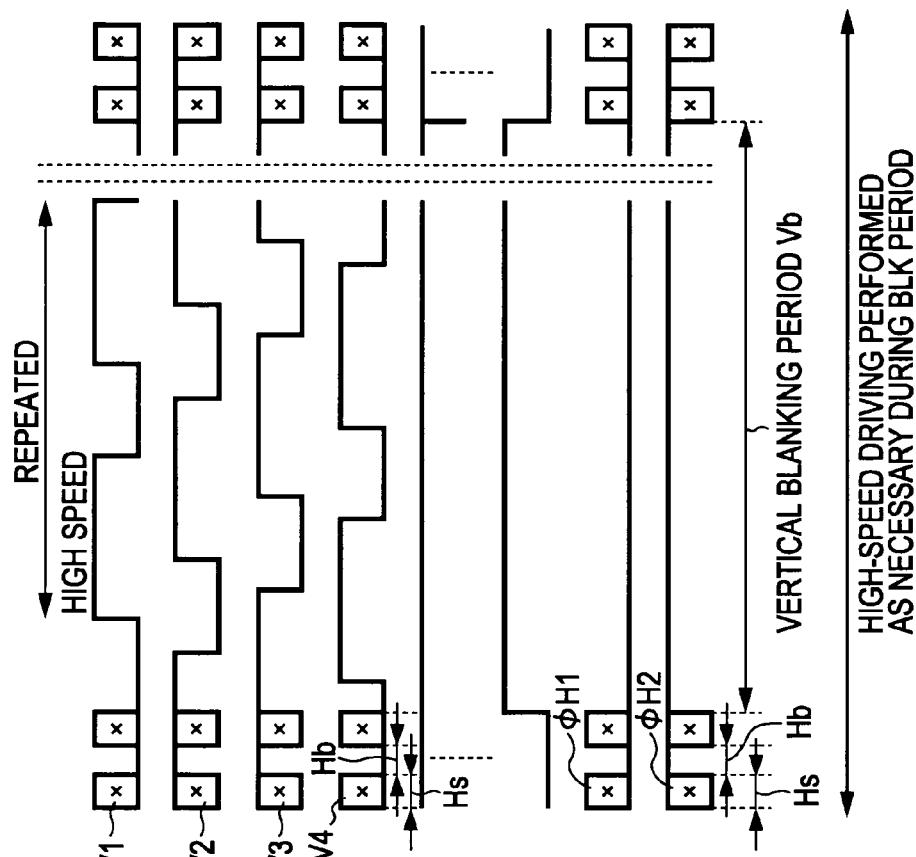
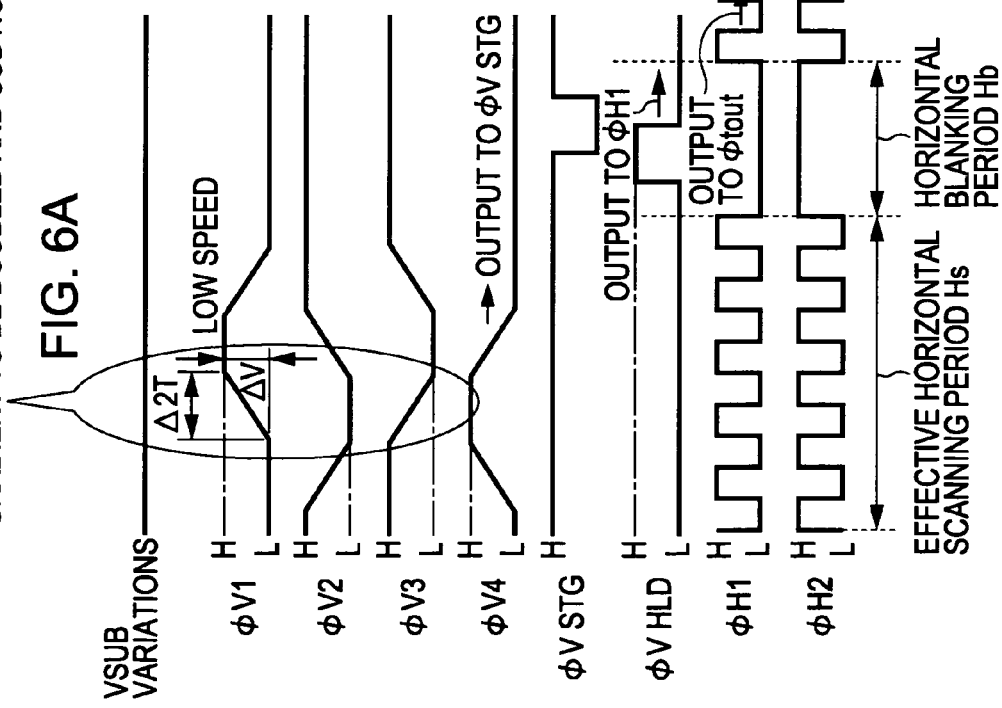
FIG. 6A
FIG. 6B

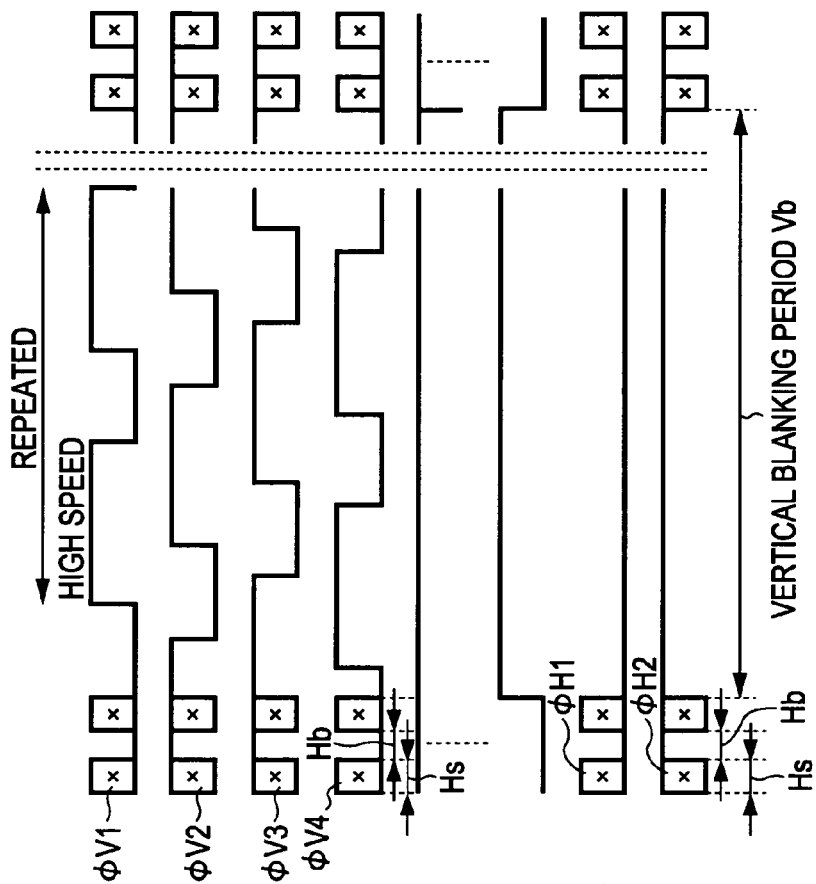
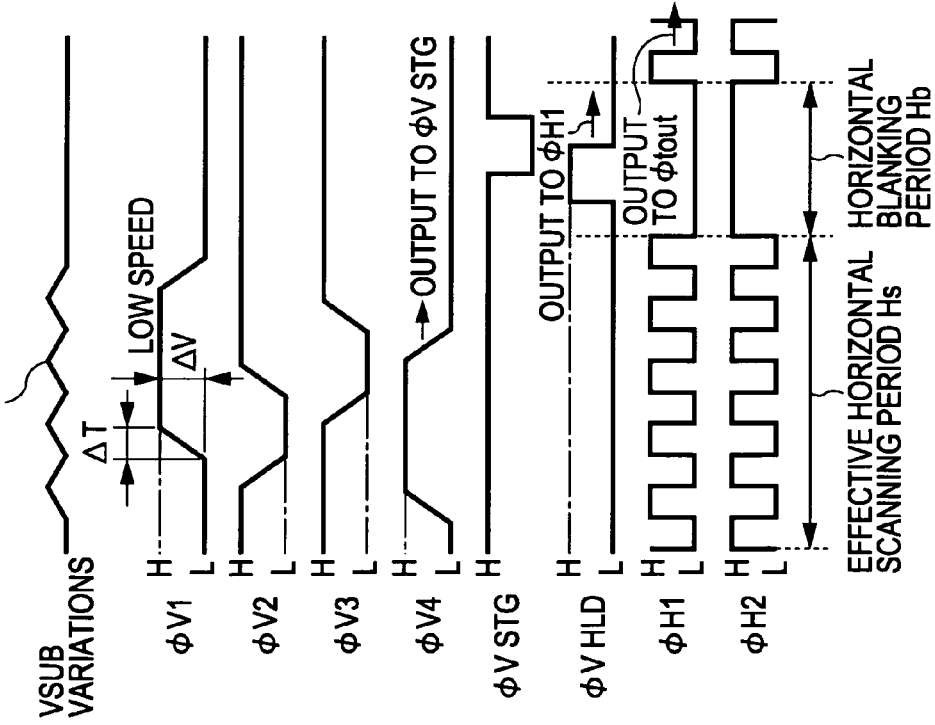
FIG. 7A
FIG. 7B

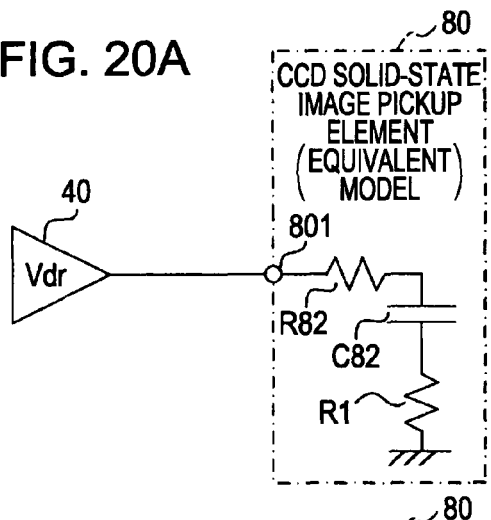
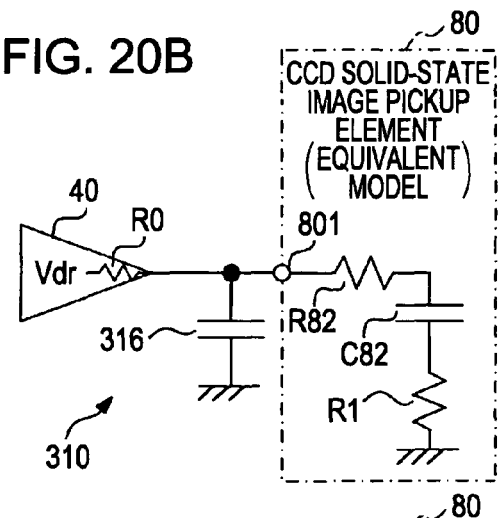
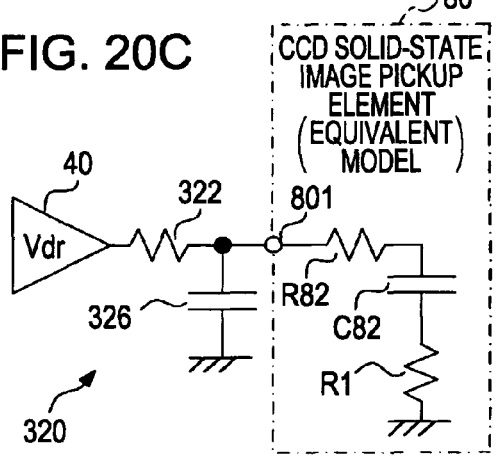
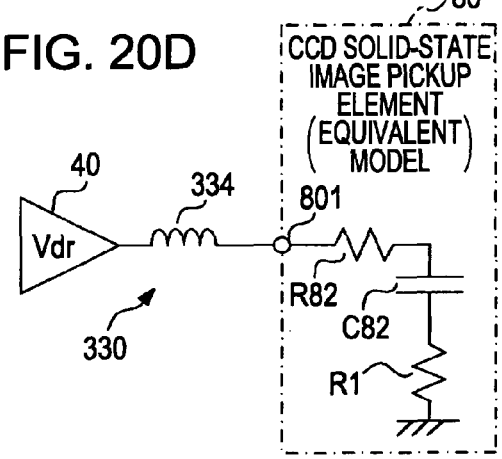
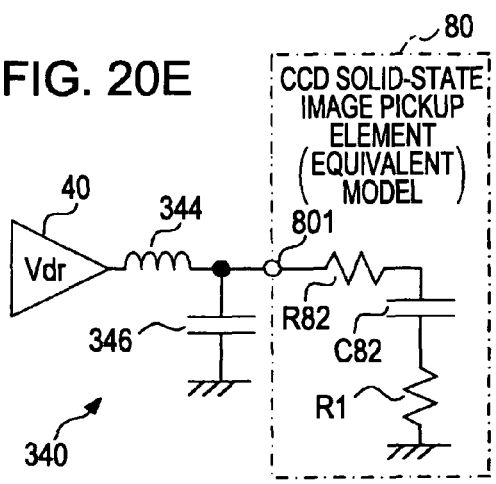

METHOD FOR DRIVING SEMICONDUCTOR DEVICE HAVING CAPACITIVE LOAD, METHOD AND APPARATUS FOR DRIVING LOAD, AND ELECTRONIC APPARATUS

CROSS REFERENCES TO RELATED APPLICATIONS

This is a Divisional Application of the patent application Ser. No. 11/524,452, filed Sep. 21, 2006, which claims priority from Japanese Patent Application JP2005-286061, filed in the Japanese Patent Office on Sep. 30, 2005, and Japanese Patent Application JP2006-038448, filed in the Japanese Patent Office on Feb. 15, 2006, the entire contents of which are incorporated herein by reference.

CROSS REFERENCES TO RELATED APPLICATIONS

The present invention contains subject matter related to Japanese Patent Application JP 2005-286061 filed in the Japanese Patent Office on Sep. 30, 2005, and Japanese Patent Application JP 2006-038448 filed in the Japanese Patent Office on Feb. 15, 2006, the entire contents of which are incorporated herein by reference.

BACKGROUND OF THE INVENTION

1. Field of the Invention

The present invention relates to a method and device for driving a semiconductor device having a capacitive load such as a driving electrode of a two-dimensional matrix of charge-coupled device (CCD) solid-state image pickup elements, an electronic apparatus implementing the driving method and apparatus. More specifically, the present invention relates to an image pickup device achieving a high-speed frame rate in the reading of a signal. Furthermore, the present invention relates to a driving method and driving device for driving a load of capacitive reactance or a load of inductive reactance and an electronic apparatus implementing the driving method and device. More specifically, the present invention relates to a mechanism for reducing a variety of types of variations and environmental variations so that a load output signal mildly changes when pulse driving is performed at a predetermined transient speed.

2. Description of the Related Art

There is a mounting need for high-speed image capturing and then slow playback on a video camera incorporating a CCD solid-state image pickup element regardless of television system. Users are concerned with a drop in continuous shooting speed in digital still cameras incorporating the CCD solid-state image pickup element as the number of pixels increases. A need for high-speed image pickup element is thus mounting.

Electronic circuits and electronic apparatuses employ a variety of mechanisms for driving a load having an impedance component with a pulse signal.

For example, image pickup devices having a two-dimensional matrix of CCD solid-state image pickup elements, each containing a transfer electrode serving as a capacitive reactance, are widely used. Motors having winding coils serving as an inductive reactance are also used.

An impedance component such as a capacitive reactance or an inductive reactance as a load is typically driven by a pulse signal. Phase and transient characteristic of the driving pulse are affected by a relationship between the load and the driving element, more specifically, variations in the load, variations in performance of the element, and environmental variations. As a result, the load cannot be appropriately driven. At low speed driving, the effect of phase and transient characteristic variations may be marginal, but at high speed driving, a small amount of variation leads to large performance variation.

For example, when a plurality of loads are driven by pulse signals slightly shifted one after another in phase, appropriate driving cannot be performed. When two loads are driven by reverse phased driving signals, a slight phase different between the driving signals leads to inappropriate driving.

Specific examples are described below. There is a mounting need for high-speed image capturing and then slow playback on a video camera incorporating a CCD solid-state image pickup element regardless of television system. Users are concerned with a drop in continuous shooting speed in digital still cameras incorporating the CCD solid-state image pickup element as the number of pixels increases. A need for high-speed image pickup element is thus mounting.

FIGS. 22A and 22B illustrate a mechanism of a known image pickup device. FIG. 22A illustrates a major portion of the known image pickup device employing a CCD solid-state image pickup element implementing interline transfer (IT) system. FIG. 22B illustrates a driving method of the CCD solid-state image pickup element.

The known image pickup device 3 includes a CCD solid-state image pickup element 30, and a driving circuit 4 for driving the CCD solid-state image pickup element 30.

The CCD solid-state image pickup element 30 includes a two-dimensional matrix (rows by columns) of a plurality of light receiving sensors 31 serving as pixels, and an image pickup section (light receiving section) 30a having vertical transfer registers 33 having a plurality of CCD structures corresponding to the light receiving sensors 31. Horizontal transfer registers 34, each having a CCD structure, connected to the final stage of each vertical transfer register 33 are arranged outside the image pickup section (light receiving section) 30a, and an output section 36 is connected to the horizontal transfer registers 34.

Four types of horizontally extending vertical transfer electrodes 32 (ended with suffix numbers _1, _2, _3, and _4) are arranged in a vertical direction with a predetermined order in a manner such that an opening is provided on the light receiving surface of the light receiving sensors 31. The vertical transfer electrodes 32 are arranged on the vertical transfer registers 33 (light receiving surfaces) extending in the (vertical) direction of columns so that the vertical transfer registers 33 at the same vertical position at each column are grouped.

The four types of vertical transfer electrodes 32 are mounted so that two vertical transfer electrodes 32 correspond to a single light receiving sensor 31. The vertical transfer electrodes 32 are driven to transfer charge in the vertical direction by four types of vertical transfer pulses $\Phi V\_1$, $\Phi V\_2$, $\Phi V\_3$, and $\Phi V\_4$ supplied from the driving circuit 4. Every two light receiving sensors 31 (except the final stage thereof on the side of the horizontal transfer registers 34) are paired in one set. The four vertical transfer electrodes 32 are thus supplied with the vertical transfer pulses $\Phi V\_1$, $\Phi V\_2$, $\Phi V\_3$, and $\Phi V\_4$ respectively by the driving circuit 4.

As shown, on the side of the horizontal transfer registers 34, vertical transfer electrodes 32 are arranged for a set of four vertical transfer registers 33. The uppermost vertical transfer register 33 among the set corresponds to the vertical transfer electrode 32_1 supplied with the vertical transfer pulse $\Phi V\_1$. The one stage preceding vertical transfer electrode 32_2 (closer to the horizontal transfer registers 34) is provided with the vertical transfer pulse $\Phi V\_2$. The one stage preceding vertical transfer electrode 32_3 (closer to the horizontal transfer registers 34) is provided with the vertical transfer pulse ΦV_3. The vertical transfer electrode 32_4 closest to the horizontal transfer registers 34 is provided with the vertical transfer pulse ΦV_4.

The vertical transfer registers 33 are connected to the horizontal transfer register 34 via the one set of vertical transfer electrodes 32 at the last stage, namely 32_1 through 32_4 (supplied with ΦV_1 through Φ_4).

As for the horizontal transfer registers 34, two horizontal transfer electrodes 35 (ended with suffixes _1 and _2) are arranged for a single vertical transfer register 33. The horizontal transfer electrodes 35 are supplied with two phase horizontal driving pulses ΦH_1 and ΦH_2 from the driving circuit 4 to horizontally transfer signal charge.

In the CCD solid-state image pickup element 30 thus constructed, the light receiving sensors 31 photoelectrically converts received light, and stores signal charge responsive to an amount of received light. The signal charge of the light receiving sensor 31 is read into the vertical transfer register 33 during a vertical blanking period. Signal charge of one horizontal line is vertically transferred every horizontal blanking period. As a result, a so-called vertical line shift is performed to transfer the signal charge to the horizontal transfer registers 34. The signal charge transferred to the horizontal transfer registers 34 is horizontally transferred during an effective horizontal transfer period, and then output to the outside via the output section 36.

The vertical line shift of the signal charge in the known CCD solid-state image pickup element 30 is designed to be performed in response to the vertical transfer pulses (ΦV_1 through ΦV_4) during the horizontal blanking period Hb of television as represented by driving timing of a vertical line shift of FIG. 25B. More specifically, as shown in FIG. 25B, in the vertical line shifting of signal charge, the signal charge staying on the vertical transfer electrodes 32_2 and 32_3 corresponding to ΦV_2 and ΦV_3 is shifted to the horizontal transfer registers 34 in response to the four vertical transfer pulses ΦV_1, ΦV_2, ΦV_3, and ΦV_4 during the horizontal blanking period Hb. More specifically, at the falling edge of the vertical driving pulse ΦV_4 of the vertical transfer electrode 32_4, the signal charge is transferred to the horizontal transfer electrode 35_1 supplied with the horizontal driving pulse ΦH_1 of the horizontal transfer registers 34.

In the vertical line shifting, a gradient $\Delta V / \Delta T$ of the rising edge and the falling edge of the vertical transfer pulses ΦV_1, ΦV_2, ΦV_3, and ΦV_4 respectively applied to the vertical transfer electrodes 32_1 through 32_4 ($\Delta V$ represent voltage and $\Delta T$ represents time) during the horizontal blanking period Hb, namely, a transient speed ($\Delta V / \Delta T$) equals the transient speed ($\Delta V / \Delta T$) of the vertical transfer pulses ΦV_1, ΦV_2, ΦV_3, and ΦV_4 respectively applied to the vertical transfer electrodes 32_1 through 32_4 during the vertical blanking period. FIG. 25B illustrates the driving pulse as a rectangular pulse having a vertically rising edge and a vertically falling edge.

High-speed vertical transfer is required during the vertical blanking period in the electronic image stabilization operation in the image pickup device such as a video camera using the CCD solid-state image pickup element, or in the CCD solid-state image pickup element of frame interline transfer (FIT) system applied for broadcasting business.

Japanese Unexamined Patent Application Publication No. 2000-138943 has proposed a technique in which a CCD solid-state image pickup element performs vertical line shifting with four types of vertical transfer pulses during the horizontal blanking period.

In the CCD solid-state image pickup element 30, the vertical line shift and the high-speed vertical transfer are driven by vertical drive scanning circuits of the same characteristic, namely, a vertical driver in the driving circuit 4. A complementary metal oxide semiconductor (CMOS) type vertical driver featuring high speed is typically used. If the vertical transfer is performed during the effective horizontal scanning period, noise due to crosstalk in the CCD solid-state image pickup element 30 (coupling noise) occurs at the moment the vertical transfer pulses (ΦV_1 through ΦV_4) are applied.

More specifically, cross-talk noise is induced on a CCD output signal, appearing as vertical streak noise because the transient speed at the rising edge and the falling edge of the driving waveform is high, namely, the gradient $\Delta V / \Delta T$ of the rising edge and the falling edge of the vertical transfer pulses (ΦV_1 through ΦV_4) is large when the vertical transfer is performed during the horizontal scanning period. In other words, image quality is degraded (with noise) in response to high transient speed in the driving waveform. Further discussion about this will be provided in connection with embodiments of the present invention. One reason for the image degradation is that transient variations of a driving voltage on one electrode interferes with a driving voltage on another electrode.

To prevent image degradation, the vertical driving (vertical transfer) is performed outside the effective horizontal scanning period in the known art. More specifically, if the application of the vertical transfer pulses (ΦV_1 through ΦV_4) is performed during the horizontal blanking period, no problem is caused in image when the vertical line shift is performed. In the known CCD solid-state image pickup element, the vertical transfer for vertical line shifting is performed during the horizontal blanking period.

When TV method was typical, the horizontal blanking period was defined by the TV method, and it was sufficient if the vertical line shifting was performed during the horizontal blanking period. However, if the multi-pixel design and high-frame rate design are incorporated regardless of the TV method, the horizontal blanking period for the vertical line shifting becomes useless, and presents difficulty in the promotion of high frame-rate design.

To incorporate high frame rate design, the horizontal blanking period needs to be shortened. To this end, the vertical line shifting needs to be performed at high speed. To perform the vertical line shifting at high speed, a transfer electrode needs to have a low resistance. As one way to achieve low resistance, widening an electrode area is contemplated. It is difficult to widen the transfer electrode in horizontal direction. The thickness of the transfer electrode needs to be increased. If the thickness of the transfer electrode is increased too much, the height of a step around a sensor aperture becomes too large. When light enters, obliquely entering light is blocked, leading to drop in sensitivity and generation of shading. It is thus difficult to increase vertical transfer speed.

Even if an output rate of signal is increased to achieve a high frame rate in an electronic apparatus such as a digital still camera employing a CCD solid-state image pickup element not compatible with TV method, the horizontal blanking period becomes long. It is thus difficult to increase the output rate above a predetermined value.

Japanese Unexamined Patent Application Publication No. 2005-269060 assigned to the same assignee of this invention discloses a mechanism that achieves a high frame rate by substantially shortening a horizontal blanking period.

In the disclosed mechanism, a driving clock waveform having a transient speed $\Delta V / \Delta T$ as a rising edge and a falling edge (ΔV represents voltage and ΔT represents time), i.e., a pulse signal being smooth and mild in gradient is supplied as a transfer pulse to a transfer electrode as a capacitive reactance. In high-density CCD, vertical transfer performed during an effective pixel period leads to a high frame rate with a slow clock rate. To this end, a smooth and mildly inclined gradient pulse signal is required.

SUMMARY OF THE INVENTION

It is thus desirable to provide a mechanism that permits high-speed reading of signal with noise generation due to interference between driving voltages controlled when a capacitive load such as a CCD solid-state image pickup element is driven by at least two driving voltages.

Driving the capacitive load with a constant current is contemplated as disclosed in Japanese Unexamined Patent Application Publication No. 2005-269060 in order to keep the gradient of the driving pulse as constant as possible when the capacitive load is driven with a smooth and mildly inclined gradient pulse signal (voltage pulse in this case). However, constant current driving, if merely used, is subject to variations in the manufacture of load capacitance and variations in the manufacture of a driving device, and environmental variations, and appropriate driving may not be performed. If phase relationship is shifted due to variations in the manufacture of load capacitance and variations in the manufacture of a driving device, appropriate driving may not be performed. This problem will also be further described later in the discussion of embodiments of the present invention.

The problem is also possible if an inductive reactance as opposed to the capacitive reactance is used. Driving the inductive load with a constant voltage is contemplated in order to keep the gradient of the driving pulse as constant as possible when the inductive load is driven with a smooth and mildly inclined gradient pulse signal (current pulse in this case). However, constant voltage driving, if merely used, is subject to variations in the manufacture of load capacitance and variations in the manufacture of a driving device, and environmental variations, and appropriate driving may not be performed. If phase relationship is shifted due to variations in the manufacture of load inductance and variations in the manufacture of a driving device, appropriate driving may not be performed.

It is thus desirable to provide a mechanism that reduces driving performance drop due to operational variations and environmental variations when the load is driven with a pulse having mild transient characteristic.

In one embodiment of the present invention, a semiconductor device includes charge generating sections arranged in a matrix for generating signal charge responsive to an input electromagnetic wave, a first charge transfer section for successively transferring in one direction the signal charge generated by the charge generating section, and a second charge transfer section for successively transferring the signal charge, transferred by the first charge transfer section, in another direction different from the one direction, and a charge storage section arranged between the first charge transfer section and the second charge transfer section.

Here, the "one direction" and the "other direction" are relative to each other. Generally, the one direction corresponds to a direction of columns or a vertical direction for low speed scanning and the other direction corresponds to a direction of rows or a horizontal direction for high speed scanning. For example, if the screen is rotated by 90 degrees, up and down and left and right relationship changes, and row and column or vertical to horizontal relationship also changes.

The relationship is not absolute. For example, if the first charge transfer section is in the direction of columns, the second charge transfer section is in the direction of rows, and if the second charge transfer section is in the direction of columns, the first charge transfer section is in the direction of rows. Hereinafter, the one direction is represented by the direction of columns or the vertical direction, and the other direction is represented by the direction of rows or the horizontal direction.

A signal charge of a predetermined unit (typically of one row) of the row direction generated by the charge generating sections is transferred to the charge storage section by driving the transfer in the column direction within an effective transfer period of the row direction, and the signal charge of the row direction transferred to the charge storage section of a predetermined unit (typically of one row) is transferred to the second charge transfer section by driving the signal charge outside the effective transfer period of the row direction.

In one embodiment of the present invention, the driving in the row direction within the effective transfer period is performed with the driving signals that are alternately reverse-phased every set of driving signals, namely, at least every two driving signals. With the two driving signals reversed, noise components arising from the driving signals are also reverse-phased, thereby canceling each other.

In one embodiment of the present invention, the driving in the row direction within the effective transfer period allows a noise correction signal reverse-phased from noise on the semiconductor substrate to be supplied to a predetermined location of the semiconductor substrate. The reverse-phased correction signal is thus positively supplied to reduce substrate noise arising from the driving signal.

In one embodiment of the present invention, the driving signal is supplied to the semiconductor device via a noise control circuit. The noise control circuit for controlling the noise on a driving signal line is arranged in the driving signal line between a driver circuit and the semiconductor device.

In one embodiment of the present invention, a capacitive functional element is provided to make a grounding resistance of the semiconductor substrate capacitive. As will be described in detail later, a noise source of the substrate noise is found to be the resistance of the substrate. A driving current responsive to a driving signal flows through the substrate resistance. By allowing the driving current to flow through the capacitive functional element, the substrate noise may be reduced.

In one embodiment of the present invention, a waveform shaping processor performs a predetermined waveform shaping process on an input pulse signal to drive a load with the input pulse. A drive pulse waveform shaping controller monitors a pulse output signal caused in the load and controls an adjustment value of the waveform shaping processor so that transient characteristics of the pulse output signal, such as a delay amount and variation characteristic, become predetermined characteristics.

The pulse output signal actively caused in the load is feedback controlled so that the pulse output signal has predetermined transient characteristics.

In accordance with embodiments of the present invention, during the charge transfer in the column direction, the reverse-phased driving signals are used. The noise correction signal opposite in phase to the substrate noise is supplied to the substrate. The driving signal is supplied via the noise control circuit. The substrate grounding resistance is made capacitive. Cross-talk noise generated during the charge transfer in the column direction is thus reduced.

A combination of the above-described embodiments reduces even more the cross-talk noise during the charge transfer.

With the active pulse output signal monitored, the feedback control is performed so that the pulse output signal has predetermined transient characteristic. Constant transient characteristics are thus obtained even if the semiconductor suffers from load characteristic variations from load to load, driving characteristic variations from element to element, and environmental variations.

The load is driven by the pulse signal having the mild transient characteristics with continuously appropriate phase delay and gradient characteristic in a manner from variations in the manufacture of load capacitance and variations in the manufacture of a driving device and environmental variations.

BRIEF DESCRIPTION OF THE DRAWINGS

FIGS. 4A-4C illustrate the relationship between an equivalent circuit of a vertical driver and the CCD solid-state image pickup element;

FIGS. 5A1-5B2 illustrate a step response of a vertical transfer pulse ΦV;

FIGS. 6A and 6B are timing diagrams illustrating a driving timing of the CCD solid-state image pickup element of FIG. 1 in accordance with a first embodiment of the present invention;

FIGS. 7A and 7B are timing diagrams illustrating a driving timing of the CCD solid-state image pickup element, not driven in a complementary driving method, in accordance with the first embodiment of the present invention;

FIGS. 20A-20E illustrate a noise control method in accordance with a third embodiment of the present invention;

DESCRIPTION OF THE PREFERRED EMBODIMENTS

Figure 1:
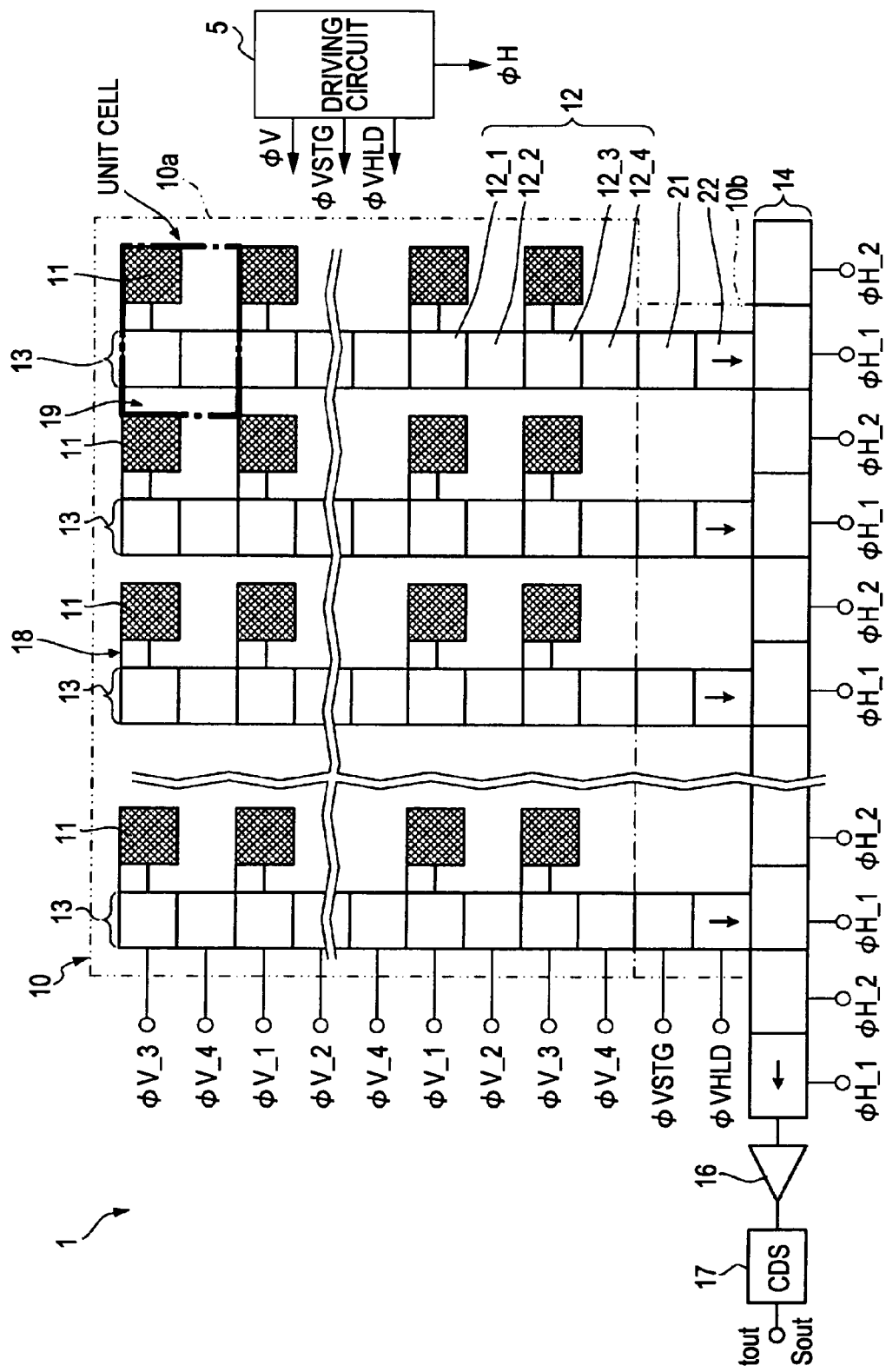
FIG. 1 is a block diagram of an image pickup device as one example of an electronic apparatus in accordance with one embodiment of the present invention.

The embodiments of the present invention are described below with reference to the drawings.

Referring to the drawings, there are shown image pickup devices 1 and 3, drive controller (driving circuit) 5, vertical transfer driver 7, horizontal transfer driver 8, CCD solid-state image pickup elements 10 and 30, image pickup section 10a, photo-receiving sensor 11, vertical transfer electrode 12, vertical transfer register 13, horizontal transfer register 14, output amplifier 16, correlated double sampling circuit 17, noise correction signal supply circuit 200, storage gate electrode 21, phase inverting circuit 210, hold gate electrode 22, waveform shaping circuit 220, capacitor 222, resistor 224, read-out gate 23, embedded channel section 24, gate insulating layer 25, image pickup section 30a, photo-receiving sensor 31, vertical drivers 40 and 50, sensor aperture 118, light shielding layer 119, transistor 120, electrode 121, VSUB terminal 130, and PWELL ground terminals 131 and 132. Also shown are noise control circuit 310, capacitor 316, vertical transfer electrode 32, resistor 322, vertical transfer transistor 33, inductance 334, horizontal transfer register 34, inductance 344, horizontal transfer electrode 35, output section 36, driver circuit 4, capacitor 412, vertical driver 50, inverter 51, level shift circuits 52 and 53, voltage output section 54, impedance controller 55, delay lines 56 and 57, switches 58 and 59, CCD solid-state image pickup elements 60 and 80, coupling capacitors C1, C2, and C3, resistor Ro, light shielding resistor R1, equivalent resistance of the light shielding layer R10, protective resistor R12, substrate resistor R2, and grounding resistors R61 and R81. Also shown are storage gate section STG, output impedance Zo, impedance element Z58, read-out gate section ROG, pulse driver 600, load 609, phase delay adjuster 610, pulse delay circuit 612, delay clock count register 614, through rate adjuster 630, current output section 632, voltage output section 633, and digital-to-analog (D/A) converter 634. Also shown are switch 636, DAC data register 638, load driver 650, current mirror circuit 652, constant voltage output circuit 653, junction point (current addition point) 656, voltage adder 657, load current detector 658, waveform shaping processor 660, drive pulse waveform shaping controller 670, phase delay controller 672, and through rate controller 674. Also shown are comparators 682 and 684, voltage comparators 682A and 684A, counters 682B and 684B, determiner 686, vertical driver 700, switch 708, phase delay adjuster 710, through rate adjuster 730, current distributor 740, load driver 750, waveform shaping processor 760, drive pulse waveform shaping controller 770, phase delay controller 772, through rate controller 774, operation controller 790, timing signal generator 810, analog front-end section 820, video signal processor 830, video calculation and processing unit 832, video recorder 834, video display 836, switches 852, 854 and 856, and selection signal generator 860.

General Construction of Image Pickup Device

FIG. 1 illustrates an image pickup device 1 as one example of electronic apparatus in accordance with one embodiment of the present invention. The image pickup device 1 employs a CCD solid-state image pickup element 10 of interline transfer (IT) system.

The IT CCD solid-state image pickup element 10 includes a two dimensional matrix of a large number of photo cells (light receiving sections), a plurality of vertical transfer CCDs (V registers) between vertical columns of photo cells, and horizontal transfer CCDs next to the final row of vertical transfer CCDs. The image pickup device 1 is described in detail below.

As shown in FIG. 1, the image pickup device 1 of the present embodiment includes the IT CCD solid-state image pickup element 10 and a driving circuit 5 as a driving device for driving the IT CCD solid-state image pickup element 10.

The CCD solid-state image pickup element 10 includes an image pickup section 10a. The image pickup section 10a includes a two dimensional matrix of photo sensors (charge generating section) 11 serving as pixels, and vertical transfer registers (an example of vertical transfer sections) 13 having a CCD structure and vertically extending corresponding to the photo sensors 11. The photo sensors 11 converts light incident thereon into a signal charge responsive to an amount of incident light and stores the charge.

The image pickup section 10a further includes read-out gates (ROG) 18, each between the vertical transfer register 13 and the photo sensor 11, and a channel stop ST 19 on the border of each pixel (unit cell).

Figure 22A:
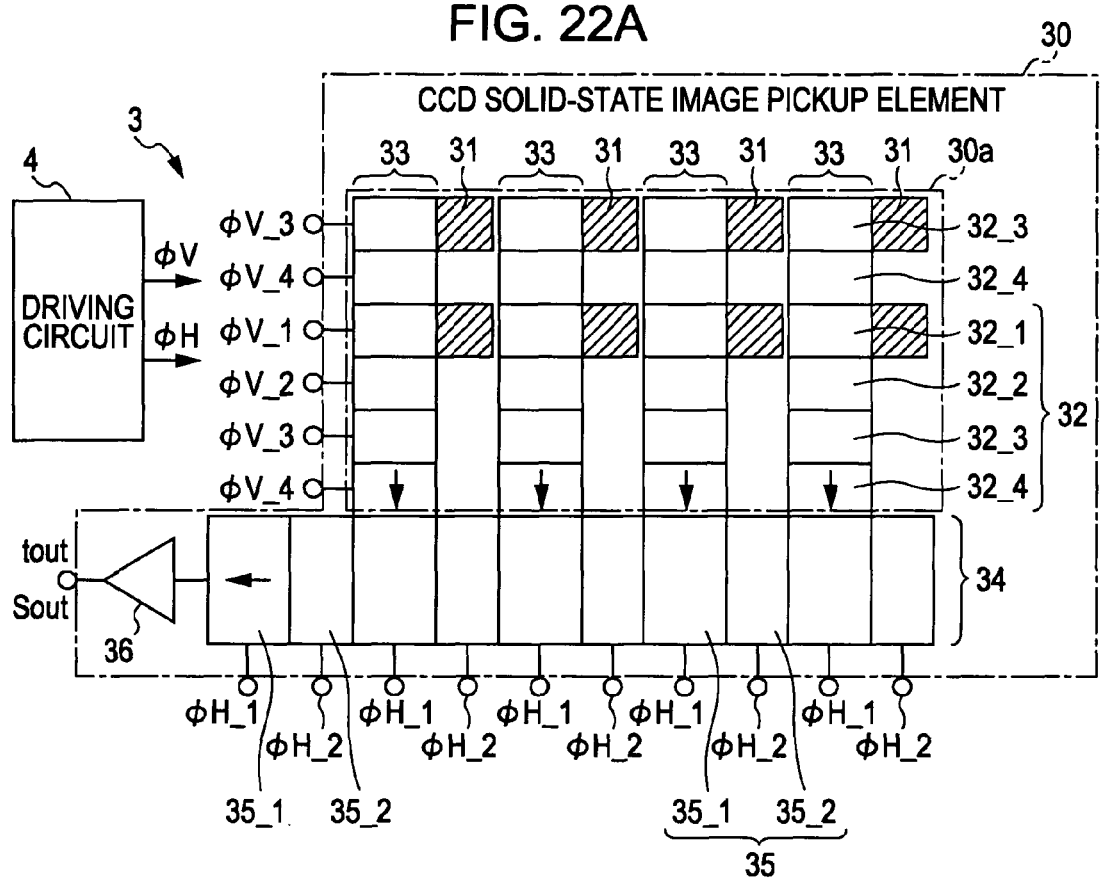
FIGS. 22A and 22B illustrate a mechanism of a known image pickup device.
Figure 22B:
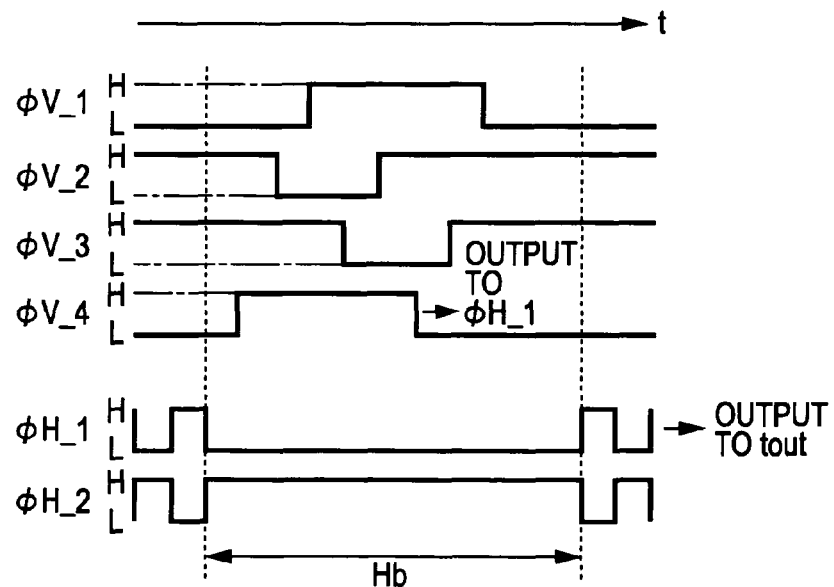

The CCD solid-state image pickup element 10 of the present embodiment includes, as a feature thereof, a charge storage section 10b, arranged outside the image pickup section 10a, for temporarily storing a signal charge vertically transferred from the image pickup section 10a. A horizontal transfer register 14 having the CCD structure (one example of the second charge transfer section) is arranged to be connected to the charge storage section 10b. A substantial difference between the CCD solid-state image pickup element 10 and the CCD solid-state image pickup element 30 of FIG. 22 is that the CCD solid-state image pickup element 10 includes the charge storage section 10b between the image pickup section 10a and the horizontal transfer register 14.

Like the image pickup section 10a, the charge storage section 10b includes a vertical transfer register 13 having a CCD structure. The vertical transfer register 13 is arranged in a dual structure. A portion of the image pickup section 10a containing part of the vertical transfer register 13 is referred to as a storage gate section STG and a portion of the horizontal transfer register 14 containing part of the vertical transfer register 13 is referred to as a hold gate section HLG.

One line of the horizontal transfer registers 14 having the CCD structure extending from left to right in FIG. 1 is connected to the final row of each of the vertical transfer register 13 of the charge storage section 10b (i.e., hold gate section HLG). The output end of the horizontal transfer register 14 connects to an output amplifier 16 as a charge detector (or output unit) for converting the signal charge into an electrical signal (typically a voltage signal), and the output end of the output amplifier 16 connects to a correlated double sample (CDS) circuit 17.

The CCD solid-state image pickup element 10 herein includes the CDS circuit 17. Alternatively, the CDS circuit 17 may be arranged external to the CCD solid-state image pickup element 10.

The output amplifier 16 accumulates, onto a floating diffusion, the signal charge successively entered from the horizontal transfer registers 14, converts the accumulated signal charge into a signal voltage, and then outputs the converted signal voltage to the CDS circuit 17 as a CCD output signal via an output circuit composed of a source-follower transistor circuit (not shown). The correlated double sampling circuit 17 restricts a noise component such as reset noise contained in the CCD output signal and outputs the resulting CCD output signal as an image signal Sout from an output terminal tout.

Four types of vertical transfer electrodes 12 (ending with suffixes _1, _2, _3, and _4) are arranged on the vertical transfer registers 13 (on the light receiving side) at the same vertical positions of the vertical transfer registers 13 at a predetermined order in the vertical direction so that the aperture of the light receiving surface of the photo sensor 11 (as shown in FIGS. 2 and 3A-3C) is formed. The vertical transfer electrodes 12 extend horizontally across the image pickup device 1 to form the aperture on the light receiving side of the photo sensor 11.

The four types of vertical transfer electrodes 12 are arranged so that two vertical transfer electrodes 12 correspond to a single photo sensor 11. Four vertical transfer pulses $\Phi V\_1$, $\Phi V\_2$, $\Phi V\_3$ and $\Phi V\_4$ supplied from the driving circuit 5 transfer the signal charge in the vertical direction. More specifically, every two photo sensors 11 are paired as a set (including the last stage of the charge storage section 10b), and four vertical transfer electrodes 12 are supplied with the vertical transfer pulses $\Phi V\_1$, $\Phi V\_2$, $\Phi V\_3$ and $\Phi V\_4$, respectively.

As shown in FIG. 1, the vertical transfer electrodes 12 are arranged for each set of four vertical transfer registers 13 in the vertical direction. The vertically topmost photo sensor 11 corresponds to a vertical transfer electrode 12_1 supplied with the vertical transfer pulse $\Phi V\_1$. The one stage preceding vertical transfer electrode 12_2 (closer to the charge storage section 10b) is supplied with the vertical transfer pulse ΦV_2. The further one stage preceding vertical transfer electrode 12_3 (closer to the charge storage section 10b) is supplied with the vertical transfer pulse ΦV_3. The vertical transfer electrode 12_4 closest to the charge storage section 10b is supplied with the vertical transfer pulse ΦV_4.

The vertical transfer register 13 is connected to the subsequent vertical transfer register 13 of the charge storage section 10b via the final set of vertical transfer electrodes 12 (transfer electrodes supplied with the vertical transfer pulses ΦV_1 through ΦV_4), namely, 12_1 through 12_4. Two types of the transfer electrodes, including the storage gate electrode 21 and the hold gate electrode 22, are arranged on the charge storage section 10b (on the same light receiving surface of the image pickup section 10a) common to the vertical transfer registers 13 at the same vertical position. The storage gate electrodes 21 and the hold gate electrodes 22 are arranged horizontally across the image pickup device 1.

The storage gate electrode 21 and the hold gate electrode 22 are arranged on the output end of the vertical transfer electrode 12_4 (supplied with the vertical transfer pulse ΦV_4) formed on the vertical transfer register 13 as the output end of the image pickup section 10a. The driving circuit 5 supplies the storage gate electrode 21 with a storage gate pulse ΦVSTC and the hold gate electrode 22 with a hold gate pulse ΦVHLG.

Each horizontal transfer register 14 is arranged for two horizontal transfer electrodes 15 (ending with suffixes _1 and _2) for each vertical transfer register 13. The horizontal transfer registers 14 transfer horizontally the signal charge with two phase horizontal driving pulses ΦH_1 and ΦH_2.

The operation of the image pickup device 1 is summarized as below. When read-out pulse XSG (ΦROG) issued from the driving circuit 5 is applied to a gate electrode of read-out gate ORG 18 making the potential of the gate electrode deep, the signal charge accumulated in each of the photo sensors 11 of the CCD solid-state image pickup element 10 is read to the vertical transfer register 13 via the read-out gate ROG. The reading of the signal charge from the photo sensor 11 to the vertical transfer register 13 is particularly referred to as field shift.

The vertical transfer registers 13 of the image pickup section 10a are transfer driven by the four vertical transfer pulses ΦV_1 through ΦV_4 corresponding to the four vertical transfer electrodes 12. A storage gate section STG of the charge storage section 10b is driven by a storage gate pulse ΦVSTG and a hold gate section HLG is driven by a hold gate pulse ΦVHLG. In this way, the signal charge read from the photo sensor 11 is vertically transferred with one scanning line at a time, and then transferred to the horizontal transfer registers 14.

Unlike the image pickup section 10a, the charge storage section 10b composed of the storage gate section STG and the hold gate section HLG can be designed regardless of vertical pixel pitch. The electrode width of each of the storage gate electrode 21 and the hold gate electrode 22 can be increased in order to introduce low resistance design in the storage gate electrode 21 and the hold gate electrode 22. This is particularly advantageous in the high speed vertical charge transfer from the charge storage section 10b to the horizontal transfer registers 14.

As will be described in detail later, the vertical charge transfer (i.e., vertical line shift) is different from a vertical line shift typically performed during part of the normal horizontal blanking period. The vertical line shift in the image pickup section 10a is performed during a portion of the effectively horizontal period, and the vertical line shift in the charge storage section 10b is performed during a portion of the horizontal blanking period.

In response to the two-phase horizontal transfer pulses ΦH_1 and ΦH_2 issued from the driving circuit 5, the horizontal transfer registers 14 horizontally transfer, to the output amplifier 16, the signal charge of one line vertically transferred from the plurality of vertical transfer registers 13.

The output amplifier 16 converts the signal charge successively input from the horizontal transfer register 14 into a signal voltage, and supplies the signal voltage as a CCD output signal to the correlated double sampling circuit 17. The correlated double sampling circuit 17 restricts a noise component contained in the CCD output signal and then outputs the resulting CCD output signal as an image signal Sout to the outside from an output terminal tout.

Layout Structure of Vertical Transfer Electrode

Figure 2:
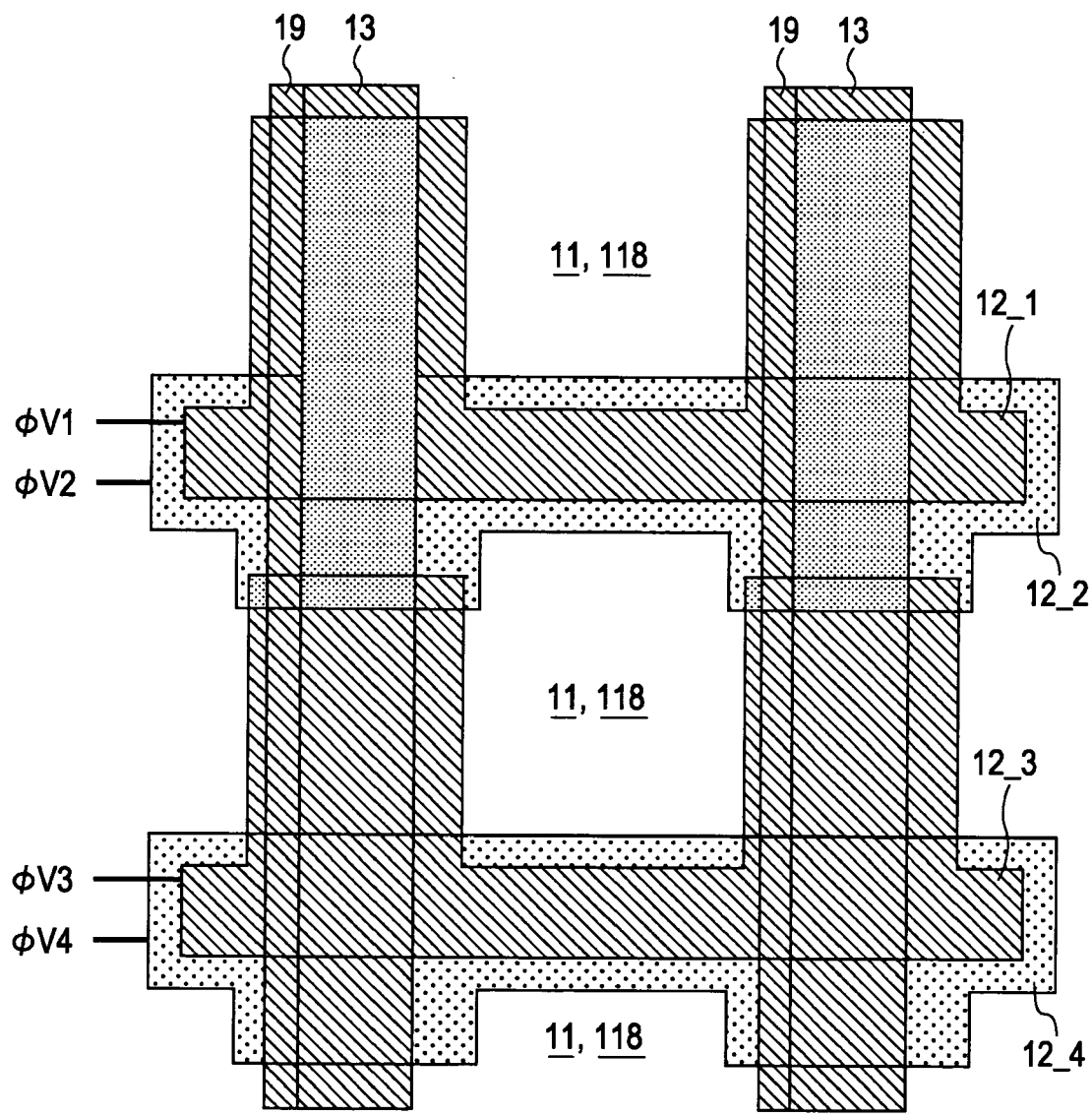
FIG. 2 illustrates a layout example of four types of vertical transfer electrodes of a CCD solid-state image pickup element of FIG. 1.

FIG. 2 illustrates an example of layout structure of four types vertical transfer electrodes 12 of the CCD solid-state image pickup element 10 of FIG. 1.

As shown in FIG. 2, a plurality of vertical transfer registers (V-CCD) 13 are arranged between the vertical lines of a two-dimensional matrix of photo sensors 11, and the read-out gate section ROG 18 is interposed between the photo sensor 11 and the vertical transfer register 13. A channel stop section CS 19 is arranged on the border of each pixel (unit cell).

The four types of vertical transfer electrodes 12 fabricated of polysilicon thin film extending horizontally are arranged on the light receiving surface of the vertical transfer registers 13 (on the front side of the sheet of the drawing) to be common with the vertical transfer registers 13 at the same vertical position in each column. A sensor aperture 11B is left on the light receiving surface of the photo sensor 11.

The layout structure herein permits two-layer and four-phase driving. Arranged on first layer vertical transfer electrodes 12_2 and 12_4 respectively supplied with the vertical transfer pulses ΦV_2 and ΦV_4 are second layer vertical transfer electrodes 12_1 and 12_3 respectively supplied with the vertical transfer pulses ΦV_1 and ΦV_3.

In each layer, the patterns of the vertical transfer electrodes 12 are substantially identical to each other. As shown, the first layer vertical transfer electrode (second electrode) 12_2 and the first layer vertical transfer electrode (fourth electrode) 12_4 are identical in pattern to each other, and the second layer vertical transfer electrode (first electrode) 12_1 and the second layer vertical transfer electrode (third electrode) 12_3 are identical in pattern to each other. The vertical transfer electrode 12_1 and the vertical transfer electrode 12_2 overlap each other in a two-layer structure and the vertical transfer electrode 12_3 and the vertical transfer electrode 12_4 overlap each other in a two-layer structure. The first layer and the second layer are different in pattern.

The four types of vertical transfer electrodes 12 cover the major portion of the image pickup section 10a of the CCD solid-state image pickup element 10, and are arranged in the two-layer structure, presenting a large overlapping capacitance between electrodes.

Structure and Equivalent Circuit

Figure 3B:
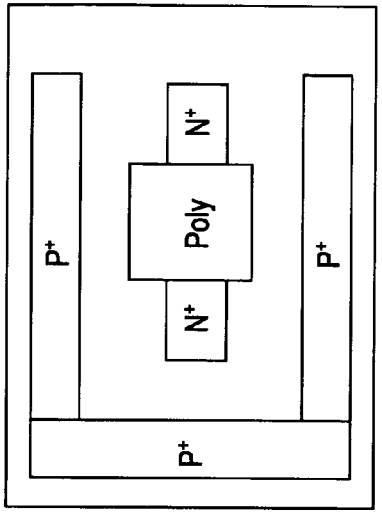
FIGS. 3A-3C illustrate a layout model of a vertical transfer electrode of a CCD solid-state image pickup element of FIG. 1, a semiconductor substrate SUB and an output amplifier.
Figure 3A:
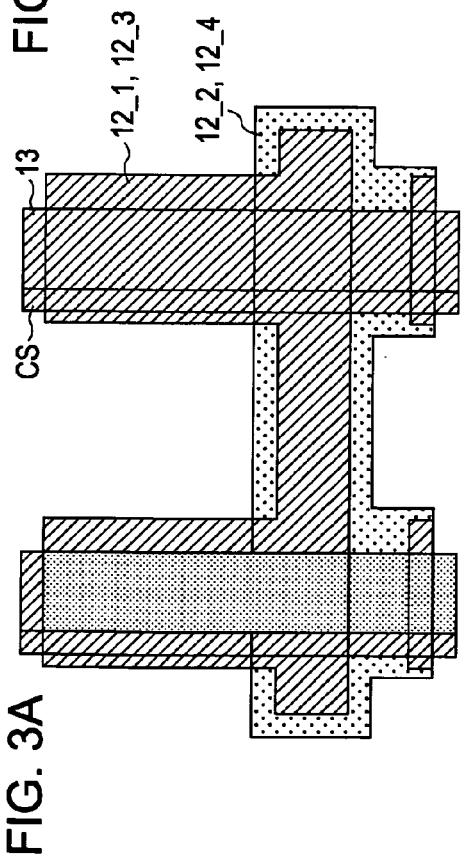
Figure 3C:
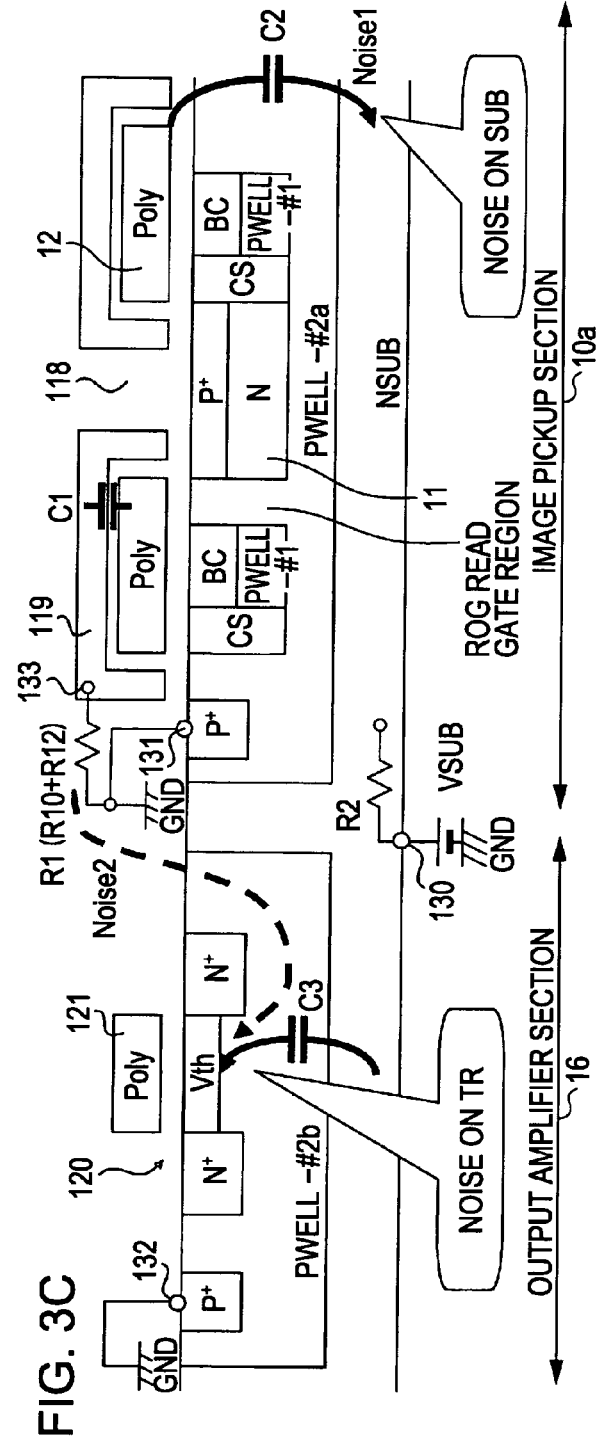

FIGS. 3A-3C illustrate a layout model of the vertical transfer electrodes 12 of the CCD solid-state image pickup element 10 of FIG. 1, a semiconductor substrate SUB (first semiconductor substrate), and the output amplifier 16. FIG. 3A is a plan view of one photo sensor 11, FIG. 3B is plan view of a MOS transistor portion formed in the output amplifier 16, and FIG. 3C is a sectional view of the MOS transistor portion in FIG. 3B.

In the image pickup section 10a, PWELL-#2a (an example of second semiconductor substrate) is formed on the surface of the silicon semiconductor substrate NSUB. Arranged on the PWELL-2a are the photo sensor 11, fabricated of a PN junction photo diode, the read-out gate section ROG, PWELL-#1, the vertical transfer register 13 formed on the PWELL-#1 (represented by V register BC), and the channel stop section CS in that order on the left-hand side in the right to left direction. The substrate structure is identical to the IT-CCD structure.

Arranged on these elements are dielectric layer (not shown), on which the vertical transfer electrodes 12 (12_1 or 12_3) for the vertical transfer registers 13 are arranged to form the sensor aperture 118. A light shielding layer 119 is formed on a dielectric layer (not shown) on the vertical transfer electrodes 12 in a manner such that the sensor aperture 118 is formed above the photo sensor 11. The vertical transfer electrode 12 is supplied with one of the four types of vertical transfer pulses ($\Phi V\_1$ or $\Phi V\_3$).

The vertical transfer electrodes 12 and the light shielding layer 119 generally covering the CCD solid-state image pickup element 10 are defined by the sensor aperture 118 on the photo sensor 11. Through the sensor aperture 118, light is incident on the photo sensor 11.

In the output amplifier 16, PWELL-#2b (one example of the second semiconductor substrate) is formed on the silicon semiconductor substrate NSUB as in the image pickup section 10a. A transistor 120 is formed on the PWELL-#2b. Arranged further on the transistor 120 is an electrode 121 with a dielectric layer (not shown) interposed therebetween.

A VSUB terminal 130 of the semiconductor substrate NSUB, a terminal 131 of the PWELL-#2a, and a terminal 132 of the PWELL-#2b shown in the sectional view of FIG. 3C are supplied with a standard DC bias Vbias. As shown, the VSUB terminal 130 is supplied with the DC bias Vbias, and the terminals 131 and 132 of the PWELL-#2a and the PWELL-#2b are grounded. The terminals 131 and 132 may also be referred to PWELL ground terminals 131 and 132.

As shown in FIG. 3C, a coupling capacitor C1 is formed between the vertical transfer electrode 12 and the light shielding layer 119 and a coupling capacitor C2 is formed between the vertical transfer electrode 12 and the semiconductor substrate NSUB in the image pickup section 10a. On the side of the output amplifier 16, a coupling capacitor C3 is formed between the gate of the transistor 120 and the semiconductor substrate NSUB because of the back gate effect.

An equivalent capacitor CL between each vertical transfer electrode 12 and the CCD substrate is considered to be approximately equal to the parallel component of the coupling capacitors C1 and C2. Capacitors related to the vertical transfer electrodes 12 are an electrode capacitor with the other vertical transfer electrodes 12 (see C64 of FIGS. 4A and 8A) besides the coupling capacitors C1 and C2.

Grounding resistance present in the CCD solid-state image pickup element 10 includes a light shielding layer resistor R1 created between the light shielding layer 119 and the ground GND, and a substrate resistor R2 of the semiconductor substrate NSUB. The overall grounding resistance R is considered to be approximately equal to a parallel component of the light shielding layer resistor R1 and the substrate resistor R2.

As for resistance between the light shielding layer 119 and the ground GND, the light shielding layer resistor R1 includes, in addition to an equivalent resistance R10 of the light shielding layer 119, a protective resistor R12 of several hundred Ω to several tens of kilo Ω intentionally added to prevent electrostatic breakdown. Since the protective resistor R12 is grounded via a terminal 133, the equivalent resistor R10 of the light shielding layer 119 is on the side of the light shielding layer 119 rather than on the side of the terminal 133. The entire light shielding layer resistor R1 is a parallel component of the equivalent resistor R10 of the light shielding layer 119 and the protective resistor R12. Since the resistance value of the protective resistor R12 is larger than the resistance value of the equivalent resistor R10 of the light shielding layer 119, the grounding resistance R is defined with the substrate resistor R2 predominant.

As understood from not only FIG. 2 but also from FIGS. 3A-3C, the four types of vertical transfer electrodes 12 generally cover the image pickup section 10a of the CCD solid-state image pickup element 10. For this reason, the substrate voltage fluctuates in response to the vertical transfer pulse $\Phi V$ supplied to the vertical transfer electrodes 12. In other words, noise Noise1 is created on the semiconductor substrate NSUB. The noise Noise1 is then coupled to the transistor 120 via the coupling capacitor C3 because of the back gate effect to the transistor 120 forming the output amplifier 16 on the substrate. As a result, the noise is superimposed on the output signal, creating vertical streak noise.

The vertical transfer electrode 12 is capacitively coupled to the light shielding layer 119 via the coupling capacitor C1 and to the semiconductor substrate NSUB via the coupling capacitor C2. The light shielding layer 119 is grounded to the ground GND via the light shielding layer resistor R1. The ground GND is connected to the PWELL-#2b of the output amplifier 16 via the PWELL ground terminal 132.

Noise Noise2 arising from the vertical transfer pulse $\Phi V$ supplied to the vertical transfer electrode 12 fluctuates the PWELL-#2b of the output amplifier 16 via the coupling capacitor C1, the light shielding layer 119, the light shielding layer resistor R1, and the ground GND. With the back gate effect to the transistor 120 forming the output amplifier 16, the noise Noise2 is induced on the transistor 120, and superimposed on the output signal, thereby becoming vertical streak noise.

How to control the fluctuation of the semiconductor substrate NSUB and the fluctuation of the PWELL-#2b of the output amplifier 16 is important in noise control.

Analysis of Noise Generation Mechanism

FIGS. 4A-4C and FIGS. 5A1-5B2 illustrate a streak noise generation mechanism from the standpoint of circuit analysis. FIGS. 4A-4C illustrate the relationship between the equivalent circuit of the vertical driver and the CCD solid-state image pickup element 30. FIG. 5A1-5B2 illustrate a step response of the vertical transfer pulse $\Phi V$.

On the side of the image pickup section 10a, a coupling capacitor C1 is created between a vertical transfer electrode 32 and a light shielding layer, and a coupling capacitor C2 is created between the vertical transfer electrode 32 and a semiconductor substrate NSUB. On the side of an output amplifier 36, a coupling capacitor C3 is created between the gate of a transistor forming the output amplifier 36 and the semiconductor substrate NSUB because of the back gate effect. These elements are not shown in FIGS. 4A-4C.

The equivalent capacitor CL between each vertical transfer electrode 32 and the CCD substrate is considered to be approximately equal to the parallel component of the coupling capacitor C1 and the coupling capacitor C2. Capacitance related to the vertical transfer electrode 32 includes an electrode capacitance with the other vertical transfer electrodes 32 besides the coupling capacitors C1 and C2.

Grounding resistance present in the CCD solid-state image pickup element 30 includes a light shielding layer resistor R1 created between the light shielding layer 119 and the ground GND, and a substrate resistor R2 of the semiconductor substrate NSUB. The overall grounding resistance R is considered to be approximately equal to a parallel component of the light shielding layer resistor R1 and the substrate resistor R2.

As shown in FIG. 4A-4C, the CCD solid-state image pickup element 30 is illustrated as a CCD solid-state image pickup element 60 in the equivalent circuit, driven by the driving circuit 4. The CCD solid-state image pickup element 60 in the equivalent circuit includes a grounding resistor 61 as an equivalent resistor of the CCD substrate, which corresponds to the grounding resistance R of FIG. 3. The grounding resistor 61 is approximately equal to the parallel component of the light shielding layer resistor R1 and the substrate resistor R2. Resistors R62 and R63 are electrode resistance of the vertical transfer electrode 32. Capacitors C62 and C63 represent equivalent capacitors between the vertical transfer electrode 12 and the CCD substrate. Capacitor C64 represents an equivalent capacitor between the electrodes.

The capacitors C62 and C63 represent equivalent capacitance created between the vertical transfer electrode 12 and the CCD substrate, corresponding to equivalent capacitance CL between each vertical transfer electrode 12 and the CCD substrate in FIG. 3, and are equal to the parallel component of the coupling capacitor C1 and the coupling capacitor C2. Capacitor C64 represents an equivalent capacitance of the electrode.

The equivalent capacitance of the electrode in the CCD solid-state image pickup element varies largely depending on the number of pixels, used process, and layout configuration. Typically, the equivalent capacitance CL (capacitors C62 and C63) falls within a range of 100 to 1000 pF, and the grounding resistor R61 is several tens of Ω. Each of the resistors R62 and R63 falls within a range of several tens to several hundreds of Ω.

A vertical driver 40 for supplying the vertical transfer electrode 32 with the vertical transfer pulse ΦV is arranged in the driving circuit 4. The vertical driver 40 generates the vertical transfer pulses ΦV_1 through ΦV_4, and the CCD solid-state image pickup element 60 includes vertical transfer electrodes 32_1 through 32_4 respectively supplied with the vertical transfer pulses ΦV_1 through ΦV_4.

As shown in FIG. 4A-4C, the vertical driver 40 generates only a single vertical transfer pulse ΦV (output voltage Vout) for simplification of explanation. In practice, the CCD solid-state image pickup element 60 is driven by a plurality of drivers on a per transfer electrode basis (for example, by other vertical driver or other horizontal driver 70). For example, the vertical drivers 40 of the number corresponding to the number of types (phases) of vertical transfer electrodes 32 are arranged to drive the respective vertical transfer electrodes 32.

As seen from the equivalent circuit of the CCD solid-state image pickup element 60, the CCD solid-state image pickup element 60 (CCD solid-state image pickup element 30) is a capacitive reactance load if viewed from the vertical driver 40.

The equivalent electrode capacitance of the CCD solid-state image pickup element varies largely depending on the number of pixels, used process, and layout configuration. Typically, the equivalent capacitance CL (capacitors C62 and C63) falls within a range of 100 to 1000 pF, and the grounding resistor R61 is on the order of several tens of Ω. Each of the resistors R62 and R63 falls within a range of several tens to several hundreds of Ω.

The vertical driver 40 for supplying the vertical transfer electrode 32 with the vertical transfer pulse ΦV is arranged in the driving circuit 4. The vertical driver 40 generates the vertical transfer pulses ΦV_1 through ΦV_4, and the CCD solid-state image pickup element 60 includes vertical transfer electrodes 32_1 through 32_4 respectively supplied with the vertical transfer pulses ΦV_1 through ΦV_4. As shown in FIG. 4A-4C, the vertical driver 40 generates only a single vertical transfer pulse ΦV (output voltage Vout) for simplification of explanation. In practice, the CCD solid-state image pickup element 60 is driven by a plurality of drivers on a per transfer electrode basis (for example, by other vertical driver or other horizontal driver 70).

The vertical driver 40 includes an inverter 41 for logically inverting a control signal Din input from a terminal 403, a level shift (L/S) circuit 42 for outputting a control signal Vg1 in response to the control signal Din input via the terminal 403, and a level shift circuit 43 for outputting a control signal Vg2 in response to the level of the control signal NDin into which the inverter 41 has logically inverted the control signal Din input via the terminal 43.

The vertical driver 40 includes switches 48 and 49 to receive constant voltages V1 and V2 (having a voltage value V) from terminals 401 and 402 at the back ends of the level shift circuits 42 and 43, and output one of the constant voltages as an output voltage Vout from an output terminal 404 to the CCD solid-state image pickup element 60.

The vertical driver 40 thus outputs one of the constant voltages V1 and V2 provided to the terminals 401 and 402 from the output terminal 404 as the output voltage Vout, and supplies the output voltage Vout to the CCD solid-state image pickup element 60. The voltage V1 may be at a high level and the voltage V2 may be at a low level.

The vertical driver 40 receives the control signal Din from the terminal 403 and outputs the control signals Vg1 and Vg2 from the level shift circuits 42 and 43 to turn on the switches 48 and 49, respectively. When the switch 48 is turned on, the normal output voltage Vout becomes the voltage V1. When the switch 49 is turned on, the normal output voltage Vout becomes the voltage V2.

The CCD solid-state image pickup element 60, represented in the equivalent circuit thereof, is driven by an electrode 601 in response to the output voltage Vout of the vertical driver 40. For this reason, the driving signal is applied to the grounding resistor R61 via the capacitor 62 as an equivalent capacitance between the electrode 601 and the CCD substrate. A noise component responsive to the output voltage Vout thus appears.

The CCD solid-state image pickup element 60, represented in the equivalent circuit thereof, is further driven by the other vertical driver or other horizontal driver (hereinafter referred to as driver 70). The transient variations in the driving voltage on another electrode 602 interferes with the electrode 601, thereby causing image degradation such as cross-talk noise.

The driving signal on the other electrode 602 is applied to the grounding resistor R61, representing the equivalent resistance of the CCD substrate approximately equal to the parallel component of the light shielding layer resistor R1 and the substrate resistor R2, via the capacitor 63 as the equivalent capacitance present between the electrode 602 and the CCD substrate. The driving signal on the other electrode 602 appears on the electrode 601 via the capacitor C64 as the equivalent inter-electrode capacitance, and is then applied to the grounding resistor R61 via the capacitor C63 as the equivalent capacitance between the electrode 601 and the CCD substrate.

If the CCD solid-state image pickup element is driven by vertical transfer pulses ΦV different in phase as shown in FIG. 4B, VSUB variations responsive to the phase difference of the output voltage Vout appear, and a noise component appears in the image. FIG. 4C will be discussed later.

The effect of the grounding resistor R61 in the vertical transfer electrode 12 is described more in detail with reference to FIGS. 5A1-5B2. FIG. 5A1 illustrates an equivalent circuit to obtain a step response of the output voltage Vout without the grounding resistor R61 (with the resistance value of the grounding resistor R61 being zero). FIG. 5A2 illustrates a response waveform. FIG. 5B1 illustrates an equivalent circuit to obtain a step response of the output voltage Vout with the grounding resistor R61 (with the resistance of the grounding resistor R61 being nonzero). FIG. 5B2 illustrates a response waveform. The response waveforms of FIG. 5A2 and FIG. 5B2 are obtained in a simulation test.

Referring to FIGS. 5A1 and 5B1, a resistor R44 is the sum of an output resistor (output impedance Ro) of the vertical driver 40 and a resistor R62 as a wiring resistance of the vertical transfer electrode 12 (Ro+R62). In this case, the output resistance of the vertical driver 40 is mainly equivalent resistance of the switches 48 and 49 (equivalent impedance).

In the equivalent circuit shown in FIGS. 4A and 4B and FIGS. 5A1 and 5B1, the step response of the output voltage Vout (with the vertical transfer pulse ΦV of an voltage amplitude V supplied) is represented in the following equation (1):

$$\text{Output voltage } V\text{out}(t) = V \cdot [1 - (Ro/(Ro+R61)) \cdot \exp(-t/(C62(Ro+R61)))] \quad (1)$$

When time t=0, t=0 is substituted in equation (1), and the output voltage Vout at t=0 is obtained as represented in equation (2):

$$\text{Output voltage } V\text{out}(0) = V \cdot (R61/(R61+Ro)) \quad (2)$$

FIG. 5A2 illustrates the response waveform of the output voltage Vout with no grounding resistor, namely, with R61=0. FIG. 5B2 illustrates the response waveform of the output voltage Vout with a grounding resistor, namely, with R61≠0. As shown, line segment L1 represents a response waveform responsive to a rectangular vertical transfer pulse ΦV (=V1) supplied to the vertical transfer electrode 12, line segment L2 represents a response waveform with the resistor Ro having a smaller resistance value, and line segment L3 represents a response waveform with the resistor Ro having a larger resistance value.

As shown in FIGS. 5A2 and 5B2, the output voltage Vout sharply rises at the rising edge at time t=0 if the equivalent resistor R61 of the CCD substrate is not zero (normally not zero). At a falling edge at time t=1, the output voltage Vout sharply falls.

At the moment the voltage represented by equation (1) is generated in the electrode 601 in the CCD solid-state image pickup element 60, a driving voltage resulting in a response different from that of the above mentioned output voltage Vout is supplied to another electrode 602. A capacitor C64 as a capacitance between the electrode 601 and the electrode 602 and an output impedance of the driver 70 form a differentiating circuit, thereby causing the output voltage Vout to affect (interfere with) the electrode 602. The effect becomes pronounced particularly when the output voltage Vout sharply rises at time t=0.

If the equivalent resistor R61 of the CCD substrate is not zero (normally not zero), a voltage V603(t) observed at the terminal 603 becomes as represented by equation (3). At time t=0, the voltage affects (interferes with) the electrode 602 via the capacitor 603.

$$V603(t) = V \cdot (R61/(Ro+R61)) \cdot \exp(-t/(C62(Ro+R61))) \quad (3)$$

A transient variation in the driving voltage to one electrode interferes with a driving voltage to another electrode, thereby causing image degradation such as cross-talk noise. To prevent the image degradation, vertical driving (vertical transfer) is performed within the horizontal blanking period not in the effective horizontal scanning period in the known art. This presents difficulty in increasing the transfer speed in the CCD solid-state image pickup element.

As one solution to the noise problem, the use of the vertical transfer pulse ΦV having a milder transient characteristic instead of a typical vertical transfer pulse ΦV having a sharp transient characteristic has been proposed in Japanese Unexamined Patent Application Publication No. 2005-269060 (Japanese Patent Application No. 2004-076598) and Japanese Patent Application No. 2005-162034, each assigned to the same assignee of this invention. More specifically, a mechanism of transferring signal in the vertical transfer register 13 of the image pickup section 10a with the vertical transfer pulse ΦV having a milder transient characteristic (or driving method using a slow transient speed) has been proposed. However, the driving method at the slow speed is found to be insufficient with some noise problem remaining unresolved.

Japanese Unexamined Patent Application Publication No. 2005-028606 assigned to the same assignee of this invention discloses a complementary driving method for driving the vertical transfer registers with the driving signals alternately inverted phase, every set of driving signals, namely, every two types of driving signals in addition to the slow transient speed driving.

As previously discussed, with the grounding resistor (R61≠1), the response waveform of the output voltage Vout sharply rises at the rising edge at time t=0 and sharply falls at the falling edge at time t=1 with the effect of the grounding resistor R61 as shown in FIG. 5B2. This is supported by the fact that V603(0)=V(R61/(Ro+R61)) at time t=0 in equation (3) and that at time t=1, V603(1)=V(1−(R61/(Ro+R61))), although process to this conclusion is not discussed here. The sharp rising edge and the sharp falling edge cause noise on the image.

If the complementary driving with the two driving signals inverted in phase is performed, the noise components arising from the driving signals also become opposed in phase, thereby canceling each other. The cross-talk noise generated during the charge transfer in the column direction is thus reduced.

A further mechanism for enhancing the noise control effect is incorporated as described below.

First Embodiment Noise Control Technique

FIGS. 6A and 6B and FIGS. 7A and 7B illustrate a noise control method of a first embodiment of the present invention. FIGS. 6A and 6B are timing diagrams illustrating driving timing for driving the CCD solid-state image pickup element 10 of FIG. 1 in accordance with the first embodiment of the present invention. FIGS. 7A and 7B are timing diagrams illustrating the driving timing of a comparative example.

The control method of the first embodiment of the present invention is related to the four types of timing of the vertical transfer pulses ΦV supplied to the vertical transfer electrodes 12 for vertically driving the vertical transfer registers 13.

In the CCD solid-state image pickup element 10, the signal charge is received by and photoelectrically converted by the photo sensor 11 in response to the amount of light and is then stored in photo sensor 11. The signal charge of the photo sensor 11 is then read into the vertical transfer registers 13 during the vertical blanking period. The signal charge of one horizontal line is vertically transferred toward the charge storage section 10b and the horizontal transfer registers 14 in the vertical line shifting. The signal charge is thus transferred to the horizontal transfer registers 14. The signal charge transferred to the horizontal transfer registers 14 is transferred to the outside via the output amplifier 16 and the correlated double sampling circuit 17 during the effective horizontal transfer period.

Low-Speed Transient Driving

The vertical line shift in the driving method of the first embodiment features two-phase vertical transfer. At a first phase of vertical transfer, the vertical transfer (vertical line shift) is performed from the image pickup section 10a to the charge storage section 10b with the vertical transfer electrodes 12_1 through 12_4 respectively supplied with the vertical transfer pulses ΦV_1 through ΦV_4. At a second phase of vertical transfer, the storage gate section STG is supplied with storage gate pulse ΦVSTG and the hold gate section HLG is supplied with the hold gate pulse ΦVHLG.

As shown in FIG. 6A, low-speed transient driving (first-phase vertical line shift) is performed using the vertical transfer pulse ΦV with a slow transient speed during the effective horizontal scanning period Hs, while high-speed transient driving (second-phase vertical line shift) is performed using the transfer pulses having a sharp transient characteristic (storage gate pulse ΦVSTG and hold gate pulse ΦVHLG) during the horizontal blanking period Hb. In this way, noise appearing during the effective image presentation is reduced and the horizontal blanking period Hb is shortened. As a result, high speed reading is performed.

As a two-phase mechanism to perform the charge vertical transfer, the charge storage section 10b including the storage gate section STG and the hold gate section HLG is arranged between a transfer section including the vertical transfer electrode 12_4 of the vertical transfer register 13 in the image pickup section 10a and the horizontal transfer register 14.

When the vertical line shift is performed during the effective horizontal scanning period Hs, the effect of cross-talk noise due to the vertical transfer pulses ΦV_1 through ΦV_4 in the CCD transfer section, namely, the effect of cross-talk noise arising from transients, or a rising edge Tr and a falling edge Tf of these clock waveforms becomes a concern. In accordance with the first embodiment of the present invention, the gradient ΔV/ΔT (ΔV is pulse voltage and ΔT is time) of the rising edge Tr and the falling edge Tf of the vertical transfer pulses ΦV_1 through ΦV_4 in the vertical line shift is reduced as shown in FIG. 6A to slow the transient speed. The transient speed ΔV/ΔT is slowed to the extent that the cross-talk noise generated with the vertical transfer pulses ΦV_1 through ΦV_4 applied is removed by the correlated double sampling circuit 17.

Tests made with the transient speed of the vertical transfer pulses ΦV_1 through ΦV_4 slowed shows that if the transient speed ΔV/ΔT is 50 mV/ns or less (not including zero), the cross-talk noise generated in the vertical line shift is removed by the correlated double sampling circuit 17. Even if the vertical line shift is performed during the effective horizontal scanning period Hs, the effect of video noise (vertical streaks) to the output of the CCD solid-state image pickup element is reduced. More specifically, the cross-talk noise responsive to the vertical driving pulse having the transient speed ΔV/ΔT being 50 mV/ns (not including zero) contains no high frequency components and is sufficiently removed by the correlated double sampling circuit 17.

The transient speed ΔV/ΔT of the vertical transfer pulse in the known vertical line shift is about 1 V/ns, and the cross-talk noise arising from that vertical transfer pulse contains a high frequency component the CDS circuit cannot remove.

FIG. 6A illustrates as a ramp waveform a transient period of the clock of the vertical transfer pulses ΦV_1 through ΦV_4 in the effective horizontal scanning period Hs. It is sufficient if the transient characteristic of the riding edge Tr and the falling edge Tf, namely, the gradient of the of the riding edge Tr and the falling edge Tf of the vertical transfer pulses ΦV_1 through ΦV_4 is small. The riding edge Tr and the falling edge Tf are not limited to the ramp waveform and may be rising and falling at an exponential rate or a step rate. If the riding edge Tr and the falling edge Tf are changed at a step rate, the rate of change at each step may be set to be as small as possible, in other words, a large number of steps may be incorporated.

In accordance with the first embodiment, the transient speed of the vertical driving pulse applied to the transfer electrode in the vertical line shift during the effective horizontal scanning period Hs is set to be low. As shown in FIG. 6B, the transient speed of the vertical transfer pulse ΦV applied to the transfer electrode during the vertical blanking period Vb is set to be high to achieve high speed transfer. In an electronic image stabilization operation of a camcorder needing high speed operation, or in a CCD solid-state image pickup element of frame interline transfer (FIT) system for business use, high speed driving needs to be performed during the vertical blanking period Vb. The high speed driving during the vertical blanking period is performed by the standard CMOS driver with the vertical transfer electrodes 12_1 through 12_4 supplied with the vertical transfer pulses ΦV_1 through ΦV_4 having the high transient speed.

A two-speed driver may be used to perform the high speed driving within the vertical blanking period Vb and the low speed driving within the horizontal blanking period Hb.

The image pickup section 10a performs the low speed transient driving to transfer charge to the charge storage section 10b. The vertical line shift is performed with a small gradient of the vertical transfer pulses ΦV_1 through ΦV_4, namely, a low transient speed ΔV/ΔT. The cross-talk noise generated with the vertical transfer pulses ΦV_1 through ΦV_4 applied can be removed by the correlated double sampling circuit 17. The video noise (vertical streaks) is thus controlled.

The charge storage section 10b performs the high speed transient driving to transfer charge to the horizontal transfer register 14 with the storage gate pulse ΦVSTG and the hold gate pulse ΦVHLD. The signal charge can thus be transferred from the charge storage section 10b to the horizontal transfer register 14. The horizontal blanking period Hb is thus shortened. A high frame rate results.

Since the storage gate section STG and the hold gate section HLG can be designed regardless of the vertical pixel pitch, the electrode width of the storage gate electrode 21 and the hold gate electrode 22 can be increased. The electrodes 21 and 22 can be reduced in resistance. The signal charge can be easily transferred from the storage gate section STG to the horizontal transfer register 14. Lined wiring is easy to design, and low resistant electrodes 21 and 22 are incorporated, and high speed transfer is achieved. The signal charge can be transferred to the horizontal transfer registers 14 within a short horizontal blanking period Hb. Even higher frame rate can be achieved.

With the low transient speed driving incorporated, the vertical line shift driving is performed at the speed switched between the high speed and the low speed. Even if the first-phase vertical line shift is performed during the effective horizontal scanning period Hs, the video noise (vertical streaks) does not appear because the vertical transfer pulse ΦV is a low speed transient. Since the second-phase vertical line shift is performed with the vertical transfer pulse ΦV having the high speed transient during the horizontal blanking period Hb, the horizontal blanking period Hb can be substantially reduced in time. A high frame rate results. This driving method is applicable to the high speed applications such as the electronic image stabilization operation in the camcorder or the business FIT application.

Complementary Driving

In the driving method of the first embodiment, every plural number of vertical transfer electrodes 12 are grouped into sets, which are supplied with alternately reversed vertical transfer pulses ΦV. In other words, the vertical transfer pulses ΦV are used in a complementary method. The driving method of the first embodiment is substantially different from the driving method of FIGS. 7A and 7B in which the four types of driving pulses different in phase are supplied.

For example, the vertical transfer electrodes 12 in the image pickup section 10a of the CCD solid-state image pickup element 10 has a two-layer structure. If the vertical transfer electrodes 12 identical in structure are driven with the driving pulses in the complementary fashion, voltage fluctuations caused by the coupling capacitance between the vertical transfer electrode 12 and each of the PWELL-#2b and the semiconductor substrate SUB can cancel each other.

The complementary driving (reverse phase driving) allows the period of the vertical transfer pulse ΦV to be halved, and as a result, the transient period can be doubled. The transient speed can thus lowered, allowing the cross-talk noise to be reduced.

With the cross-talk noise reduced, the output amplifier 16 is free from noise problem even if the output amplifier 16 is designed to have high gain. High speed and high gain performance is thus provided.

Major Advantages of Complementary Driving

Figure 8A:
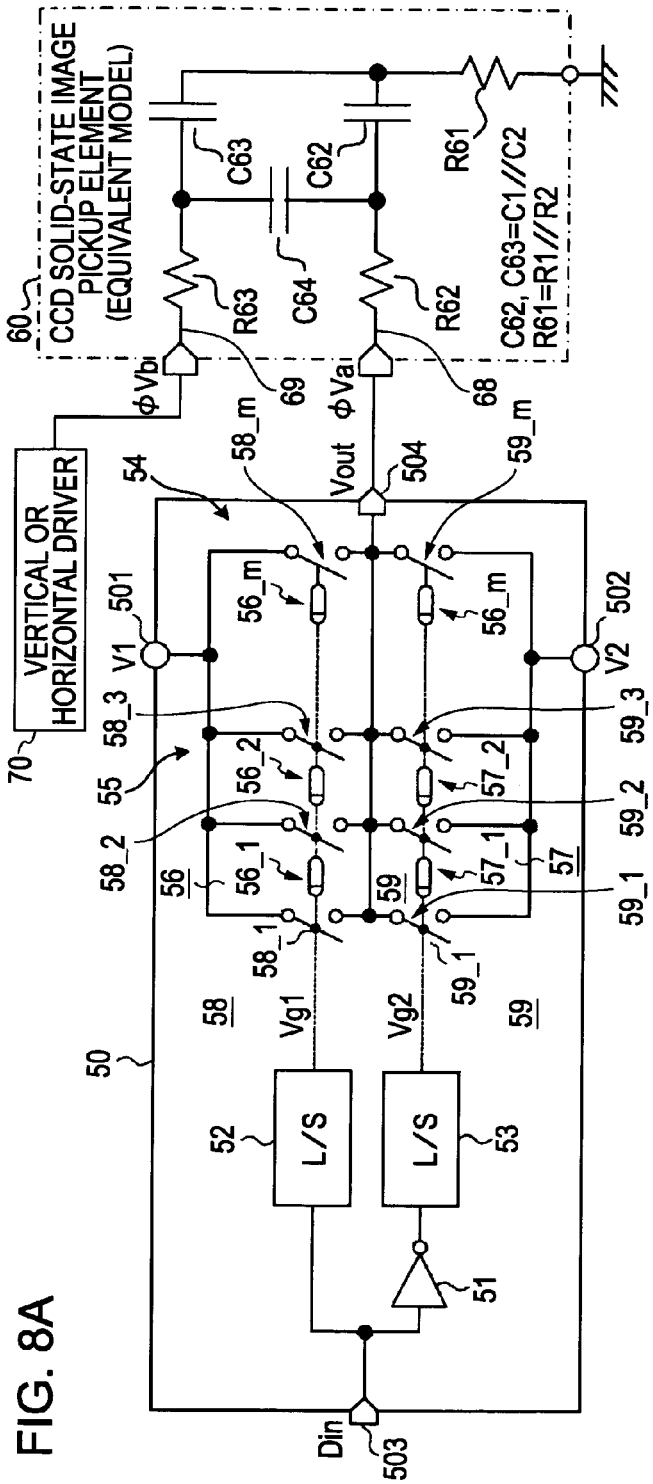
FIGS. 8A-8C illustrate the relationship between an equivalent circuit of the vertical driver and the CCD solid-state image pickup element.
Figure 8C:
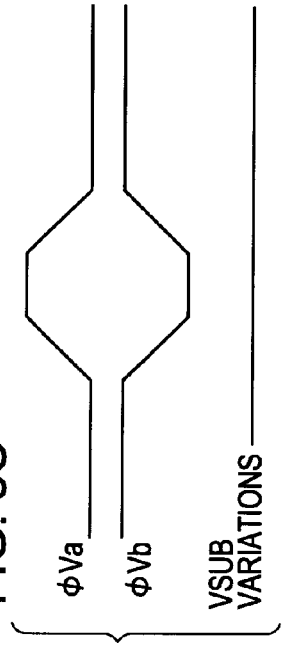
Figure 8B:
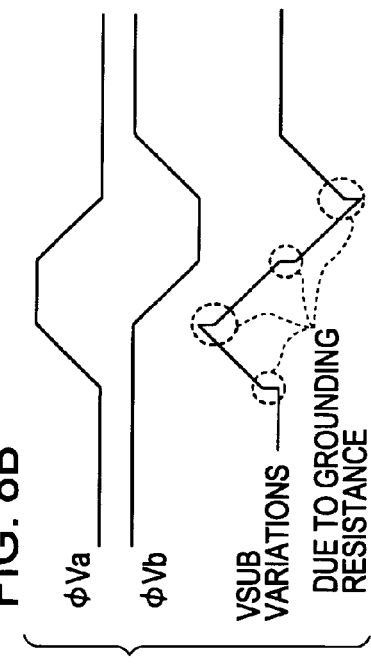
Figure 9A:
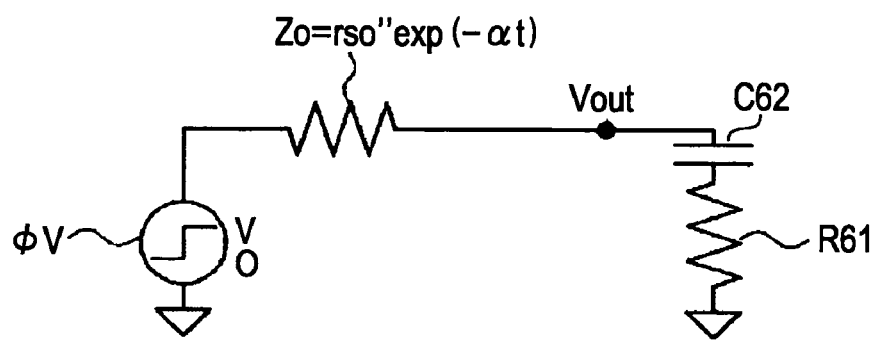
FIGS. 9A and 9B illustrate the principle in which the vertical driver reduces transient speed.
Figure 9B:

FIGS. 8A-8C and FIGS. 9A and 9B illustrates major advantages of the complementary driving. FIGS. 8A-8C illustrate the relationship between the equivalent circuit of the vertical driver and the CCD solid-state image pickup element 30. FIGS. 9A and 9B illustrate the principle of a vertical driver 50 that reduces the transient speed.

As shown in FIG. 8A, the CCD solid-state image pickup element 10 is referred to as the CCD solid-state image pickup element 60 in the equivalent circuit as in FIG. 4A. The CCD solid-state image pickup element 60 is driven by the driving circuit 5. The driving circuit 5 includes the vertical driver 50 unique to this embodiment that supplies to the vertical transfer electrode 12 the vertical transfer pulse ΦV, the storage gate pulse ΦVSTG, and the hold gate pulse ΦVHLG.

The vertical driver 50 generates the vertical transfer pulses ΦV_1 through ΦV_4, and the CCD solid-state image pickup element 60 includes the vertical transfer electrodes 12_1 through 12_4 respectively supplied with the vertical transfer pulses ΦV_1 through ΦV_4. As shown in FIGS. 8A and 8B, the vertical driver 50 generates a single vertical transfer pulse ΦV (output voltage Vout) for simplicity of explanation, but the CCD solid-state image pickup element 60 is driven by a plurality of drivers (for example, another vertical driver and another horizontal driver 70).

When an electrode 68 is supplied with a vertical transfer pulse ΦV_1 in the complementary driving of FIGS. 8A and 8B, an electrode 69 is supplied with the vertical transfer pulse ΦV_3 reverse in phase to the vertical transfer pulse ΦV_1. When the electrode 68 is supplied with the vertical transfer pulse ΦV_2, the electrode 69 is supplied with the vertical transfer pulse ΦV_4 reverse in phase to the vertical transfer pulse ΦV_2.

The vertical driver 50 includes an inverter 51 for logically inverting a control signal Din input via a terminal 503, a level shift (L/S) circuit 52 for outputting a control signal Vg1 responsive to the level of the control signal Din input via the terminal 503, and a level shift circuit 53 for outputting a control signal Vg2 responsive to the level of a control signal NDin that is logically inverted by the inverter 51 from the control signal Din input via the terminal 503.

The vertical driver 50 includes a voltage output section 54 and an impedance controller 55 as stages subsequent to the level shift circuits 52 and 53. The voltage output section 54 receives constant voltages V1 and V2 (voltage value V) via terminals 501 and 502, and outputs one of the input voltages as a output voltage Vout via an output terminal 504 to the CCD solid-state image pickup element 60. For example, the voltage V1 is at a high level, and the voltage V2 is at a low level.

The impedance controller 55 controls the output impedance viewed from the output terminal 504 in accordance with transfer characteristic of the CCD solid-state image pickup element 60 serving as a capacitive load. As shown in FIGS. 8A and 8B, the impedance controller 55 includes a plurality of cascaded delay lines (delay elements) 56 (individually identified by suffixes _1, _2, . . . , _m), a plurality of cascaded delay lines (delay elements) 57 (individually identified by suffixes _1, _2, . . . , _m), and switches 58 and 59 (individually identified by suffixes _1, _2, . . . , _m) respectively arranged for the delay lines 56 and 57. As will be described later, the switches 58 and 59 are set to be turned on and off in accordance with the transfer characteristics of the CCD solid-state image pickup element 60.

The vertical driver 50 drives the electrode 601 as one electrode of the CCD solid-state image pickup element 60 with the output voltage Vout while the driver 70 as the other vertical driver and the horizontal driver drives the electrode 602 as the other electrode of the CCD solid-state image pickup element 60.

The delay line 56 and the switch 58 control the output impedance at which the voltage V1 is output as the output voltage Vout from the terminal 501 and the delay line 57 and the switch 59 control the output impedance at which the voltage V2 is output as the output voltage Vout from the terminal 502.

The delay line 56 and the switch 58 are constructed as described below. One end of each of the switches 58 is commonly connected to the terminal 501 (voltage V1) while the other end of each of the switches 58 is commonly connected to the output terminal 504. The switches 58 are arranged at the front and back of each delay line 56. As the control signal Vg1 from the level shift circuit 52 travels along the delay lines 56, the switch 58_1 through the switch 58_m are successively turned on with a delay introduced.

Each switch 58 contains an impedance component. As the switches 58 are turned on with the control signal Vg1 traveling along the delay lines 56, the value of the parallel impedance created by the switches 58 becomes smaller. More specifically, the output impedance of the vertical driver 50 viewed from the output terminal 504 is successively reduced.

Similarly, one end of each of the switches 59 is commonly connected to the terminal 502 (voltage V2) while the other end of each of the switches 59 is commonly connected to the output terminal 504. The switches 59 are arranged at the front and back of each delay line 57. As the control signal Vg2 from the level shift circuit 53 travels along the delay lines 57, the switch 59_1 through the switch 59_m are successively turned on with a delay introduced.

Each switch 59 contains an impedance component. As the switches 59 are turned on with the control signal Vg2 traveling along the delay lines 57, the value of the parallel impedance created by the switches 59 becomes smaller. More specifically, the output impedance of the vertical driver 50 viewed from the output terminal 504 is successively reduced.

In the vertical driver 50, the control signal Din is input via the terminal 503, the level shift circuits 52 and 53 supply the control signals Vg1 and Vg2 for turning on the switches 58 and 59 to the delay lines 56 and 57, respectively. More specifically, the inverter 51 transitions the input signal to one of the level shift circuits 52 and 53 to a high level, thereby causing the output signal from the one of the level shift circuits 52 and 53 to travel along the delay lines, and the corresponding switches to be successively turned on.

With the impedance controller 55 controlling the output impedance of the vertical driver 50, the transient speed $\Delta V/\Delta T$ of the output voltage Vout is reduced.

FIG. 8A, corresponding to FIGS. 5A1 and 5B1, shows an equivalent circuit for determining a step response of the output voltage Vout. FIG. 8B, corresponding to FIGS. 5A2 and 5B2, shows response waveforms. The response waveform of FIG. 8B is obtained in the equivalent circuit without the capacitor 62.

As shown in FIG. 8A, an impedance Z58 is the sum of an output impedance Zo viewed from the output terminal of the vertical driver 50 and a resistor R62 as a wiring resistance of the vertical transfer electrode 12 (Zo+R62). The Zo of the vertical driver 50 is mainly an equivalent impedance of each of the switches 58 and 59. The output impedance Zo of the vertical driver 50 changes with time in accordance with equation $Zo(t)=rs0 \exp(-\alpha t)$ (rs0: initial value=Zo(0), and $\alpha$: constant).

The step response of the output voltage Vout (with the vertical transfer pulse $\Phi V$ having an voltage amplitude V supplied) in the equivalent circuit of FIG. 9A is determined as described in equation (4-1). If the resistor R62 as the wiring resistance of the vertical transfer electrode 12 is neglected, equation (4-2) results. If the capacitor C62 is not contained, equation (4-3) results:

Output voltage $Vout(t)=V\cdot[1-(Z58(t)/(Z58(t)+R61))\cdot \exp(-t/(C62(Z58(t)+R61)))]$ (4-1)

Output voltage $Vout(t)=V\cdot[1-(t)/(Zo(t)/(Zo(t)+R61))\cdot \exp(-t/C62(Zo(t)+R61)))]$ (4-2)

Output voltage $Vout(t)=V\cdot R61/(R61+Zo(t))=R61/(R61+rs0\cdot\exp(-\alpha t))$ (4-3)

Particularly, when time t=0, t=0 is substituted in equations (4-2) and (4-3), the output voltage Vout at time t=0 is obtained as expressed by equation (5):

$$\begin{aligned}\text{Output voltage } Vout(0) &= V\cdot(R61/(R61+Zo(0))) \\ &= V\cdot(R61/(R61+rs0))\end{aligned} \quad (5)$$

In comparison of equation (5) with the conventional output voltage Vout(0)=V R61/(R61+Ro) (see equation (2)), the value of the output voltage Vout at t=0 is reduced more than in the known art by adjusting the initial value rs0 of the output impedance Zo of the vertical driver 50. For example, if rs0=8Ro, the value of the output voltage Vout at t=0 becomes one-eighth the value of the known art. Since the value of the impedance Z58 is large, the transient characteristic of the output voltage Vout is made smooth, namely, the transient speed of the output voltage Vout is lowered.

There is a possibility that the transient speed is excessively lowered with the output voltage Vout failing to reach the standard level (=V) within the active period of the vertical transfer pulse $\Phi V$, and that the vertical transfer electrode 12 is not sufficiently driven.

To overcome this drawback, the output impedance Zo of the vertical driver 50 is lowered with time. If the output impedance Zo of the vertical driver 50 is exponentially lowered, the transient response characteristic of the output voltage Vout (with the capacitor C62 not included) is set to be milder as shown in FIG. 9B, more specifically, the transient speed of the output voltage Vout is lowered.

In the equivalent circuit of FIG. 9A, the output impedance Zo of the vertical driver 50 is expressed by an exponential function. At time t=0, the initial value rs0 plays an important factor in lowering the transient speed of the output voltage Vout, and expressing the output impedance Zo of the vertical driver 50 with the exponential function is not necessary. However, the transfer characteristic of the CCD solid-state image pickup element 60 as the capacitive load expressed in time axis typically has an exponential factor. If the output impedance of the vertical driver 50 also has an exponential factor in time axis, the transient characteristic of the output voltage Vout becomes preferably milder.

In accordance with the exponential factor of the transfer characteristic of the CCD solid-state image pickup element 60 expressed in time axis, the impedance of the switches 58 and 59 is ideally exponentially reduced with the switches 58_1, 58_2, ..., 58_m.

The equivalent capacitance of the electrodes of the CCD solid-state image pickup element is largely dependent on the number of pixels, used process, and the layout configuration (collectively referred to as device characteristic). The transient characteristic of the driving voltage of the known vertical driver optimized for a particular CCD solid-state image pickup element is not necessarily optimum for another CCD solid-state image pickup element. A method of controlling the transient characteristic of the driving voltage response to the CCD solid-state image pickup element is desired.

The impedance value of the switches 58 and 59 is preferably set in accordance with the transfer characteristic of the CCD solid-state image pickup element 60 as a capacitive load. In particular, the lower the output voltage Vout, namely, the higher the initial value rs0 of the impedance as shown in FIG. 9B, the better to achieve a low transient speed. In the vertical driver 50, the impedance of the switches 58_1 and 59_1 that become the output impedance at t=0 is set to be the highest. With the impedance of the switches 58_1 and 59_9 set to be appropriate, the value of the output voltage Vout at t=0 becomes sufficiently small, and provides advantages over the known art.

The output impedance Zo of the vertical driver 50 at the rising edge (t=0) and the falling edge (t=1) is set to be large. As time elapses, the output impedance Zo is reduced. Even if the vertical transfer electrodes 12 are driven by the driving pulse having a low transient speed, the output voltage Vout(0)=V(R61/(R61+rs0)) or output voltage Vout(1)=V(1−(R61/(R61+rs0))) still remains. In response to a voltage change, vertical streaks as the cross-talk noise appears on a screen and a voltage change during a transient period still appears on the screen.

As previously discussed with reference to FIGS. 8A-8C, the electrode 601 as one electrode of the CCD solid-state image pickup element 60 in the equivalent circuit is driven by the vertical driver 50 while the electrode 602 as the other electrode is driven by the other driver 70. A transient change in the driving voltage to the other electrode 602 interferes with the driving voltage to the electrode 601.

In accordance with the driving method using the low transient speed proposed in Japanese Patent Applications Nos. 2004-076598 and 2005-162034, the CCD solid-state image pickup element is driven by the four types of vertical transfer pulses ΦV different in phase as shown in FIGS. 7A and 8B. Even if the vertical transfer pulse ΦV having the low transient speed is used, a noise component responsive to phase different appears, and cross-talk noise still remains.

In contrast, if every two vertical transfer electrodes 12 are grouped in sets, which are driven by the vertical transfer pulse ΦV in a complementary driving, namely, driven by alternately reversed phased, vertical transfer pulses ΦVa and ΦVb, voltage variations with the electrode 601 driven by the vertical transfer pulse ΦVa and voltage variations with the electrode 602 driven by the vertical transfer pulse ΦVb cancel each other. As a result, voltage fluctuations caused by the coupling capacitor between the vertical transfer electrode 12 and each of the PWELL-#2b and the semiconductor substrate SUB become approximately zero.

To cancel voltage variations with alternately reversed phase voltages, symmetry of electrodes becomes a concern. In the two-layer electrode and four-phase driving shown in FIG. 2, the vertical transfer electrodes 12 to be driven by the alternately reversed phase voltages include the second layer vertical transfer electrodes 12_1 and 12_3 and the first layer vertical transfer electrodes 12_2 and 12_4. Since the first layer electrodes are identical to each other in pattern shape and the second layer electrodes are identical to each other in pattern shape, the capacitances are balanced and the noise canceling effect of the complementary driving is large.

Even if the electrode structure is not well balanced, the cross-talk noise may still be minimized by adjusting the driving capability of the vertical driver 50, more specifically, by adjusting the voltage amplitude of the driving pulse.

Additional Advantages of the Complementary Driving

Figure 10:
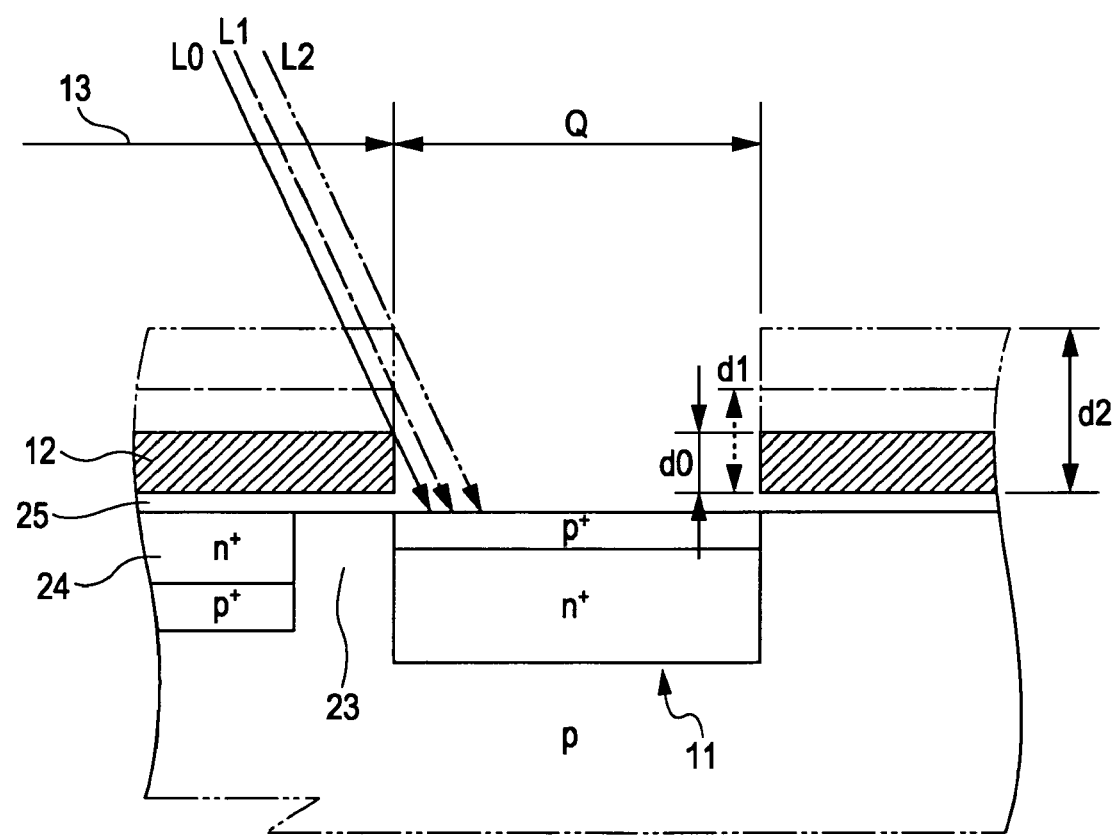
FIG. 10 illustrates an additional advantage provided by complementary driving.

FIG. 10 illustrates additional advantages of the complementary driving. In the complementary driving of the first embodiment of the present invention, the first-phase vertical line shift is performed with the vertical transfer pulses ΦV_1 through ΦV_4 having the low transient speed more slowly than the transient driving method with the low transient disclosed in Japanese Patent Application Nos. 2004-076598 and 2005-162034. Thinner design can thus be incorporated in the vertical transfer electrodes 12_1 through 12_4.

As shown in FIG. 10, the CCD solid-state image pickup element 10 includes the vertical transfer register 13 including the photo sensor 11, the readout gate section ROG, the embedded channel region 24, and the vertical transfer electrode 12 on the gate dielectric layer 25. A thickness d0 of the vertical transfer electrode 12 is made thinner than a thickness d2 in the known art or a thickness d1 described Japanese Patent Application Nos. 2004-076598 and 2005-162034. The height of the step defining the sensor aperture 118 is substantially reduced so that the blocking effect to an obliquely entering light ray (solid line) L0 is minimized.

This arrangement increases the size of the sensor aperture 118, improves the light collection efficiency to the obliquely entering light ray, and leads to high sensitivity. Since the blocking of the obliquely entering light ray is controlled, the generation of shading is also reduced. An obliquely entering light ray L1 (represented by dot-and-dash chain line) shows the light blocked state with the thickness d1 described in Japanese Patent Application Nos. 2004-076598 and 2005-162034, and an obliquely entering light ray L2 (represented two-dot-and-dash line) shows the light blocked state of the known obliquely entering light ray.

Example of Driving Timing

Figure 11:
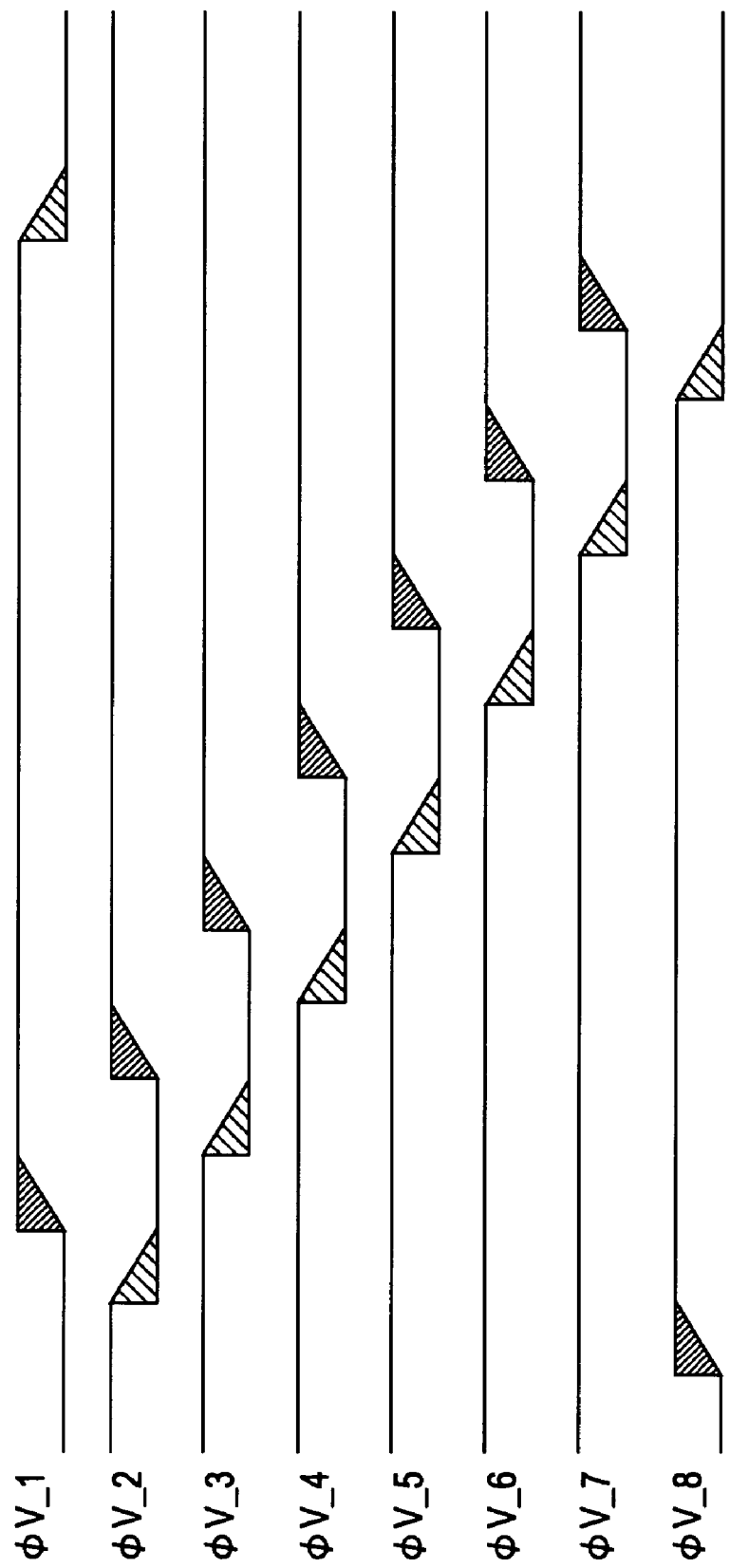
FIG. 11 is a first timing chart illustrating one driving timing.
Figure 12:
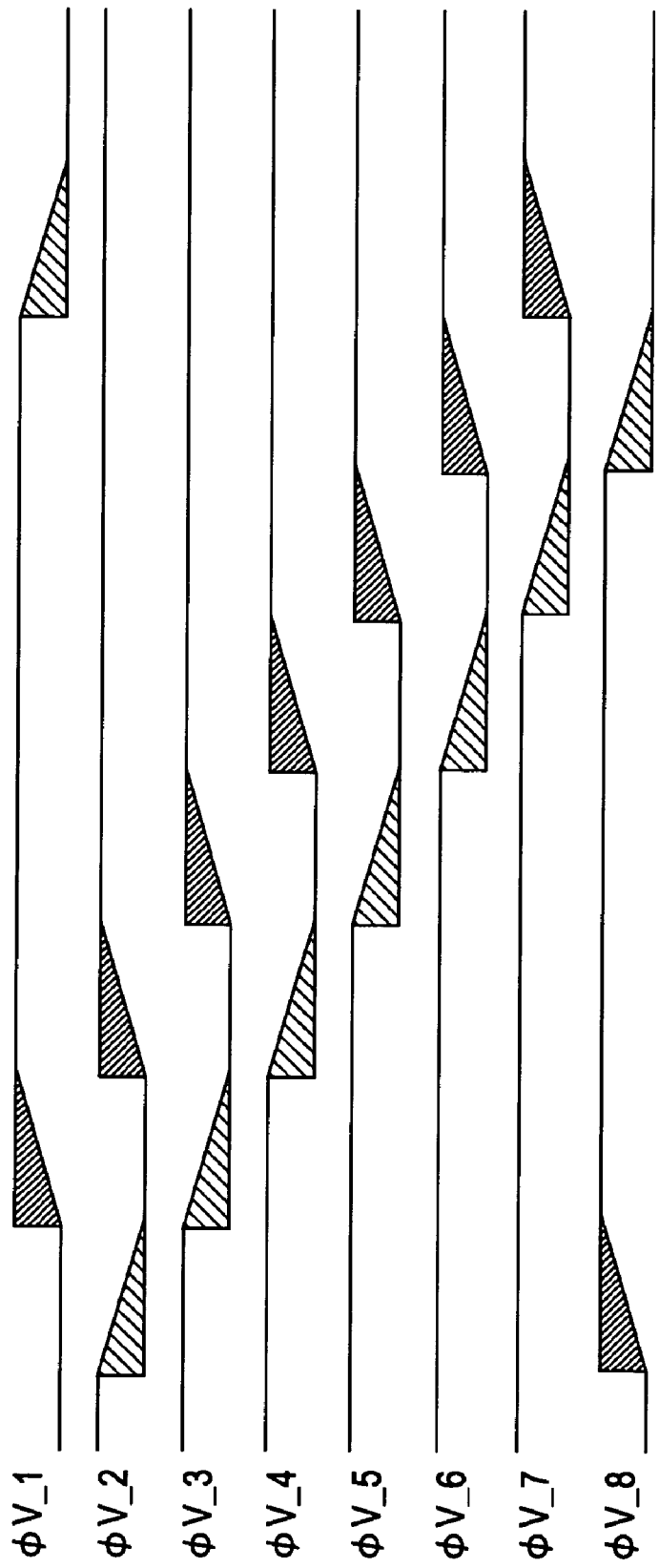
FIG. 12 is a second timing chart illustrating another driving timing.

FIGS. 11 through 18 illustrate examples of other driving timings. In the above discussion, the four types of the vertical transfer pulses ΦV are used. The vertical transfer pulses ΦV are not limited to the four types. For example, FIG. 11 illustrates a conventional eight-phase driving method that uses successively eight types of vertical transfer pulses ΦV. In contrast, FIG. 12 illustrates that two types of vertical transfer pulses ΦV of the eight types are reversed phased. More specifically, the vertical transfer pulses ΦV_1 and ΦV_3 are reverse to each other in phase, the vertical transfer pulses ΦV_2 and ΦV_4 are reverse to each other in phase, the vertical transfer pulses ΦV_3 and ΦV_5 are reverse to each other in phase, the vertical transfer pulses ΦV_4 and ΦV_6 are reverse to each other in phase, the vertical transfer pulses ΦV_5 and ΦV_7 are reverse to each other in phase, the vertical transfer pulses ΦV_6 and ΦV_8 are reverse to each other in phase, the vertical transfer pulses ΦV_7 and ΦV_1 are reverse to each other in phase, and the vertical transfer pulses ΦV_8 and ΦV_2 are reverse to each other in phase.

Figure 13:
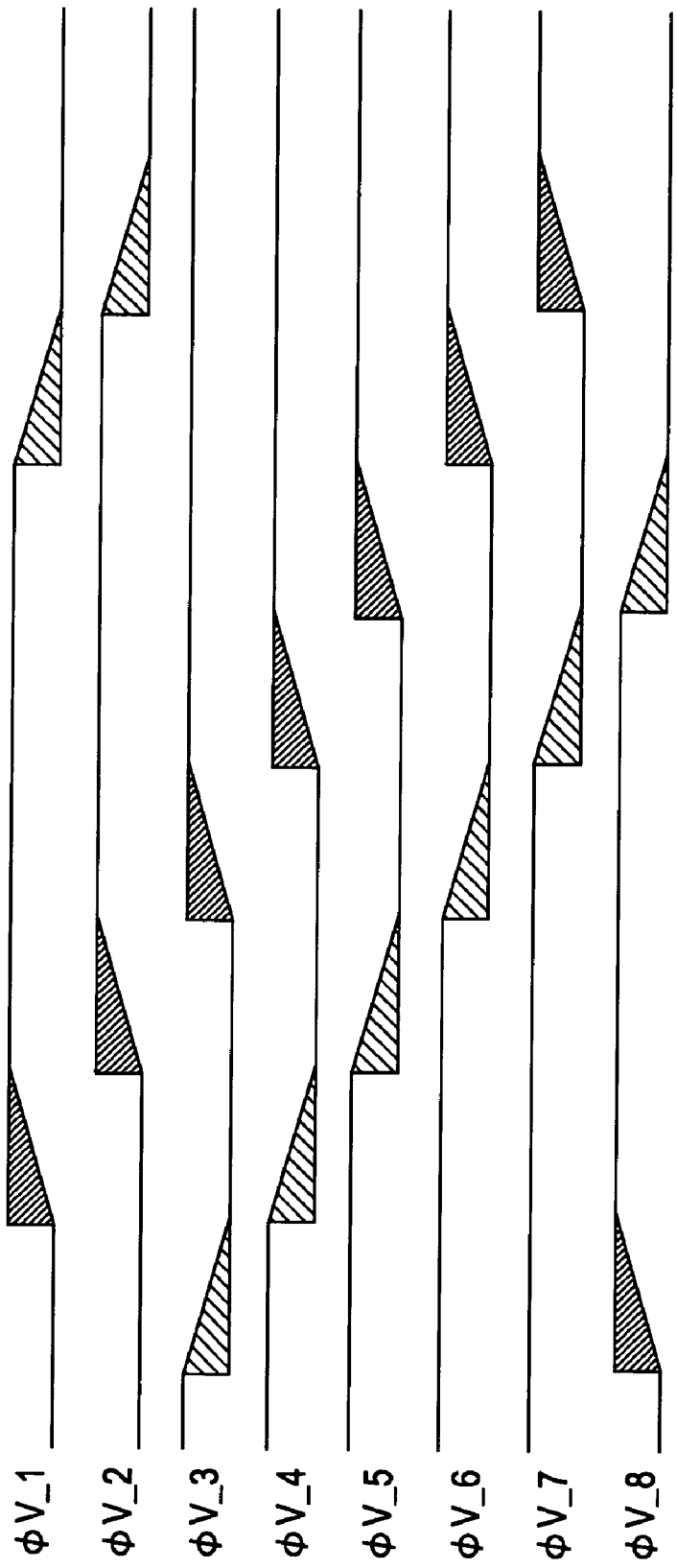
FIG. 13 is a third timing chart illustrating yet one driving timing.

Even when the a moving picture pickup and driving on a VGA mode using the conventional eight-phase driving method, two of the eight phase voltages may be reversed as shown in FIG. 13. More specifically, the vertical transfer pulses ΦV_1 and ΦV_4 are reverse to each other in phase, the vertical transfer pulses ΦV_2 and ΦV_5 are reverse to each other in phase, the vertical transfer pulses ΦV_3 and ΦV_6 are reverse to each other in phase, the vertical transfer pulses ΦV_4 and ΦV_7 are reverse to each other in phase, the vertical transfer pulses ΦV_5 and ΦV_8 are reverse to each other in phase, the vertical transfer pulses ΦV_6 and ΦV_1 are reverse to each other in phase, the vertical transfer pulses ΦV_7 and ΦV_2 are reverse to each other in phase, and the vertical transfer pulses ΦV_8 and ΦV_3 are reverse to each other in phase.

Pseudo-Complementary Driving

Figure 14:
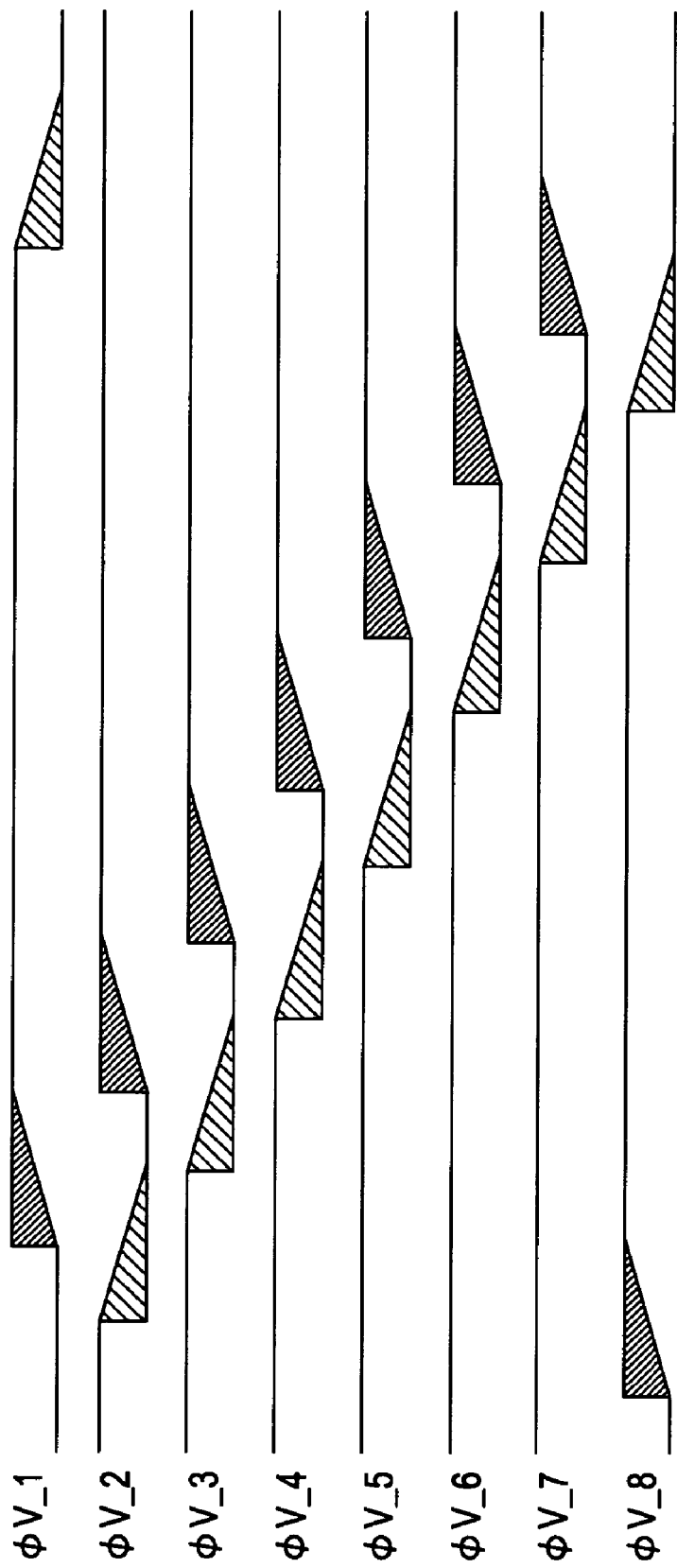
FIG. 14 is a fourth timing chart illustrating a further driving timing.
Figure 15:
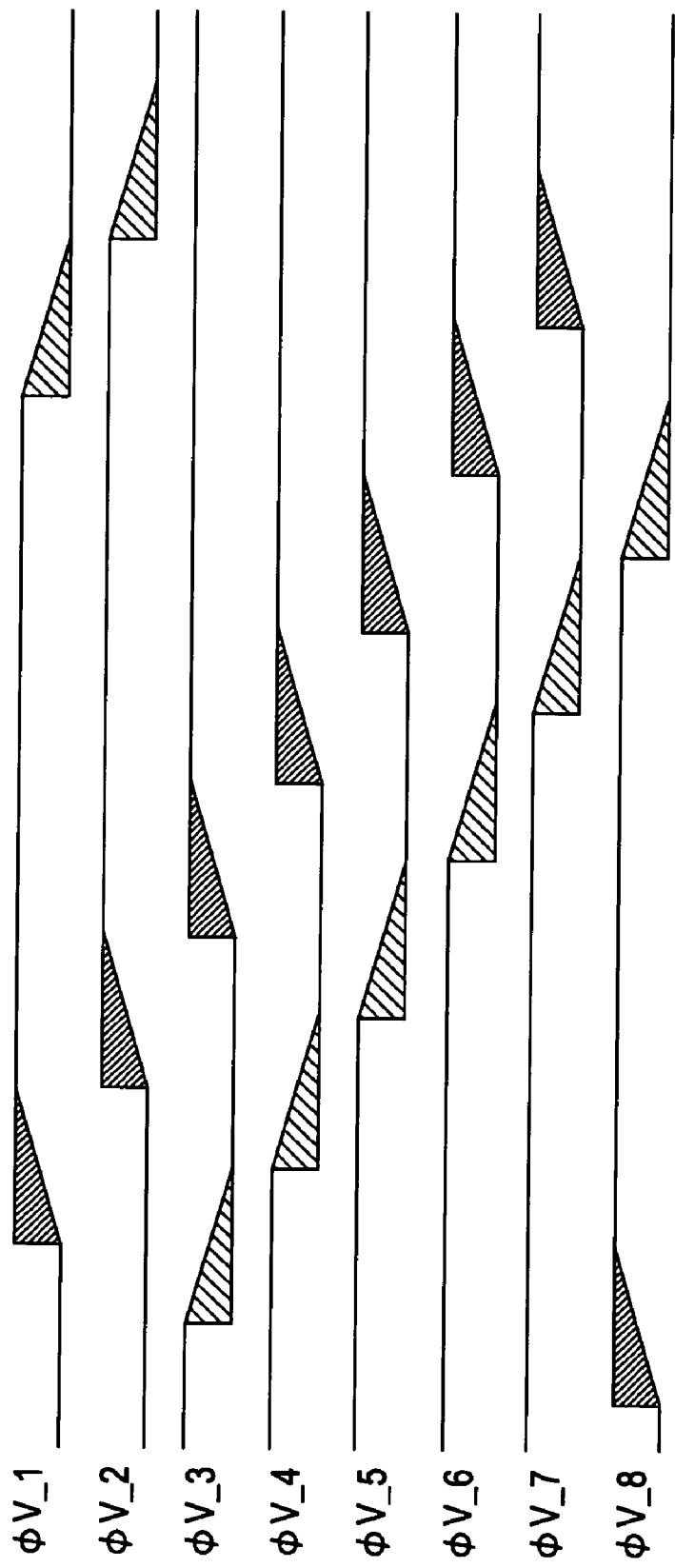
FIG. 15 is a fifth timing chart illustrating a further driving timing.

In the above example, two types are reversed to each other in driving. As shown in FIGS. 14 and 15, one type of driving signal is combined with a plurality of other types of driving signal so that the driving signals are reverse to each other as a whole. More specifically, at least every three types of driving signals are grouped in a set so that the three types of driving signals achieve the reverse driving effect. Preferably, the low transient speed may be combined with the complementary driving method. As shown in FIG. 14, the transient speed is set to be even slower.

Figure 16:
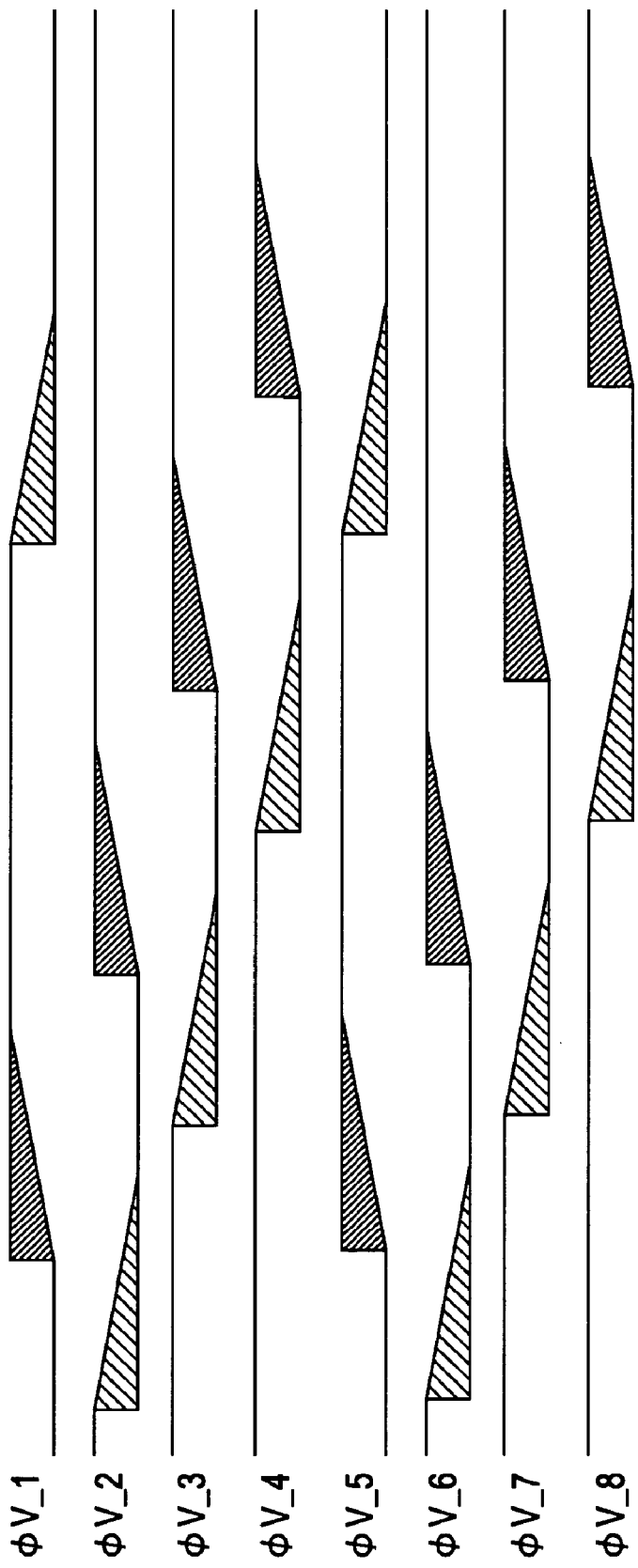
FIG. 16 is a sixth timing chart illustrating a further driving timing.

As shown in FIGS. 14 and 15, one driving signal is grouped with a plurality of other driving signals to achieve the reverse driving state. As shown in FIG. 16, it is acceptable if the driving signals are partially discontinued. FIG. 16 illustrates four-phase pseudo-reverse (complementary) driving, which is appropriate for use in driving a moving picture on a mega pixel CCD solid-state image pickup element.

Figure 17:
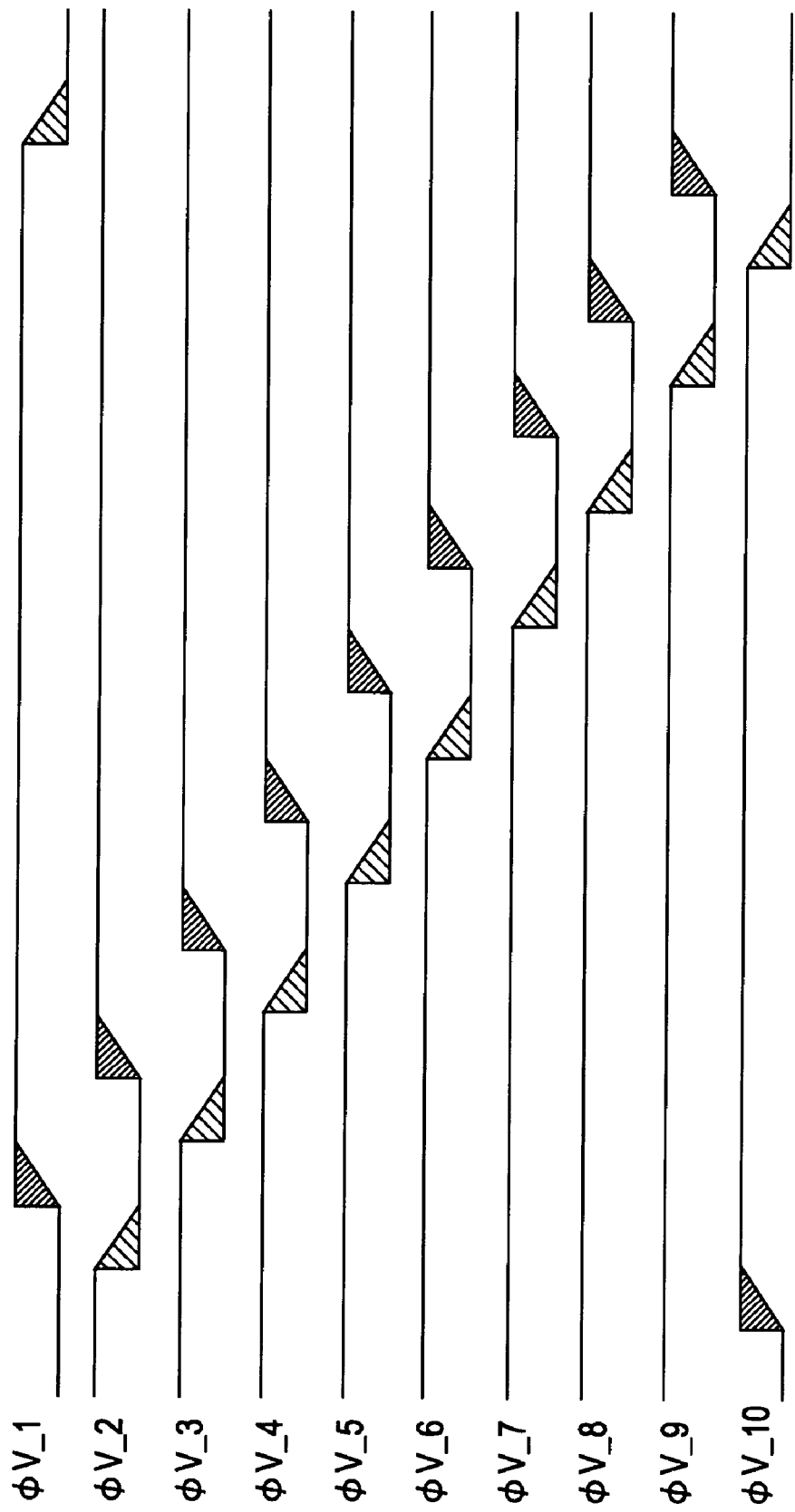
FIG. 17 is a seventh timing chart illustrating a further driving timing.
Figure 18:
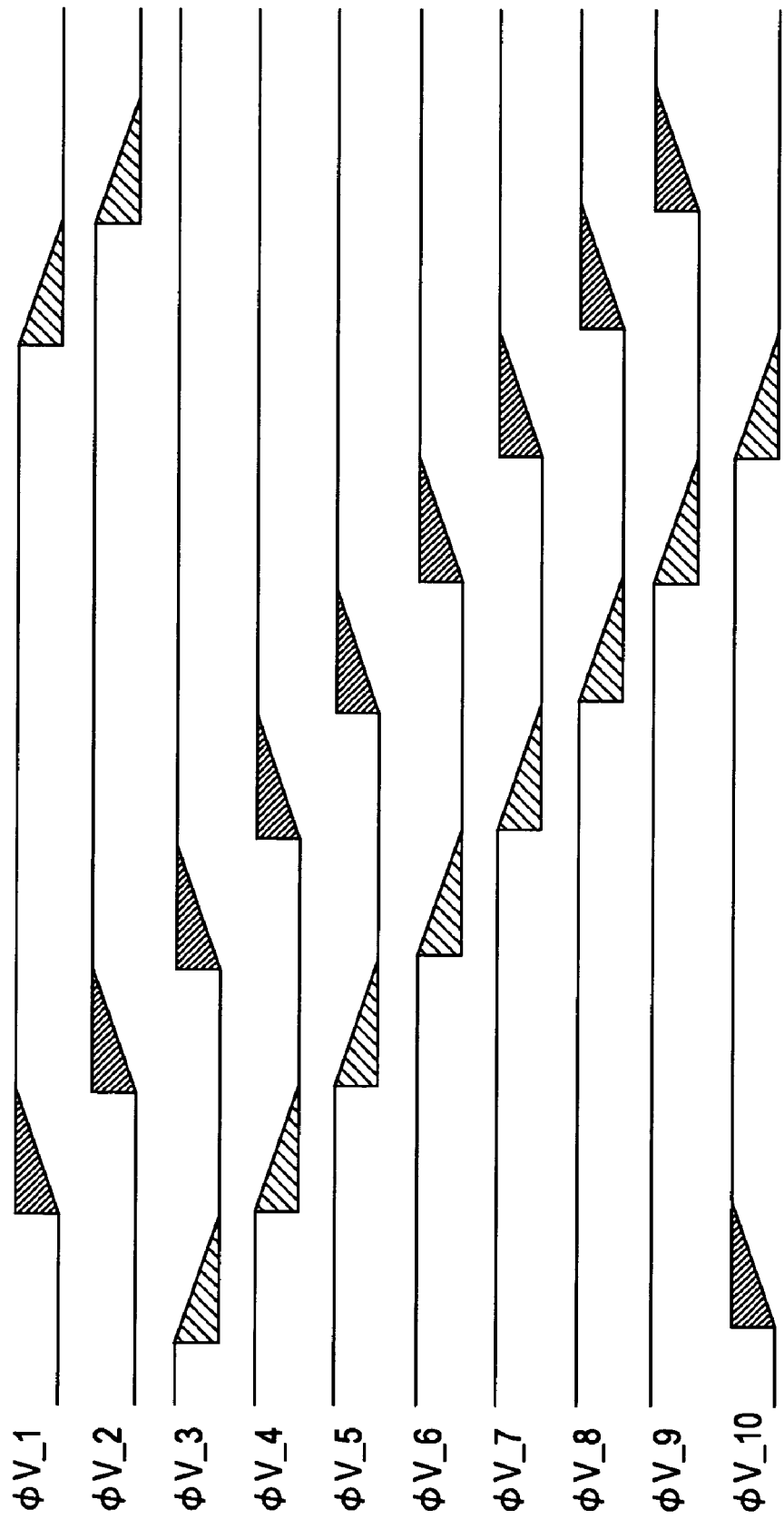
FIG. 18 is an eighth timing chart illustrating a further driving timing.

FIG. 17 illustrates a conventional five-field, ten-phase successive driving method using ten types of vertical transfer pulses ΦV. As shown in FIG. 18, predetermined two types of the ten types are set to be reverse to each other in phase.

When the vertical transfer electrodes 12 are supplied with the substantially rectangular driving signals in the known art as shown in FIG. 4C, the use of the reverse driving method of the first embodiment controls VSUB variations, thereby controlling the video noise component. However, there is a possibility that a slight phase shift leads to a spike voltage fluctuation as video noise.

Second Embodiment Noise Control Technique

Figure 19:
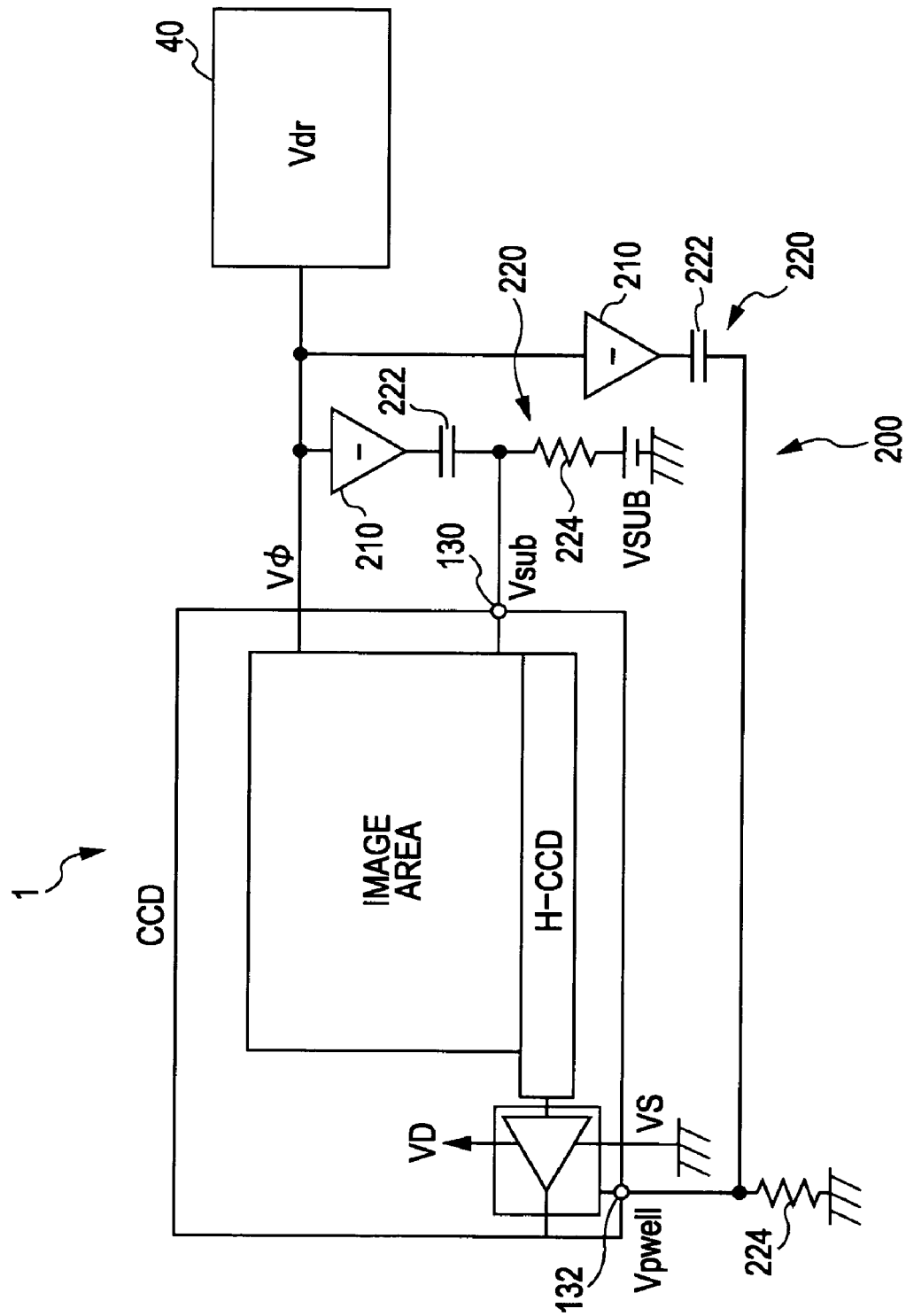
FIG. 19 illustrates a noise control method in accordance with a second embodiment of the present invention.

FIG. 19 illustrates a noise control method in accordance with a second embodiment of the present invention. The noise control method of the second embodiment relates to an active control method that actively controls noise arising from cross-talk noise (coupling noise) induced on PWELL-#2b and the semiconductor substrate SUB in the CCD solid-state image pickup element.

The conventional vertical driver 40 is used as a vertical driver, and vertical transfer pulses ΦV different in phase having a sharp transient characteristic as in the known art are used.

As shown in the sectional view of FIG. 3C, the VSUB terminal 130 on the semiconductor substrate NSUB is supplied with the DC bias Vbias, and the PWELL ground terminal 132 of the PWELL-#2a on the side of the output amplifier 16 is connected to the ground GND. Using these terminals, a noise correction signal is supplied from the outside to cancel the coupling noise.

As shown in FIG. 19, a image pickup device 1 of the second embodiment includes the CCD solid-state image pickup element 30 and the vertical driver 40, each identical to those of the known art. In addition, the image pickup device 1 includes a noise correction signal supply circuit 200 as a feature of the second embodiment of the present invention.

The noise correction signal supply circuit 200 includes a phase inverting circuit (inverting amplifier) 210 for inverting the vertical transfer pulse ΦV supplied from the vertical driver 40 to supply the phase inverted pulse to each of the VSUB terminal 130 and the PWELL ground terminal 132. The noise correction signal supply circuit 200 further includes a waveform shaping circuit 220. The noise correction signal supply circuit 200 thus provides the VSUB terminal 130 and the PWELL ground terminal 132 with a waveform reverse in phase to noise transferred from the output terminal of the vertical driver 40 to the PWELL-#2b and the semiconductor substrate SUB.

The waveform shaping circuit 220 uses the output signal from the phase inverting circuit 210 to generate noise correction signals CompN1 and CompN2 that are reverse in phase from noise Noise1 and Noise2 caused on the PWELL-#2b and the semiconductor substrate SUB. In view of the coupling noise that has differentiated characteristic, a serial circuit of a capacitor 222 and a resistor 224 is arranged to form a CR differentiating circuit in a manner such that the capacitor 222 is arranged on the output side of the phase inverting circuit 210 and that the resistor 224 is arranged the ground GND side of the phase inverting circuit 210. The junction of the capacitor 222 and the resistor 224 is connected to each of the VSUB terminal 130 and the PWELL ground terminal 132. The VSUB terminal 130 is supplied with the DC bias Vbias, and the resistor 224 is connected to the ground GND via the DC bias Vbias.

In accordance with the second embodiment, the vertical transfer pulse ΦV supplied from the output terminal of the vertical driver 40 is inverted in phase by the phase inverting circuit 210. The waveform shaping circuit 220 thus shapes the output signal from the phase inverting circuit 210 into the noise correction signals CompN1 and CompN2 that are reverse in phase from noise Noise1 and Noise2 caused on the PWELL-#2b and the semiconductor substrate SUB, and then supplies the noise correction signals CompN1 and CompN2 to the VSUB terminal 130 and the PWELL ground terminal 132. In this way, the coupling noise Noise1 and Noise2 arising from the cross-talk on the PWELL-#2b and the semiconductor substrate SUB in the CCD solid-state image pickup element is thus cancelled by the noise correction signals CompN1 and CompN2 reverse in phase, and the vertical streak noise is controlled.

Since the coupling noise Noise1 and Noise2 caused on the PWELL-#2b and the semiconductor substrate SUB in the CCD solid-state image pickup element depends on the device characteristic and the transient characteristic of the vertical transfer pulse ΦV, amplifier gain of the phase inverting circuit 210 and the CR time constant of the waveform shaping circuit 220, optimized for a given CCD solid-state image pickup element, are not necessarily optimum for another CCD solid-state image pickup element. The actually optimized noise correction signals CompN1 and CompN2 can be generated by adjusting the amplifier gain and the CR time constant in accordance with the transient characteristics of the CCD solid-state image pickup element and the vertical transfer pulse ΦV.

The noise correction signals CompN1 and CompN2 are generated using a combination of the inverting amplifier and the CR differentiating circuit. This arrangement is quoted for exemplary purposes only. Another circuit arrangement may be employed. It is important that a reverse phase signal be generated in a waveform matching the characteristic of the actual coupling noise Noise1 and Noise2.

The known vertical driver 40 is herein used as a vertical driver, and vertical transfer pulses ΦV different in phase having a sharp transient characteristic as in the known art are used. The vertical transfer pulses ΦV different in phase and having low transient speed disclosed in Japanese Patent Applications Nos. 2004-076598 and 2005-162034 and the noise control method of the first embodiment of reverse phase driving at low transient may be combined.

Third Embodiment Noise Control Technique

FIGS. 20A-20E illustrate a noise control method of a third embodiment of the present invention. The noise control method of the third embodiment relates to a noise control circuit such as a low-pass filter arranged between a vertical driver and a CCD solid-state image pickup element. The third embodiment is largely different from the known art because it is considered important in the known art that the driving signal from the vertical driver should be transferred to a vertical transfer electrode in a form as close as possible to the original shape thereof.

If the vertical transfer pulse ΦV supplied from the vertical driver 40 is supplied to the vertical transfer electrode via the noise control circuit, the cross-talk noise due to spike noise can be reduced even if unpredicted spike noise is generated in the output of the vertical driver.

The known vertical driver 40 is herein used as a vertical driver, and vertical transfer pulses ΦV different in phase having a sharp transient characteristic as in the known art are used. The third embodiment may be combined with the use of the vertical transfer pulses ΦV different in phase and having low transient speed disclosed in Japanese Patent Applications Nos. 2004-076598 and 2005-162034, the noise control method of the first embodiment of reverse phase driving at low transient, and the noise control method of the second embodiment of supplying the noise control signal in phase reverse to the noise generated in the CCD solid-state image pickup element.

The noise control circuit may provide a noise control effect on its own, or may provide a noise control effect in combination with the element function of the vertical driver 40 and a CCD solid-state image pickup element 80.

FIG. 20A illustrates an equivalent circuit of a connection between the known vertical driver and the CCD solid-state image pickup element. As shown in FIG. 20A, the CCD solid-state image pickup element 30 is illustrated as the CCD solid-state image pickup element 80 in the equivalent circuit. The CCD solid-state image pickup element 80 illustrated in the equivalent circuit is identical to the one of FIGS. 4A and 8A only in view of the electrode 601. A capacitor C82 has a capacitance within a range of 100 to 1000 pF, a resistor R1 is on the order of several tens of Ω, and a wiring resistor R82 of the vertical transfer electrode 12 has a resistance within a range from several tens of Ω to several hundreds of Ω.

In contrast, a noise control circuit 310 of FIG. 20B includes a capacitor 316 between a signal line connecting the vertical driver 40 to the vertical transfer electrode 12 and the ground GND. The capacitor 316 forms an RC low-pass filter together with an output resistor Ro of the vertical driver 40 (or output impedance Zo). Even if unpredictable spike noise takes place in the output of the vertical driver 40, the cross-talk noise responsive to the spike noise is thus reduced.

In a first example of FIG. 20B, the output register Ro of the vertical driver 40 and the capacitor 316 form the low-pass filter. The output resistor Ro has typically a small resistance, and to provide sufficient filtering effect, the capacitance of the capacitor 316 is set to be larger than the counterpart in a second example and a third example.

A noise control circuit 320 as the second example shown in FIG. 20C includes a resistor 322 having a resistance larger than the output resistor Ro (or output impedance Zo) in the signal line connecting the vertical driver 40 and the vertical transfer electrode 12, and a capacitor 326 arranged between a signal line extending connecting the resistor 322 to the vertical transfer electrode 12 and the ground GND. The resistor 322 and the capacitor 326 form an RC filter.

The capacitor 326 forms the RC low-pass filter in combination with a serial resistor of the output resistor Ro of the vertical driver 40 (or output impedance Zo) and the resistor 322. Since the resistor 322 has a resistance larger than the output resistor Ro (output impedance Zo), the resistor 322 and the capacitor 326 in practice form the RC low-pass filter. Even if unpredictable spike noise takes place in the output of the vertical driver 40, the cross-talk noise due to the spike noise is reduced.

Since the resistor 322 having a resistance larger than the output resistor Ro (output impedance Zo) and the capacitor 326 form the RC low-pass filter circuit in the second example, a sufficient filter is formed even if the capacitance of the capacitor 326 is set to be smaller than that of the counterpart 316 in the first example. With the resistor 322 inserted, a voltage drop occurs between a grounding resistor R1 and a wiring resistor R82, and there is a possibility that the voltage amplitude of the vertical transfer pulse ΦV supplied to a terminal 801 is reduced leading to a drop in the driving capability.

A noise control circuit 330 as a third example shown in FIG. 20D includes an inductor (coil) 334 in the signal line connecting the vertical driver 40 to the vertical transfer electrode 12. The inductor 334 forming an L type structure has a sufficiently small equivalent resistance. The vertical transfer pulse ΦV is supplied from the vertical driver 40 to the vertical transfer electrode 12 via the inductor 334.

The inductor 334 forms an LC low-pass filter together with the capacitor C82 in the CCD solid-state image pickup element 80. More in detail, since the grounding resistor R1 and the wiring resistor R82 are present in the CCD solid-state image pickup element 80, an RLC low-pass filter is formed.

Even if unpredictable spike noise is created in the output of the vertical driver 40, the cross-talk noise due to the spike noise is reduced. Since the equivalent resistance of the inserted inductor 334 is small, no drop in the driving capability occurs unlike in the second example using the resistor 322.

In a noise control circuit 340 as a fourth example shown in FIG. 20E, an inductor 344 having a small equivalent resistance is arranged in the signal line connecting the vertical driver 40 to the vertical transfer electrode 12. The vertical transfer pulse ΦV is supplied from the vertical driver 40 to the vertical transfer electrode 12 via the inductor 344. Furthermore, a capacitor 346 is arranged between the signal line connecting the inductor 344 to the vertical transfer electrode 12 and the ground GND. An LC structure is thus provided.

The inductor 344 in combination with the capacitor 346 forms an LC low-pass filter. Even if unpredictable spike noise is created in the output of the vertical driver 40, the cross-talk noise due to the spike noise is reduced. Since the equivalent resistance of the inserted inductor 344 is small enough, no drop in the driving capability occurs unlike in the second example using the resistor 322.

The fourth example includes the capacitor 346 in addition to the structure of the third example. The low-pass filter circuit is formed of the capacitor C82 in the CCD solid-state image pickup element 80 (more exactly, in combination with the grounding resistor R1 and the wiring resistor R82). In addition the filter effect of the third example, further filter effect is additionally provided by the capacitor 346.

The capacitor 346 directly works with the inductor 344 while the capacitor C82 in the CCD solid-state image pickup element 80 works with the inductor 344 via the grounding resistor R1 and the wiring resistor R82. Damping effect thus results. If the capacitances of both capacitors are approximately the same, the capacitor 346 offers more filtering effect.

From among the noise control circuits 310-340 of the first through fourth examples, the fourth example provides the least drop in the driving capability and the highest filtering effect. The fourth example offers the best arrangement as an actual application followed by the third example that offers the next least drop in the driving capability.

Fourth Embodiment Noise Control Technique

Figure 21A:
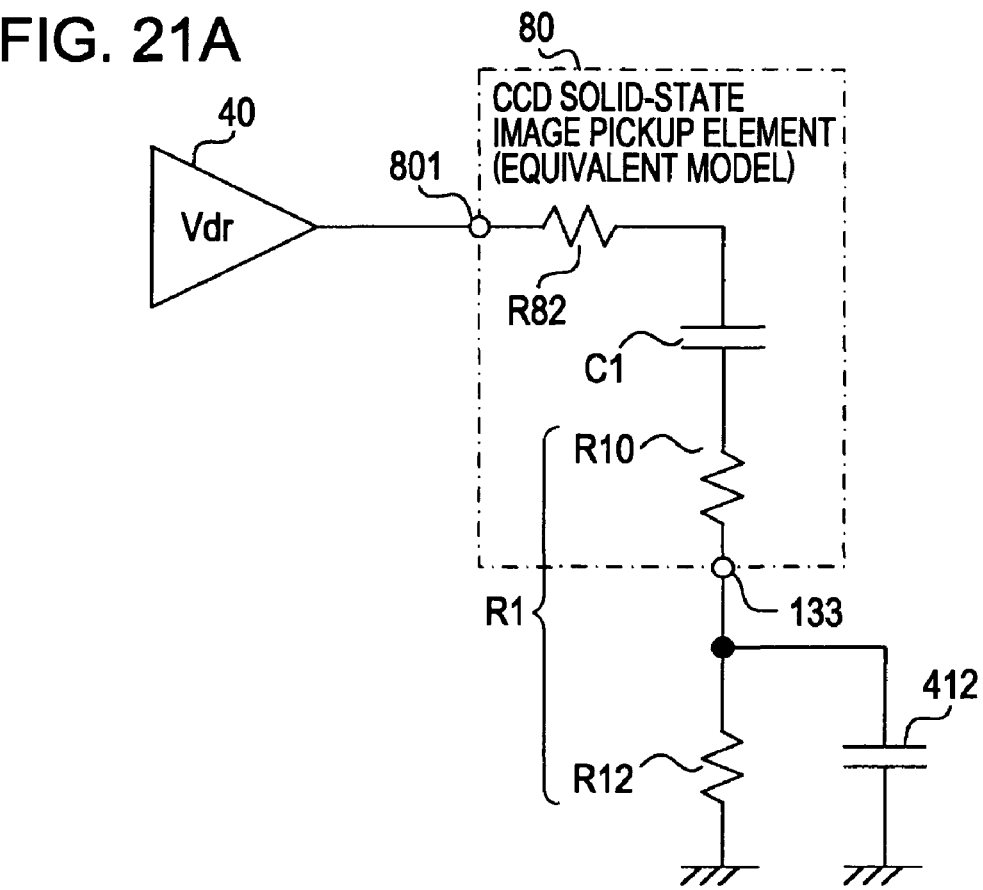
FIGS. 21A and 21B illustrate a noise control method in accordance with a fourth embodiment of the present invention.
Figure 21B:
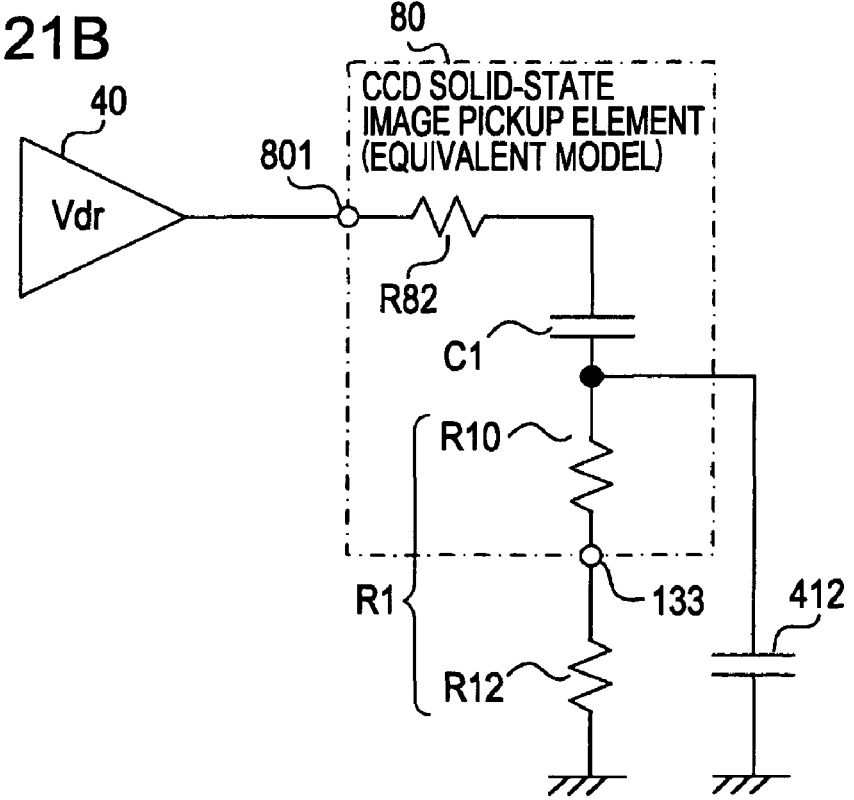

FIGS. 21A and 21B illustrate a noise control method of a fourth embodiment of the present invention. The noise control method of the fourth embodiment improves a sharp change in the output voltage Vout at the rising edge and the falling edge of the vertical transfer pulse ΦV due to the effect of the grounding resistor of the substrate (SUB) by changing the substrate grounding resistor from resistive to capacitive in equivalent circuit.

The known vertical driver 40 is herein used as a vertical driver, and vertical transfer pulses ΦV different in phase having a sharp transient characteristic as in the known art are used. The mechanism of the fourth embodiment may be combined with each of the vertical transfer pulses ΦV different in phase and having low transient speed disclosed in Japanese Patent Application Nos. 2004-076598 and 2005-162034 and the noise control method of each of the first through third embodiments of reverse phase driving at low transient.

As previously discussed with reference to FIGS. 3A-3C and FIGS. 5A1-5B2, the light shielding layer resistor R1 created between the light shielding layer 119 and the ground GND and the substrate resistor R2 of the semiconductor substrate NSUB are present as the grounding resistor. The total grounding resistor R of these resistors is equivalent to the parallel component of the light shielding layer resistor R1 and the substrate resistor R2.

To make the grounding resistance from resistive to capacitive in equivalent circuit, three methods are contemplated. In a first method, the light shielding layer resistor R1 is made capacitive, in a second method the substrate resistor R2 is made capacitive, and in a third method, the first method and the second method are combined. FIGS. 21A and 21B illustrate the first method for changing the light shielding layer resistor R1 from resistive to capacitive.

In the first method, the noise Noise2 arising from the vertical transfer pulse ΦV supplied to the vertical transfer electrode 12 fluctuates the PWELL-#2b of the output amplifier 16 via the coupling capacitor C1, the light shielding layer 119, the light shielding layer resistor R1 and the ground GND. Because of the back gate effect of the transistor 120 forming the output amplifier 16, the noise Noise2 affects the transistor 120. As a result, the first method prevents noise from being superimposed on the output signal, reducing vertical streak noise.

In the second method, the noise Noise1 is induced on the semiconductor substrate NSUB, and because of the back gate effect of the transistor 120 forming the output amplifier 16, the noise Noise1 affects the transistor 120 via the coupling capacitor C3. As a result, the second method prevents noise from being superimposed on the output signal, reducing vertical streak noise.

To change the substrate grounding resistor from resistive to capacitive, a capacitor is connected in parallel with the substrate grounding resistor to form a grounding capacitive type filter. For example, the light shielding layer resistor R1 is basically considered to be an equivalent resistor R10 of the light shielding layer 119. Connecting a capacitor to the equivalent resistor R10 via a terminal 133 is difficult in practice. On the other hand, as previously discussed with reference to FIG. 3C, the protective resistor R12 having a resistance falling within a range from several hundreds of Ω to several tens of kΩ is inserted between the light shielding layer 119 and the ground GND using the terminal 133 to prevent electrostatic breakdown. As shown in FIG. 21A, if a capacitor 412 is connected in parallel to the protective resistor 12 using the terminal 133, the protective resistor R12 as a portion of the light shielding layer resistor R1 is changed from resistive to capacitive in equivalent circuit.

A sharp change occurs in the output voltage Vout (see FIG. 5B2) at the rising edge and the falling edge of the vertical transfer pulse ΦV due to the wiring resistor (the protective resistor R12 as a portion of the light shielding layer resistor R1). By connecting the capacitor 412 in parallel to the protective resistor R12, a signal current flowing at the rising edge and the falling edge of the vertical transfer pulse ΦV is intentionally drained along the capacitor 412. As a result, the sharp voltage change is controlled.

Terminals other than the terminal 133 may be used for connection. The light shielding layer 119 generally covers the CCD solid-state image pickup element 10. If a large number of capacitors 412 are connected at many points to the ground GND, the resulting equivalent circuit of FIG. 21A includes the capacitor 412 connected between the coupling capacitor C1 of the light shielding layer 119 and ground. In this way, the entire light shielding layer resistor R1 becomes capacitive in equivalent circuit.

Although the sharp change occurs in the output voltage Vout (see FIG. 5B2) at the rising edge and the falling edge of the vertical transfer pulse ΦV due to the wiring resistor (the protective resistor R12 as a portion of the light shielding layer resistor R1), the signal current flowing at the rising edge and the falling edge of the vertical transfer pulse ΦV is drained along the capacitor 412 by connecting the capacitor 412 in parallel to the protective resistor R12. As a result, the sharp voltage change is controlled.

FIGS. 21A and 21B illustrate the first method of changing the light shielding layer resistor R1 from resistive to capacitive. If a number of capacitors are arranged in parallel between the semiconductor substrate NSUB and the ground GND, the substrate resistor R2 may be changed from resistive to capacitive in equivalent circuit.

Effect of Variations and Environmental Changes

When the transfer electrodes of the CCD solid-state image pickup element 10 are driven by the driving pulses, the transient speed of the driving pulses may be lowered, or the complementary driving may be employed. In this way, both the high speed driving and the noise control are accomplished at the same time.

The low speed driving pulse signals with a low transient speed are generated by the driver circuit arrangement with the output stage split as shown in FIGS. 7A and 7B and FIGS. 8A and 8B. In this case, the driving pulse is generated based on a time constant unique to characteristic such as a through rate of the output waveform, a minimum output gradient cannot be obtained to assure design margin. Although the output driving capability is varied in response to the load capacitance, the driving capability at the start of transition remains constant. These can be problematic.

When a load as a capacitive reactance is driven by a smooth and mildly inclined gradient, low speed pulse signal, the driving of the load capacitance merely with a constant current is contemplated to maintain the gradient of the driving pulse as disclosed in Japanese Unexamined Patent Application Publication No. 2005-269060. The mere constant current driving is not practical in the image pickup system.

The gradient of the driving pulse also changes in response to variations in the manufacture of load capacitance and variations in the manufacture of driving elements. If there are variations in the load capacitance from channel to channel with respect to the driving characteristic when a plurality of channels are driven, the gradient of the pulse changes from channel to channel.

To reduce the noise component such as spike likely to occur during the transition, the waveform of the pulse input to the prior stage of the driving circuit needs to be smooth. This leads to an initial delay time before the start of the transition of the final pulse output. The delay time depends on variations in the load capacitance and variations in the driving elements.

If the gradient of the output becomes large, noise is likely to remain on images because of CCD noise resistance characteristics. If the gradient of the output becomes small, transition of the current output can overlap the transition of the next output, possibly leading to erratic transfer.

To reduce variations in the manufacture of the load capacitance and variations in the manufacture of the driving elements, feedback control is considered to be effective. In the feedback control, an active pulse signal is measured, and active transient characteristics such as the delay time of the output pulse waveform responsive to the input pulse and the through rate during the transition are converged to desired transient characteristics based on the measurement results. Waveform shaping function with the feedback control applied to the pulse driving waveform is considered to be effective. The circuit arrangement incorporating this function is described below.

Feedback Control Shaping Function to Pulse Driving Waveform

Figure 23:
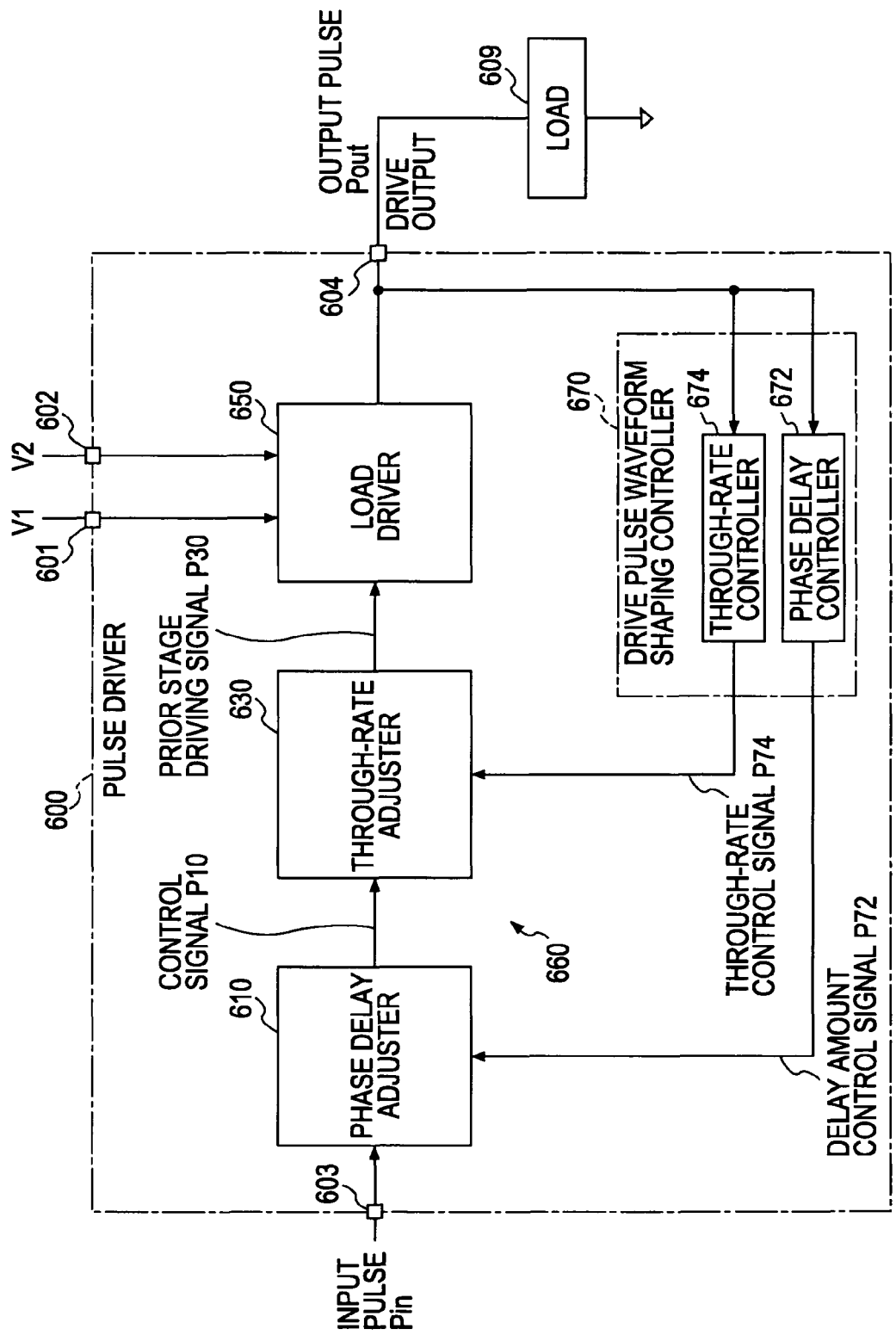
FIG. 23 generally illustrates a pulse driver having a feedback control shaping function for a drive pulse waveform.
Figure 24A:
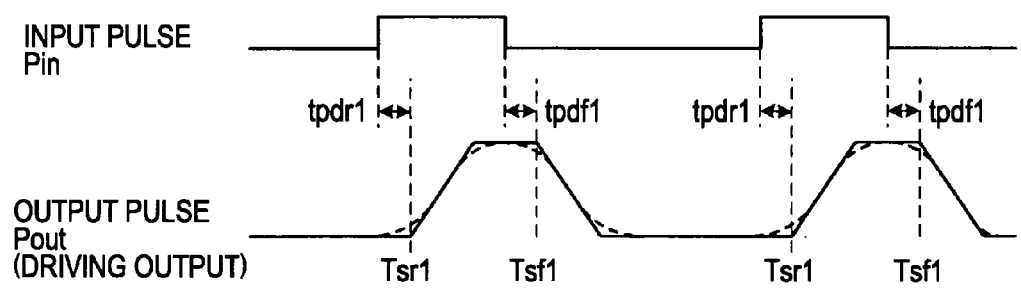
FIGS. 24A and 24B are timing diagrams illustrating operation of the pulse driver of FIG. 23.
Figure 24B:
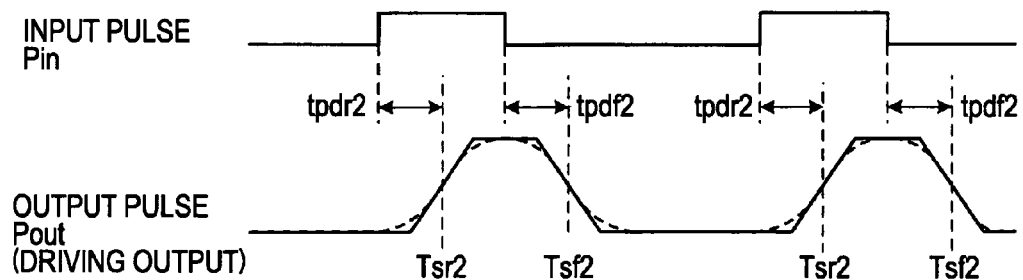
Figure 25A:
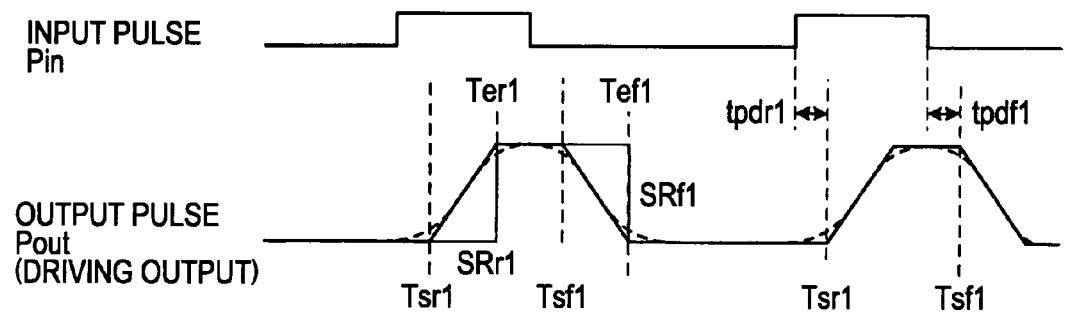
FIGS. 25A and 25B are timing diagrams illustrating the operation of the pulse driver of FIG. 23, particularly, gradient characteristic during transition.
Figure 25B:
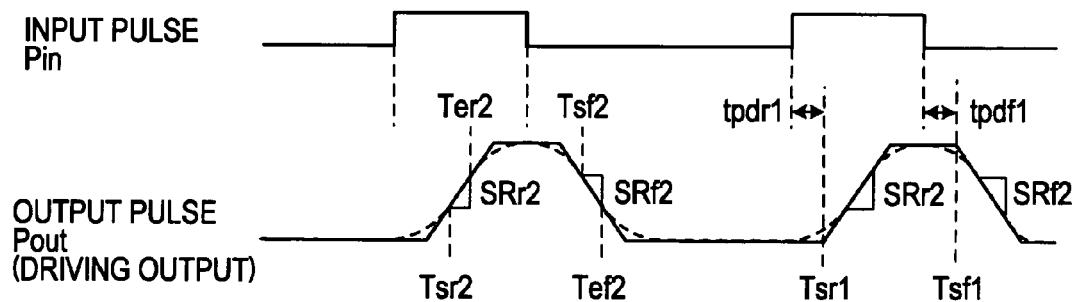

FIG. 23 generally illustrates a pulse driver as one example of a pulse driving device with a feedback control shaping function for pulse driving waveform. FIGS. 25A and 25B are timing diagrams illustrating operation of the pulse driver of FIG. 23, particularly, the gradient characteristic of transition. FIGS. 24A and 24B illustrate in detail an amount of phase delay.

As shown in FIG. 23, in a pulse driver 600, a voltage V1 defining the high level voltage of the driving pulse is input to a terminal 601, and a voltage V2 defining the low level voltage of the driving pulse is input to a terminal 602. An input pulse Pin at a logic level (for example, 0 V/5 V or 0 V/3 V) supplied from a pulse signal generator (not shown) is input to a terminal 603, and a load 609 having a capacitive reactance or an inductive reactance is connected to a terminal 604. An output pulse Pout appears at a terminal 604.

The pulse driver 600 includes a phase delay adjuster 610, a through rate adjuster (variation characteristic adjuster) 630, and a load driver 650. The phase delay adjuster 610 adjusts a delay timing of the input pulse Pin input at the logic level from the terminal 603, namely, a phase delay amount (one of transient characteristics of the output pulse waveform at the terminal 604 as a junction to the load 609). The through rate adjuster 630 adjusts a through rate indicating variations in the transient characteristics of the output pulse waveform at the terminal 604 as the junction to the load 609 while generating a prior stage driving signal P30 in response to a control signal P10 from the phase delay adjuster 610. The load driver 650 drives the load 609 in response to a prior stage driving signal P30 from the through rate adjuster 630. The load driver 650 applies to the load 609 the output pulse Pout in response to capability corresponding to the prior stage driving signal P30 supplied from the through rate adjuster 630.

The phase delay adjuster 610, the through rate adjuster 630, and the load driver 650 constitute a waveform shaping processor 660 that performs a predetermined waveform shaping process to the input pulse signal.

The pulse driver 600 includes a drive pulse waveform shaping controller 670. The drive pulse waveform shaping controller 670 monitors the output pulse waveform at the terminal 604, and controls the adjustment function of the phase delay adjuster 610 and the through rate adjuster 630 based on the monitoring results. The pulse driver 600 thus performs feedback control so that active transient characteristics, such as a delay time of the output pulse Pout at the terminal 604 responsive to the input pulse Pin, and a through rate at transition, converge to target transient characteristics.

The drive pulse waveform shaping controller 670 includes a phase delay controller 672 serving as a functional element controlling the phase delay adjuster 610, and a through rate controller 674 serving a functional element controlling the through rate adjuster 630.

The phase delay controller 672 performs feedback control. More specifically, the phase delay controller 672 supplies a delay amount control signal P72 to the phase delay adjuster 610 so that a delay amount of the output pulse Pout responsive to the input pulse Pin converges to a target value (typically so that a deviation to the value stated in specifications becomes zero) while monitoring the output pulse Pout at the terminal 604.

The through rate controller 674 performs feedback control. More specifically, the through rate controller 674 supplies a through rate control signal P74 to the through rate adjuster 630 so the through rate indicating the variation characteristic of the output pulse Pout converges to a target value (typically so that a deviation to the value stated in specifications becomes zero) while monitoring the output pulse Pout at the terminal 604.

The phase delay adjuster 610 delays the input pulse Pin input via the terminal 603 by a duration of time externally or internally set, and supplies the delayed control signal P10 to the through rate adjuster 630.

The phase delay adjuster 610 may handle the once set delay amount as a fixed amount. Alternatively, the phase delay adjuster 610 may dynamically adjust the delay amount (in response to the current state) in response to the delay amount control signal P72 from the phase delay controller 672 in the drive pulse waveform shaping controller 670. A mechanism for adjusting the delay amount will be described later.

A variety of methods of setting the delay amount of the control signal P10 with respect to the input pulse Pin are available. As shown in FIG. 24A, for example, one method manages a delay amount tpdr1 from the rising edge of the input pulse Pin to a transition start point Tsr1 at the rising edge of the output pulse Pout (pulse waveform actually driving the load 609) at the terminal 604, or a delay amount tpdf1 from the falling edge of the input pulse Pin to a transition start point Tsf1 at the falling edge of the output pulse Pout.

The phase delay controller 672 may perform this method using feedback control. More specifically, the phase delay controller 672 detects time at which the output pulse Pout actually starts transitioning, compares the detection result with an internally set reference value, supplies the delay amount control signal P72 to the phase delay adjuster 610 so that an error becomes zero. The setting value may be updated.

As shown in FIG. 24B, another method manages a delay amount tpdr2 from the rising edge of the input pulse Pin to a predetermined voltage point Tsr2 in the rising edge of the output pulse Pout (at a midpoint between the voltage V1 and the voltage V2) or a delay amount tpdf2 from the falling edge of the input pulse Pin to a predetermined voltage point Tsf2 in the falling edge of the output pulse Pout.

During the feedback control, the phase delay controller 672 detects time from the start of the transition of the output pulse Pout to the predetermined voltage point Tsr2 or Tsf2, compares the detected result with a reference value internally or externally set, and supplies the delay amount control signal P72 to the phase delay adjuster 610 so that an error converges to zero. The setting value may be updated.

In the former method of FIG. 24A, the transition start points Tsr1 and Tsf1 of the active pulse waveform at the terminal 604 need to be identified. As shown in FIG. 24A, the pulse mildly changes as represented by broken line, and it is difficult to accurately measure the transition start points Tsr1 and Tsf1. In the latter method of FIG. 24B, the measurement of the predetermined voltage points Tsr2 and Tsf2 that are relatively stable subsequent to the start of the transition is easy to perform.

In either way, the delay amounts tpdr1 and tpdr2 and the delay amounts tpdf1 and tpdf2 may be commonly or separately set.

The through rate adjuster 630 adjusts the amplitude of the prior stage driving signal P30 to be supplied to the load driver 650, thereby adjusting the through rate at a point (terminal 604) where the load driver 650 drives the load 609.

More specifically, upon detecting an output transition (the start of the rising edge or the falling edge) of the delay-amount adjusted control signal P10 output from the phase delay adjuster 610, the through rate adjuster 630 supplies to the load driver 650 the prior stage driving signal P30 having characteristics corresponding to the load driving capability of the load driver 650. When the load driver 650 drives the load 609, the prior stage driving signal P30 is used to cause the output pulse Pout at the terminal 604 to have target through rate characteristic taking into consideration the relationship between the load driver 650 and the load 609. If the load 609 is not only a resistance but also a capacitive reactance or an inductive reactance, an integrating effect is involved. As shown in FIGS. 24A and 24B, and FIGS. 25A and 25B, a signal applied to the load 609 becomes typically different from the original output pulse Pout.

The through rate adjuster 630 handles the through rate once set as a fixed one. Alternatively, the through rate adjuster 630 may dynamically adjust the through rate (in an active state) in response to the through rate control signal P74 from the through rate controller 674 in the drive pulse waveform shaping controller 670. A mechanism for adjusting the through rate will be described later.

A variety of methods are available to set the through rate to the control signal P10. As shown in FIG. 25A, for example, one method may manage variation characteristic (through rate) SRr1 from a voltage at a rising edge start point Tsr1 of the output pulse Pout to a voltage at a rising edge end point Ter1, or variation characteristic (through rate) SRf1 from a voltage at a falling edge start point Tsf1 of the output pulse Pout to a voltage at a falling end point Tef1.

As shown in FIG. 25B, another method may manage variation characteristic (through rate) SRr2 between two predetermined voltage points Tsr2 (at approximately lower one-third level of the voltage between V1 and V2) and Ter2 (at approximately upper one-third level of the voltage between V1 and V2) of the rising edge of the output pulse Pout or variation characteristic (through rate) SRf2 between two predetermined voltage points Tsf2 (at approximately upper one-third level of the voltage between V1 and V2) and Tef2 (at approximately lower one-third level of the voltage between V1 and V2) of the output pulse Pout of the falling edge of the output pulse Pout.

The through rate controller 674 performs one of these methods during feedback control. More specifically, the through rate controller 674 detects an amount equal to a rate of change between these two voltages of the output pulse Pout, compares the detection result with a reference value set internally or externally, and supplies the through rate control signal P74 to the through rate adjuster 630 so that the error becomes zero. The setting value may be updated.

In the former method of FIG. 25A, the transition start points Tsr1 and Tsf1 and the transition end points Ter1 and Tef1 of the active pulse waveform at the terminal 604 need to be identified. As with the difficulty with the identifying the rising edge delay amount tpdr1 and the falling edge delay amount tpdf1, the accurate measurement of the start points and the end points is difficult. It should be noted that the output pulse Pout may mildly start the rising edge and the falling edge as represented by broken lines in FIG. 25A, and that high-frequency noise may be induced in the vicinity of the transition start points. In the latter method of FIG. 25B, corresponding to the rising time delay amount tpdr2 and the falling time delay amount tpdf2, variation characteristic between the two voltages that are stable subsequent to the start of the transition is easily identified.

In either case, the rising edge through rates SRr1 and SRr2 and the falling edge through rates SRf1 and SRf2 may be commonly or separately set.

The phase delay controller 672 may estimate the transition start point Tsr1 of the rising edge and the transition end point Tsf1 of the falling edge of the output pulse Pout based on the through rate SRr2 between the predetermined two voltages in the rising edge of the output pulse Pout and the through rate SRf2 between the predetermined two voltages in the falling edge of the output pulse Pout, determined by the through rate controller 674. In the output pulse Pout illustrated on a right portion of FIG. 25B, the transition start point Tsr1 of the rising edge and the transition start point Tsf1 of the falling edge are found in lines extended from lines used to determine the through rates SRr2 and SRf2.

In the present embodiment, the feedback control is performed on the delay amount and the variation characteristic (through rate at the transition) of the output pulse Pout at the terminal 604 with respect to the input pulse Pin. If strictly controlling both the delay amount and the variation characteristic is not necessary, the feedback control may be performed on one of the delay amount and the variation characteristic.

If the delay amount at the rising edge and the delay amount at the falling edge vary unevenly, the through rate is also affected. Conversely, the through rate may change the rising edge characteristic and the falling edge characteristic, and as a result, the delay amount is affected. In practice, the delay amount and the variation characteristic mutually affect each other. The feedback control is thus preferably performed on both the delay amount and the variation characteristic.

In the pulse driver 600, the load driver 650 drives the load 609. The drive pulse waveform shaping controller 670 monitors the active output pulse Pout at the terminal 604 and performs the feedback control so that the transition characteristics of the output pulse Pout, such as the delay amount and the variation characteristic of the output pulse Pout with respect to the input pulse Pin, become target values.

The transition characteristic of the output pulse Pout is designed to be free from variations in the manufacture of the load 609 and variations in the manufacture of the driving element arranged at the output stage of the load driver 650. The load 609 is thus pulse driven at optimum transition characteristic. Furthermore, the transition characteristic is designed to be free from environmental changes such as temperature change and humidity change.

The driving capability of the load driver 650 and the characteristics of the load 609 (equivalent input capacitance and equivalent input inductance) may change in response to parasitic components unpredictable at design stage (such as parasitic capacitance and parasitic inductance), variations in manufacture of the load 609, and environmental changes such as temperature change or humidity change. In that case, the delay amount of the output pulse Pout with respect to the input pulse Pin and the gradient of the output pulse Pout may be adjusted so that the transition characteristics of the driving output (such as the delay amount and the through rate) fall within the specifications.

With the mechanism of the present embodiment, the driving signal has a constant delay amount and a constant gradient in the driving circuit of the reactance load regardless of the variations in the load characteristic and the driving characteristic and the environmental change. Even if the output timing is determined to meet requirements of the load 609 in system specifications, a driving waveform has a high degree of repeatability with a minimum error within the range of specifications of the delay amount and the through rate.

Load Driver for Capacitive Reactance Load

Figure 26:
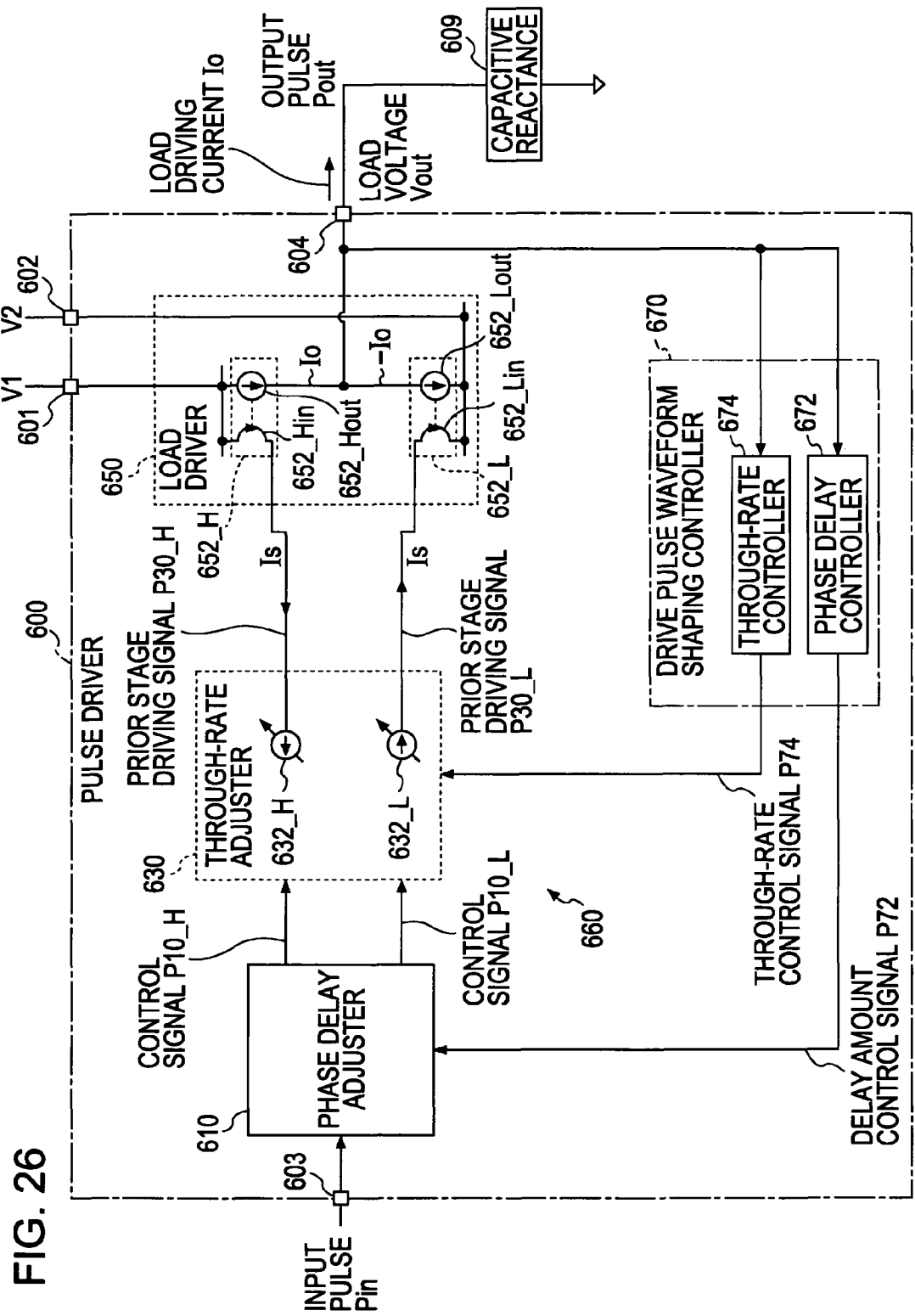
FIG. 26 illustrates in detail the pulse driver of FIG. 23 driving a capacitive reactance load.
Figure 27:
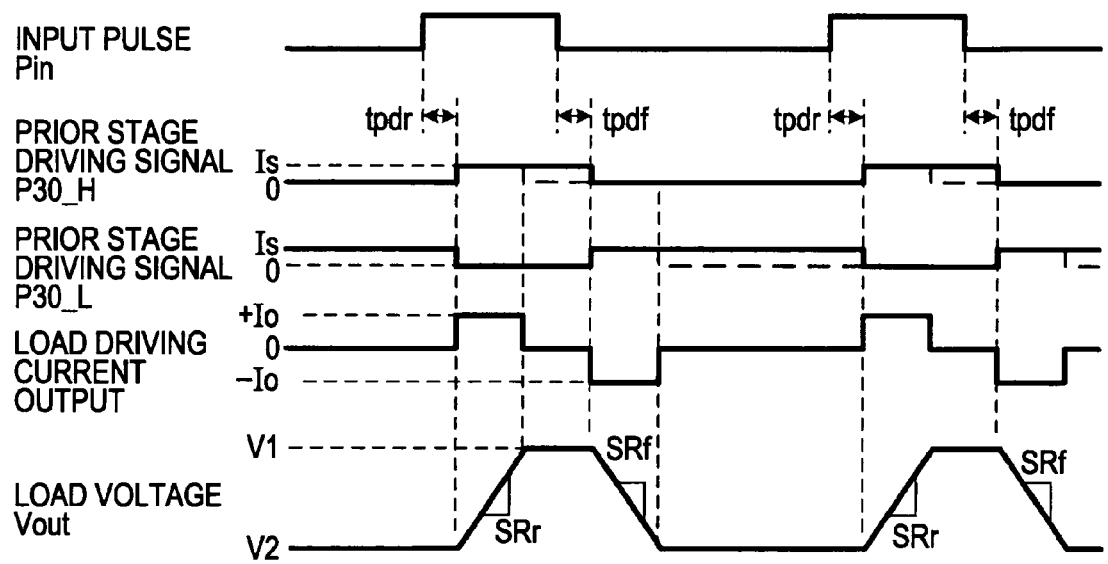
FIG. 27 is a timing diagram illustrating the operation of the pulse driver of FIG. 26.

FIG. 26 is a block diagram of the load driver 650 that is an example of the pulse driver 600 of FIG. 23. The load driver 650 drives the load 609 having a capacitive reactance. FIG. 27 is a timing diagram illustrating operation of the pulse driver 600 of FIG. 26.

When the load 609 is a capacitive reactance load, the load driver 650 includes a current output circuit to current drive the load 609. The through rate adjuster 630 is designed so that the prior stage driving signal P30 appropriate for current driving by the load driver 650 is supplied to the load driver 650.

More specifically, the through rate adjuster 630 includes current output sections 632_H and 632_L. The current output sections 632_H and 632_L output to the load driver 650 prior stage driving signal P30_H and prior stage driving signal P30_L mutually complementary to each other, and representing a reference current Is determining the gradient of the rising edge or the falling edge of the output pulse Pout.

The load driver 650 includes a current mirror circuit 652_H and a current mirror circuit 652_L. Upon receiving the voltage V1 defining the voltage at a high level supplied to the terminal 601, the current mirror circuit 652_H outputs a constant current Io to the terminal 604. Upon receiving the voltage V2 defining the voltage at a low level supplied to the terminal 602, the current mirror circuit 652_L sinks the constant current Io from the terminal 604. In other words, the load driver 650 is composed of a pair of upper and lower current mirror circuits 652_H and 652_L.

An output stage 652_Hout of the current mirror circuit 652_H and an output stage 652_Lout of the current mirror circuit 652_L are connected to each other at a junction 656 (corresponding to a current adder), which is in turn connected to the load 609 via the terminal 604. An input stage 652_Hin of the current mirror circuit 652_H is connected to a current output section 632_H of the through rate adjuster 630, and an input stage 652_Lin of the current mirror circuit 652_L is connected to a current output section 632_L of the through rate adjuster 630.

The through rate adjuster 630 is separately supplied with a control signal P10_H corresponding to the delay amount at the rising edge and a control signal P10_L corresponding to the delay amount at the falling edge.

The through rate adjuster 630 supplies the input stage 652_Hin of the current mirror circuit 652_H with the prior stage driving signal P30_H responsive to the control signal P10_H via the current output section 632_H, and the input stage 652_Lin of the current mirror circuit 652_L with the prior stage driving signal P30_L responsive to the control signal P10_L via the current output section 632_L.

With this arrangement, the through rate adjuster 630 outputs to the load driver 650 the prior stage driving signals P30_H and P30_L representing the reference current Is determining the gradient of the rising edge or the falling edge of the output pulse Pout. The load driver 650, including the pair of upper and lower current mirror circuits 652_H and 652_L, multiplies the reference current Is of each of the rising edge and the falling edge generated by the through rate adjuster 630, by a constant (xNH and xNL) while duplicating the current. The output current Iout is then supplied to the load 609 having a capacitive reactance.

In practice, an output current Iout_H (=+Io) is supplied from the upper side current mirror circuit 652_H to the load 609 (in a source operation) while the lower side current mirror circuit 652_H sinks an output current Iout_L (=−Io) from the load 609 (in a sink operation).

The load voltage Vout generated at the terminal 604 is determined by dividing the integration of the output current Iout supplied to the load 609 by a capacitance value of the load 609. As shown in FIG. 27, if a constant current is continuously applied to the load 609 (capacitive load) having a capacitive reactance during the transition period, the load voltage Vout linearly changes to the power supply voltage V1 of the current mirror circuit 652_H or the power supply voltage V2 of the current mirror circuit 652_L.

When the load voltage Vout reaches the power supply voltage V1, the output stage 652_Hout of the upper side current mirror circuit 652_H loses its constant current feature, and is connected to the power supply voltage V1 via the equivalent resistor thereof. The load voltage Vout is thus fixed to the power supply voltage V1. When the load voltage Vout reaches the power supply voltage V2, the output stage 652_Lout of the lower side current mirror circuit 652_L loses its constant current feature, and is connected to the power supply voltage V2 via the equivalent current thereof. The load voltage Vout is thus fixed to the power supply voltage V2.

As the prior stage driving signal P30_H supplied from the current output section 632_H of the through rate adjuster 630 to the current mirror circuit 652_H, the reference current Is is reliably supplied to the input stage 652_Hin during a period from the start of the rising edge of the output pulse Pout until the load voltage Vout reaches the power supply voltage V1 (in practice, in the sink operation), and the supply of the reference current Is to the input stage 652_Hin stops before the current mirror circuit 652_L starts to operate.

As the prior stage driving signal P30_L supplied from the current output section 632_L of the through rate adjuster 630 to the current mirror circuit 652_L, the reference current Is is reliably supplied to the input stage 652_Lin during a period from the start of the falling edge of the output pulse Pout until the load voltage Vout reaches the power supply voltage V2 (in practice, the source operation), and the supply of the reference current Is to the input stage 652_Lin stops before the upper side current mirror circuit 652_H starts to operate.

The variation characteristic of the output pulse Pout, namely, the load voltage Vout is defined by the driving current Io supplied to the load 609 (source current Io and sink current Io), the driving current Io is defined by the reference current Is output from the current output sections 632_H and 632_L of the through rate adjuster 630 (sink current Is and source current Is), and the reference current Is is defined by the through rate control signal P74. During the feedback control, the variation characteristic of the load voltage Vout (through rate) is varied by adjusting the through rate control signal P74.

The load 609 is constructed of a capacitive reactance. The capacitive reactance load is driven in response to the constant current Io by the current mirror circuits 652_H and 652_L during the output transition period. The drive pulse waveform shaping controller 670 monitors the output pulse Pout, thereby performing the feedback control. Under the control of the phase delay controller 672, the load voltage Vout of the output pulse Pout has a constant delay amount to the input pulse Pin. Under the control of the through rate controller 674, the load voltage Vout of the output pulse Pout is transitioned at a constant through rate.

The driving circuit for driving the capacitive reactance load of FIG. 26 thus causes the driving signal (load voltage signal) to have a constant delay and to transition at a constant gradient regardless of variations in the load capacitance and the driving characteristic and environmental changes. Even if the output timing is determined to meet requirements of the load 609 in system specifications, a driving waveform has a high degree of repeatability with a minimum error within the range of specifications of the delay amount and the through rate.

Load Driver for Inductive Reactance Load

Figure 28:
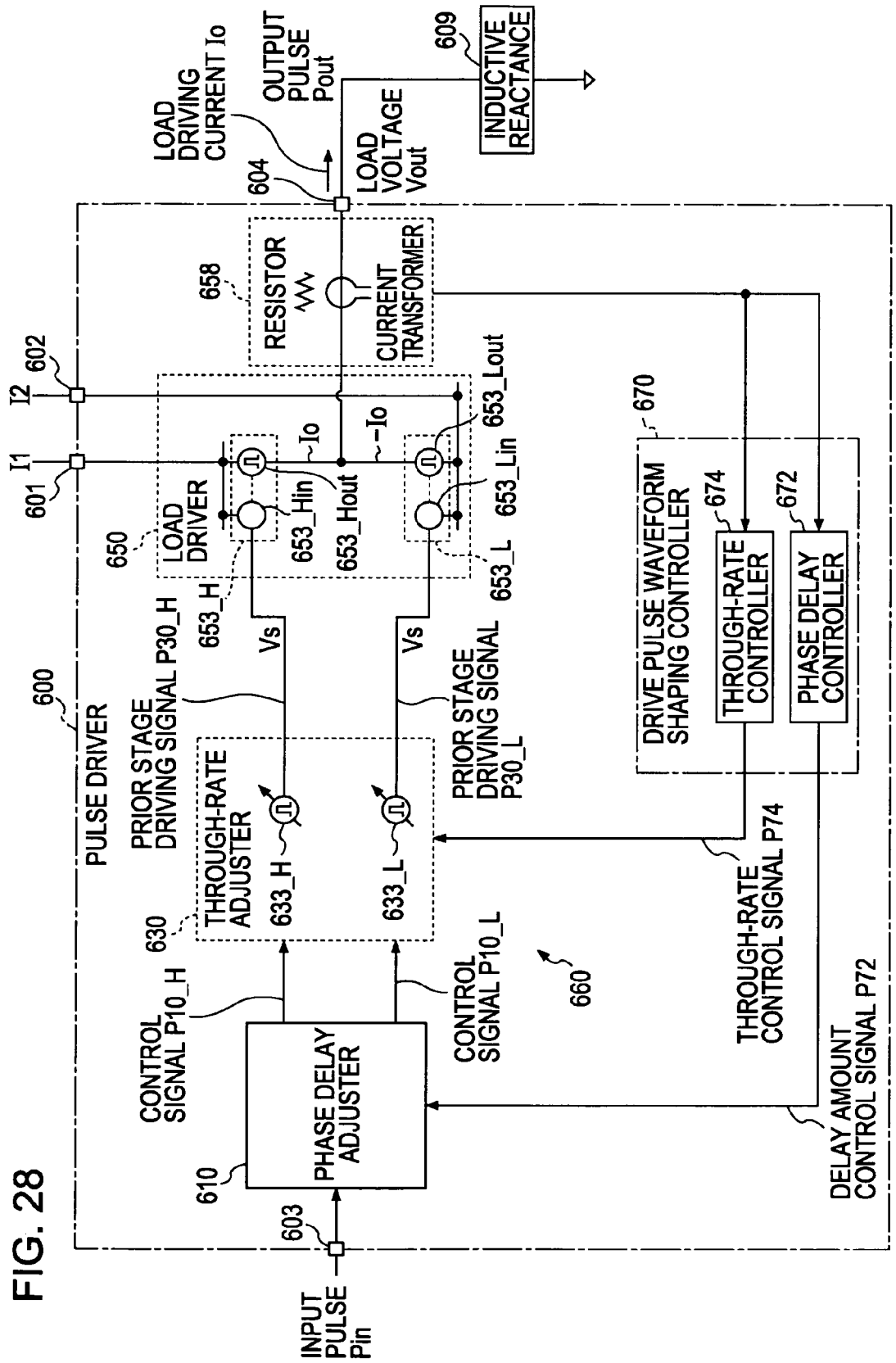
FIG. 28 illustrates in detail the pulse driver of FIG. 23 driving an inductive reactance load.
Figure 29:
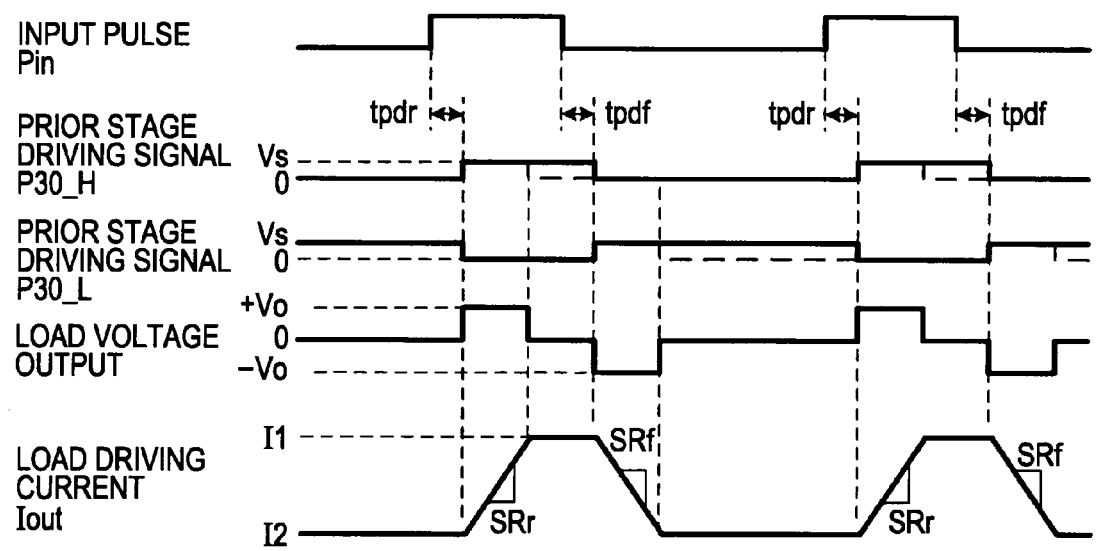
FIG. 29 is a timing diagram illustrating the operation of the pulse driver of FIG. 28.

FIG. 28 is a block diagram of the load driver 650 that is an example of the pulse driver 600 of FIG. 23. The load driver 650 drives the load 609 having an inductive reactance. FIG. 29 is a timing diagram illustrating operation of the pulse driver 600 of FIG. 28.

The driving circuit for driving the load 609 having the inductive reactance is a voltage output circuit for voltage driving the load 609 as opposed to the current driving for the load 609 having the capacitive reactance. The through rate adjuster 630 is designed to supply the load driver 650 with the prior stage driving signal P30 appropriate for the voltage driving by the load driver 650.

More specifically, the through rate adjuster 630 includes voltage output section 633_H and 633_L for outputting prior stage driving signals P30_H and P30_L mutually complementary to each other and representing a reference voltage Vs determining the gradient of the rising edge or the falling edge of the output pulse Pout.

The load driver 650 includes a constant voltage output circuit 653_H and a constant voltage output circuit 653_L. Upon receiving a current I1 defining a current at high level to be supplied to a terminal 601, the constant voltage output circuit 653_H supplies a constant voltage V0 to a terminal 604. Upon receiving a current I2 defining a current at low level supplied to a terminal 602, the constant voltage output circuit 653_L supplies a constant voltage V0 to the terminal 604. The load driver 650 is thus composed of a pair of upper and lower constant voltage output circuits 653_H and 653_L.

A circuit for applying a voltage V1 to the terminal 601 to supply the constant current I1 to the constant voltage output circuit 653_H may be arranged. A circuit for applying a voltage V2 to the terminal 602 to supply the constant current I2 to the constant voltage output circuit 653_L may be arranged.

A voltage adder 657 may be arranged between an output stage 653_Hout of the constant voltage output circuit 653_H and an output stage 653_Lout of the constant voltage output circuit 653_L. The voltage adder 657 adds the upper voltage to the lower voltage and supplies the voltage sum to the terminal 604. An input stage 653_Hin of the constant voltage output circuit 653_H is connected to the voltage output section 633_H of the through rate adjuster 630. An input stage 653_Lin of the constant voltage output circuit 653_L is connected to the voltage output section 633_L of the through rate adjuster 630.

A load current detector 658 is arranged between the load driver 650 and the load 609. With the load current detector 658, the drive pulse waveform shaping controller 670 monitors a load driving current between the load driver 650 and the terminal 604. The drive pulse waveform shaping controller 670 thus performs feedback control so that the active transition characteristics such as the delay time and the through rate of the output pulse Pout at the terminal 604 with respect to the input pulse Pin during transition converge to target transition characteristics.

The load current detector 658 simply transfers a detected signal responsive to the load driving current to the drive pulse waveform shaping controller 670. As shown in the functional block diagram of FIG. 28, the load current detector 658 may perform one of a variety of methods including directly detecting a current with a current transformer, or using a current-to-voltage conversion function for inserting a current detecting resistor in line and detecting voltages at both ends of the resistor. If the current itself is detected, the drive pulse waveform shaping controller 670 converts the detected current into a voltage signal.

If the vertical driver is constructed of an integrated circuit (IC), it is difficult to include a current transformer in the IC. Including all related wirings into the IC is difficult. In practice, the current transfer is arranged between the terminal 604 and the load 609, and the detected signal is then supplied to the drive pulse waveform shaping controller 670 in the IC. The current detecting resistor, if employed, may be inserted between the voltage adder 657 and the terminal 604, and all related wirings may be contained into the IC.

The constant voltage output circuits 653_H and 653_L, as opposed to the current mirror circuits 652_H and 652_L, multiplies input voltages to the input stages 653_Hin and 653_Lin by a constant number, and then outputs the resulting voltages from the output stages 653_Hout and 653_Lout, respectively. Any circuit arrangement is acceptable as long as this function is performed.

With this arrangement, the through rate adjuster 630 outputs to the load driver 650 the prior stage driving signals P30_H and P30_L representing the reference voltage Vs and determining the gradient of the rising edge or the falling edge of the output pulse Pout. The load driver 650, composed of the upper side and lower side constant voltage output circuits 653_H and 653_L, multiplies the reference voltage Vs of each of the rising edge and the falling edge generated by the through rate adjuster 630, by a constant (xNH and xNL) while duplicating the voltage. The output voltage Vout is then supplied to the load 609 having an inductive reactance.

In practice, the upper side constant voltage output circuit 653_H provides the load 609 with an output voltage Vout_H (=+Vo) (in a source operation) while the lower side constant voltage output circuit 653_L provides the load 609 with an output voltage Vout_L (=−Vo) (in a sink operation).

A load current Iout generated at the terminal 604 is obtained by dividing the integration of the output voltage Vout supplied to the load 609 by an inductance value of the load 609. If a constant voltage is continuously applied to the load 609 having an inductive reactance during the transition period as shown in FIG. 29, the load current Iout changes linearly until the load current Iout reaches the power supply current I1 of the constant voltage output circuit 653_H or the power supply current I2 of the constant voltage output circuit 653_L.

When the load current Iout reaches the power supply current I1, the output stage 653_Hout of the upper side constant voltage output circuit 653_H loses the constant voltage feature thereof, and is connected to the power supply current I1 via the equivalent resistance thereof. The load current Iout is thus fixed to the power supply current I1. Conversely, if the load current Iout reaches the power supply current I2, the output stage 653_Lout of the constant voltage output circuit 653_L loses the constant voltage feature thereof, and is connected to the power supply current I2 via the equivalent resistance thereof. The load current Iout is thus fixed to the power supply current I2.

As the prior stage driving signal P30_H to be supplied from the voltage output section 633_H of the through rate adjuster 630 to the constant voltage output circuit 653_H, any voltage is acceptable as long as the reference voltage Vs is reliably supplied to the input stage 653_Hin from the start point of the rising edge of the output pulse Pout until the load current Iout reaches the power supply current I1 (in a sink operation, in practice), and the supply of the reference voltage Vs to the input stage 653_Hin stops before the lower side constant voltage output circuit 653_L starts to operate.

As the prior stage driving signal P30_L to be supplied from the voltage output section 633_L of the through rate adjuster 630 to the constant voltage output circuit 653_L, any voltage is acceptable as long as the reference voltage Vs is reliably supplied to the input stage 653_Lin from the start point of the falling edge of the output pulse Pout until the load current Iout reaches the power supply current I2 (in a source operation, in practice), and the supply of the reference voltage Vs to the input stage 653_Lin stops before the upper side constant voltage output circuit 653_H starts to operate.

The load 609 is an inductive reactance load. The inductive reactance load 609 is thus driven by the constant voltage output circuits 653_H and 653_L in response to the constant voltage V0 during the output transition period while the drive pulse waveform shaping controller 670 performs the feedback process while monitoring the output pulse Pout. Under the control of the phase delay controller 672, the load current Iout of the output pulse Pout is controlled to have a constant delay time. Under the control of the through rate controller 674, the load current Iout of the output pulse Pout is controlled to transition at a constant through rate.

The driving circuit for driving the inductive reactance load of FIG. 28 thus causes the driving signal (load current signal) to have a constant delay and to transition at a constant gradient regardless of variations in the load inductance and the driving characteristic and environmental changes. Even if the output timing is determined to meet requirements of the load 609 (such as a motor winding) in system specifications, a driving waveform has a high degree of repeatability with a minimum error within the range of specifications of the delay amount and the through rate.

Construction of Phase Delay Adjuster and Through Rate Adjuster

Figure 30:
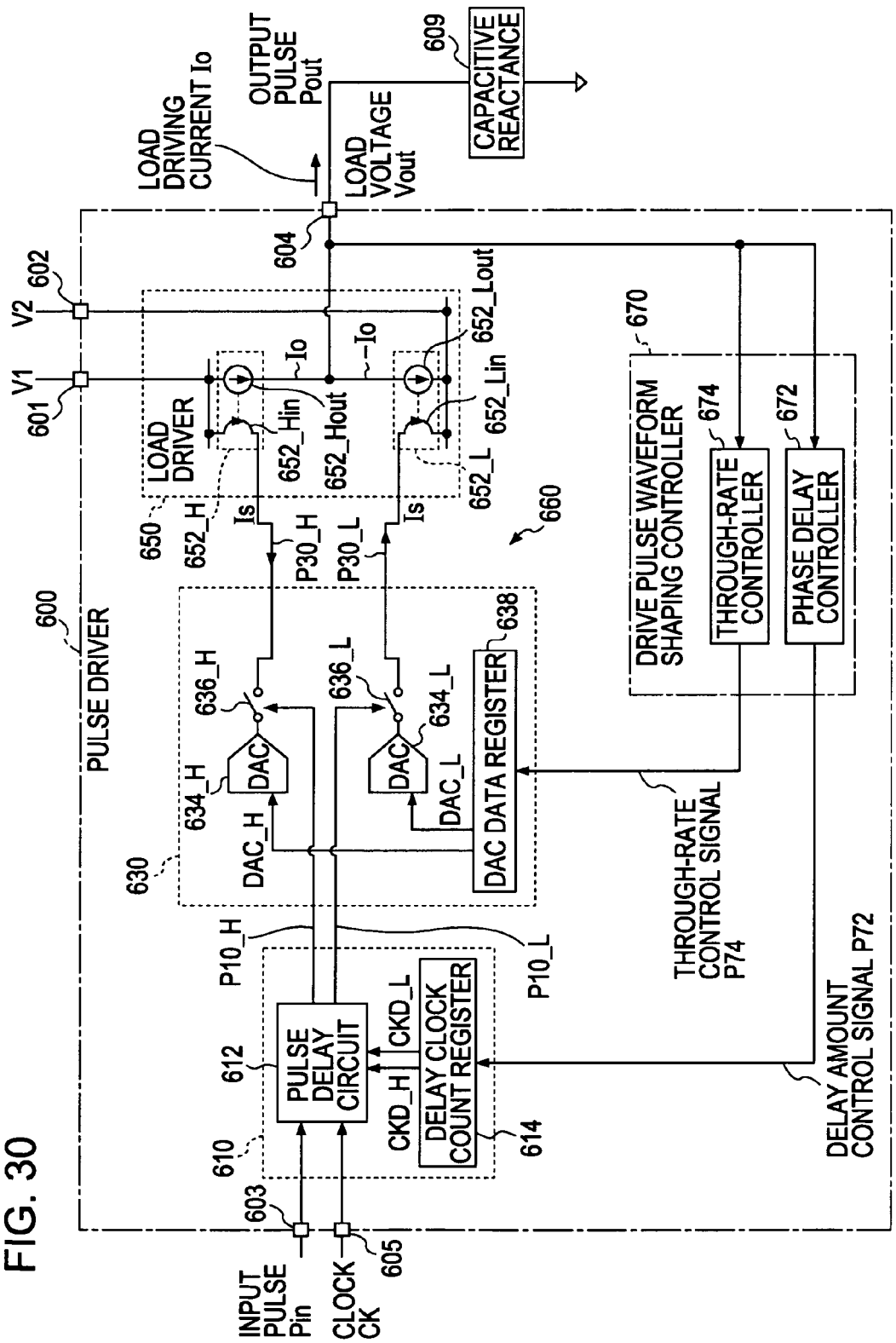
FIG. 30 illustrates in detail a phase delay adjuster and a through rate adjuster in the pulse driver of FIG. 23.
Figure 31:
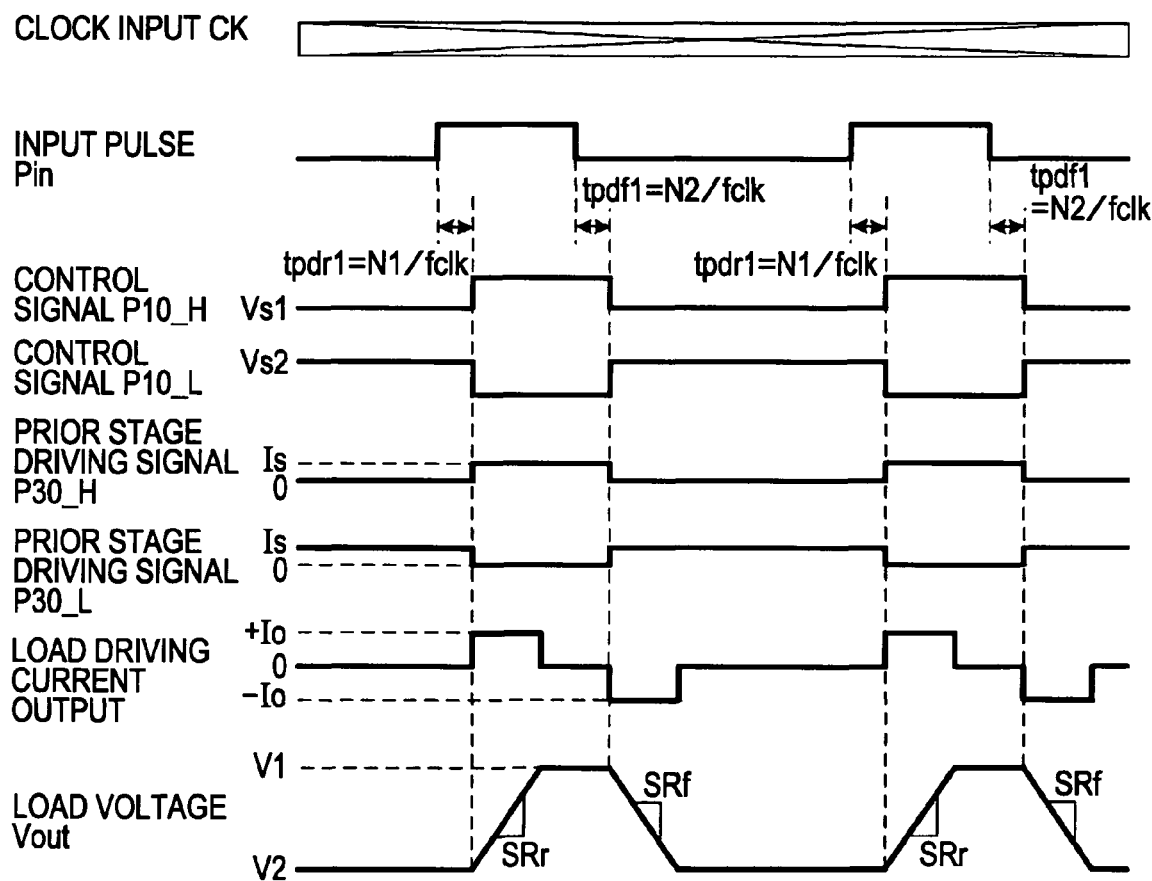
FIG. 31 is a timing diagram of the operation of the pulse driver of FIG. 30.

FIG. 30 illustrates mainly a phase delay adjuster 610 and a through rate adjuster 630 of the pulse driver 600 of FIG. 23. FIG. 31 is a timing diagram illustrating the operation of the pulse driver 600 of FIG. 30.

The load driver 650 has the same structure as the load driver 650 of FIG. 26 for driving the load 609 having a capacitive reactance. The same phase delay adjuster 610 and through rate adjuster 630 may be used if the load driver 650 has the same structure as the load driver 650 of FIG. 28 for driving the load 609 having the inductive reactance.

The pulse driver 600 includes a terminal 605 for receiving a clock signal CK. The phase delay adjuster 610 includes a pulse delay circuit 612 and a delay clock count register 614. The pulse delay circuit 612 delays an input pulse Pin (logic input) input to a terminal 603 by the number of clocks externally set, by referencing the clock signal CK input to the terminal 605. The delay clock count register 614 stores the numbers of clock (delay clock counts) defining the delay amounts of the pulse delay circuit 612, namely, the rising edge delay amount and the falling edge delay amount. The delay clock count register 614 sets the stored delay clock counts CKD_H and CKD_L on the pulse delay circuit 612.

As shown in FIG. 31, the rising edge delay amount tpdr (tpdr1 in FIG. 31) is obtained by dividing the delay clock count CKD_H (=N1) by a frequency fCLK of the clock signal CK (namely, N1/fCLK). The falling edge delay amount tpdf (tpdf1 in FIG. 31) is obtained by dividing the delay clock count CKD_L (=N2) by a frequency fCLK of the clock signal CK (namely, N2/fCLK). Since the delay amount is adjusted by a digital value such as the clock count, the adjustment is easy.

The pulse delay circuit 612 outputs an active high control signal P10_H (=Vs1) and an active high control signal P10_L (=Vs1) logically inverted from the control signal P10_H. The control signal P10_H rises at point delayed from the rising edge of the input pulse Pin by the delay amount tpdr and falls at point delayed from the falling edge of the input pulse Pin by the delay amount tpdf.

The delay clock count register 614 can continuously supply the pulse delay circuit 612 with the set delay clock counts CKD_H and CKD_L such as register initial setting values CKD_Hini and CKD_Lini internally or externally set. Alternatively, the delay clock counts KCD_H and CKD_L may be dynamically adjusted in response to the delay amount control signal P72 from the phase delay controller 672 of the drive pulse waveform shaping controller 670. The register initial setting values CKD_Hini and CKD_Lini may be stored on the delay clock count register 614 or may be set from the outside.

The term "dynamically" means that the delay clock counts may depend on the detection result of the delay amount of the actual output pulse Pout at the terminal 604 with respect to the input pulse Pin (the actual measured value or estimated value). The phase delay controller 672 increases or decreases the delay clock counts CKD_H and CKD_L with the delay amount control signal P72 so that the actual delay amount continuously remains to be a target delay amount.

During the feedback control, the delay amount is adjusted on a digital value such as the clock count. Since control information to control the phase delay adjuster 610 is handled in digital data, the adjustment becomes easy.

The through rate adjuster 630 includes a digital-to-analog (DA) converter 634_H and switch 636_H for rising edge control, and a DA converter 634_L and switch 636_L for falling edge control.

The through rate adjuster 630 further includes a DAC data register 638 for storing reference data DAC_H and DAC_L defining the reference current Is for the DA converters 634_H and 634_L. The DAC data register 638 sets stored reference data DAC_H and DAC_L on the DA converters 634H and 634_L. The DA converters 634_H and 634_L generate reference currents (Is on the source side and Is on the sink side) corresponding to the set reference data DAC_H and DAC_L. The reference currents on the source side and the sink side may or may not be the same in absolute value.

The current output section 632_H of FIG. 26 (not shown in FIG. 30) is arranged in the output stage of the DA converter 634_H. The current output section 632_L of FIG. 26 (not shown on FIG. 30) is arranged in the output stage of the DA converter 634_L.

The DAC data register 638 can supply the DA converters 634_H and 634_L with the set reference data DAC_H and DAC_L such as the register initial setting values DAC_Hini and DAC_Lini. The reference data DAC_H and DAC_L may be dynamically adjusted in response to the through rate control signal P74 from the through rate controller 674 in the drive pulse waveform shaping controller 670. The register initial setting values DAC_Hini and DAC_Lini may be internally pre-stored on the DAC data register 638 or may be set from the outside.

The term "dynamically" means that the delay clock counts may depend on the detection result of the through rate of the actual output pulse Pout at the terminal 604 with respect to the input pulse Pin. The through rate controller 674 increases or decreases the reference data DAC_H and DAC_L in response to the through rate control signal P74 so that the actual through rate remains to be a target value.

The output pulse Pout, namely, the variation characteristic of the load voltage Vout is defined by the driving currents Io (source current Io and sink current Io) supplied to the load 609, the driving current Io is defined by the reference currents Is (sink current Is and source current Is) output from the DA converters 634_H and 634_L, and the reference current Is is defined by the reference data DAC_H and DAC_L. The variation characteristic (through rate) of the load voltage Vout varies dependent on the driving current Io.

During the feedback control, the driving current Io during transition of the load voltage supplied to the load 609 is adjusted on a digital value such as the DAC data. The through rate of the load voltage Vout is thus adjusted. Since control information to control the through rate adjuster 630 is handled in digital data, the adjustment becomes easy.

Only when the switches 636_H and 636_L are on, the through rate adjuster 630 supplies the current mirror circuits 652_H and 652_L in the corresponding load driver 650 with the prior stage driving signals P30_H and P30_L generated by the DA converters 634_H and 634_L (the reference current Is herein).

The pulse delay circuit 612 inputs to a control input terminal of the switch 636_H a switch control signal Vs1 as the control signal P10_H corresponding to the delay amount at the rising edge, and to a control input terminal of the switch 636_L a switch control signal Vs2 as the control signal P10_L corresponding to the delay amount at the falling edge.

The DA converters 634_H and 634_L have sufficient definition, the definition covering variations in the driving capability of the load driver 650 and characteristic of the load 609, the variations attributed to variations in the manufacture of the load 609, variations in the manufacture of the driving element for use as an output stage of the load driver 650, and environmental changes such as temperature change and humidity change. More preferably, the DA converters 634_H and 634_L have definition compatible with a variety of loads 609.

The pulse delay circuit 612 drives the control signal P10_H (=Vs1) active high with a delay tpdr1 from the rising edge of the input pulse Pin. The output voltage Vout at the terminal 604 rises in response to the high level of the control signal P10_H.

When the input pulse P10_H (=Vs1) from the pulse delay circuit 612 is transitioned from low to high, the switch 636_H in the through rate adjuster 630 is turned on, and the prior stage driving signal P30_H defining the reference current Is generated by the DA converter 634_H is supplied to the current mirror circuit 652_H in the load driver 650 (in a sink operation).

The current mirror circuit 652_H supplies the load 609 having a capacitive reactance with the driving current Io that is obtained by multiplying the reference current Is indicated by the prior stage driving signal P30_H (by NH times). The load voltage Vout is then transitioned from low level to high level at a constant through rate. When the load voltage Vout reaches the power supply voltage V1, the input stage 652_Hout in the current mirror circuit 652_H loses the constant current feature thereof even though the reference current Is is continuously supplied to the input stage 652_Hin in the current mirror circuit 652_H. The load 609 is connected to the power supply voltage V1 via the equivalent resistance thereof, and the load voltage Vout is fixed to the power supply voltage V1.

When the input pulse Pin rises afterward, the above operation is performed in the opposite way. More specifically, the pulse delay circuit 612 drives the control signal P10_H (=Vs1) low with a delay amount tpdf1 from the falling edge of the input pulse Pin while driving the control signal P10_L active high at the same time. In response, the load voltage Vout at the terminal 604 rises at the high level of the control signal P10_L.

When the input pulse Pin_L (=Vs2) from the pulse delay circuit 612 is transitioned from low to high, the switch 636_L in the through rate adjuster 630 is turned on. The prior stage driving signal P30_L defining the reference current Is generated by the DA converter 634_L is supplied to the current mirror circuit 652_L in the load driver 650 (in a source operation).

The current mirror circuit 652_L supplies to the load 609 having the capacitive reactance the driving current Io that is obtained by multiplying the reference current Is indicated by the prior stage driving signal P30_L (by NH times). In this way, the load voltage Vout is transitioned from high level to low level at a constant through rate. When the load voltage Vout reaches the power supply voltage V2, the output stage 652_Lout in the current mirror circuit 652_L loses the constant current feature thereof even though the reference current Is is continuously supplied to the input stage 652_Lin in the current mirror circuit 652_L. The load 609 is connected to the power supply voltage V2 via the equivalent resistance thereof, and the load voltage Vout is fixed to the power supply voltage V2.

Modification of the Through Rate Adjuster

Figure 32:
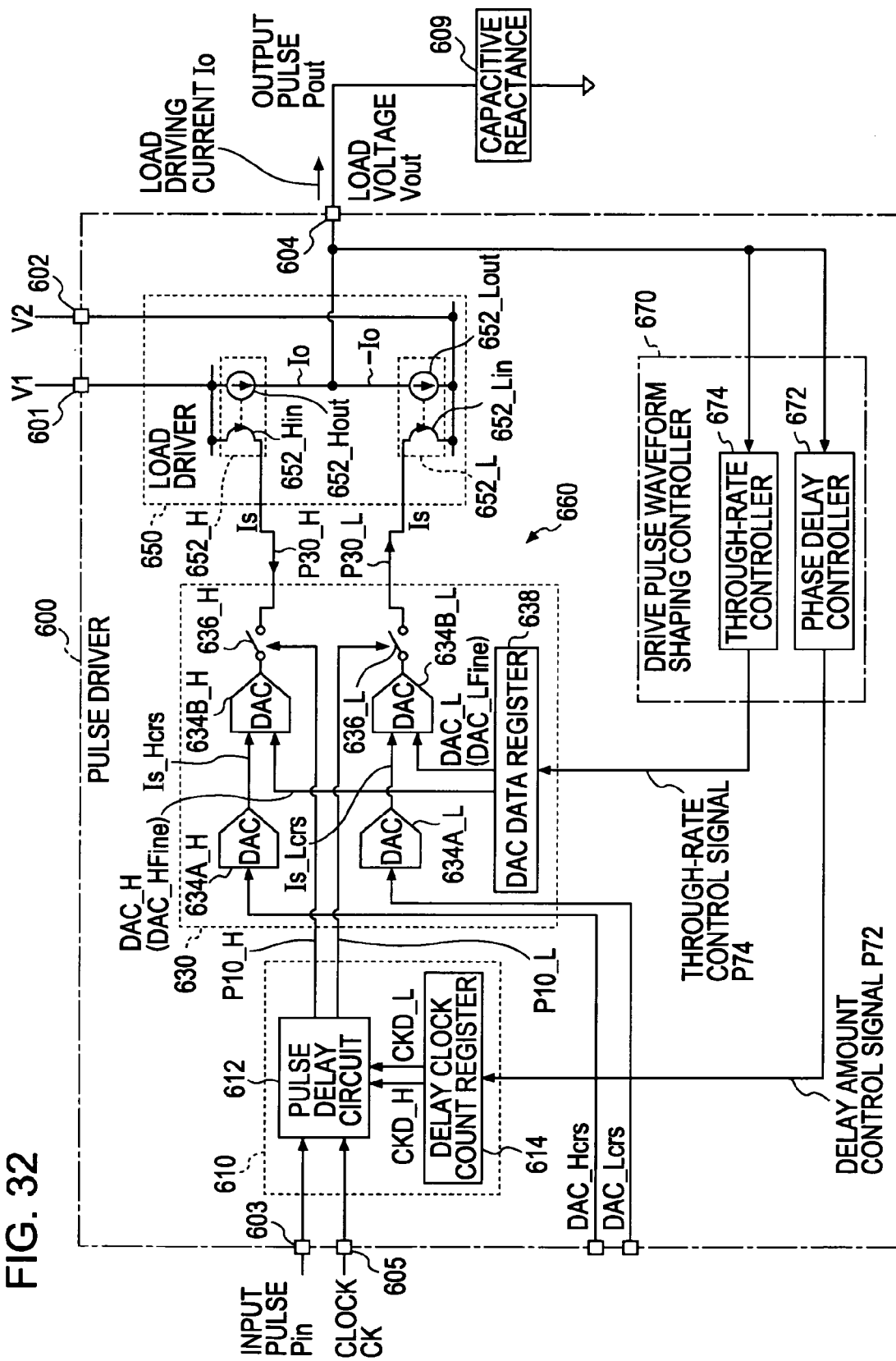
FIG. 32 illustrates in detail another example of the phase delay adjuster and the through rate adjuster in the pulse driver of FIG. 23 (modification to the arrangement shown in FIG. 17)

FIG. 32 illustrates mainly a modification of the phase delay adjuster 610 and the through rate adjuster 630 (of FIG. 30) of the pulse driver 600 of FIG. 23.

The load driver 650 has the same structure as the load driver 650 of FIG. 26 for driving the load 609 having a capacitive reactance. The same phase delay adjuster 610 and through rate adjuster 630 may be used if the load driver 650 has the same structure as the load driver 650 of FIG. 28 for driving the load 609 having the inductive reactance.

The modification shown in FIG. 32 is different from the pulse driver 600 of FIG. 30 in that a DA converter 634 in the through rate adjuster 630 permits two step adjustment for coarse tuning and fine tuning by DA converters 634A and 634B.

DA converters 634A_H and 634A_L for coarse tuning generate coarse reference current Is_Coarse (Is_Hcrs and Is_Lcrs) corresponding to driving capability coarse tuning set value DAC_Coarse (coarse DAC data DAC_Hcrs and DAC_Lcrs) set from the outside, and supply the coarse reference current Is_Coarse (Is_Hcrs and IS_Lcrs) to the DA converters 634B_H and 634B_L for fine tuning. The coarse DAC data is not affected (not controlled) by the through rate control signal P74 from the through rate controller 674, and the DA converters 634A_H and 634A_L generate the coarse reference current Is_Coarse responsive to the driving capability coarse tuning set value regardless of the through rate control signal P74 from the through rate controller 674.

The DA converters 634B_H and 634B_L for fine tuning generate reference currents (Is on the source side and Is on the sink side) set by the DAC data register 638 based on the through rate control signal P74 while referencing the coarse reference current Is_Coarse generated by the DA converters 634A_H and 634A_L. In this case, the reference data DAC_H and DAC_L correspond to the driving capability fine tuning set value DAC_Fine responsive to the driving capability coarse tuning set value DAC_Coarse.

When the reference current Is is generated by referencing the coarse reference current Is_Coarse, one of a multiplication method and an addition method may be used. In the multiplication method, with the coarse reference current Is_Coarse generated by the DA converters 634A_H and 634A_L used as a reference current, the reference current Is is generated by adjusting an amplification factor in accordance with the reference data DAC_H and DAC_L. In the addition method, fine reference currents Is_Fine (Is_Hfine and Is_Lfine) corresponding to the reference data DAC_H and DAC_L are generated at the DA converters 634B_H and 634B_L and the fine reference currents Is_Fine are added to the coarse reference Is_Coarse generated by the DA converters 634A_H and 634A_L.

Whether to use one or both of the two methods may be determined based on the driving capability and tendency in variations. Although there are some exceptions, the multiplication method provides a wider dynamic range than the addition method, and the DA converters 634B_H and 634B_L preferably have a circuit arrangement for the multiplication method.

Regardless of the multiplication method or the addition method, the coarse reference current Is_Coarse is free from the effect of the through rate control signal P74 during the feedback control, and the through rate of the load voltage Vout is mainly adjusted by the DA converters 634B_H and 634B_L for fine tuning.

Even a single stage of DA converter 634 can have sufficient definition, the definition covering variations in the driving capability of the load driver 650 and characteristic of the load 609, the variations attributed to variations in the manufacture of the load 609, variations in the manufacture of the driving element for use as an output stage of the load driver 650, and environmental changes such as temperature change and humidity change. More preferably, the DA converters 634_H and 634_L have definition compatible with a variety of loads 609.

In practice, however, the variations due to a variety of loads 609 is large in comparison with variations in the manufacture of the load 609, variations in the manufacture of the driving element for use as an output stage of the load driver 650, and environmental changes such as temperature change and humidity change. The use of a single stage of DA converter 634 is not practicable because of the unrealistic definition thereof.

In terms of system design, the specifications of characteristics of the load 609 in use (including input equivalent capacitance, input equivalent inductance, and driving frequency) are generally known. If the DA converter 634A for coarse tuning is used taking into consideration the characteristics, a target driving capability may be achieved.

If the DA converter 634B for fine tuning is designed to perform feedback control to cope with variations in service, the through rate may be dynamically adjusted with a realistic definition. More specifically, with an intended driving capability set for the DA converter 634A for coarse tuning, the driving capability and the characteristics of the load 609 (such as the input equivalent capacitance) may change because of parasitic capacitance, variations in the manufacturing process, and temperature change, each unpredictable at the design stage. In this case, there is a possibility that the through rate of the driving output fails to satisfy the specifications. But by controlling the DA converter 634B for fine tuning with the through rate controller 674, the gradient of the output is adjusted so that the output through rate specifications may be satisfied.

Structure of Drive Pulse Waveform Shaping Controller

Figure 33:
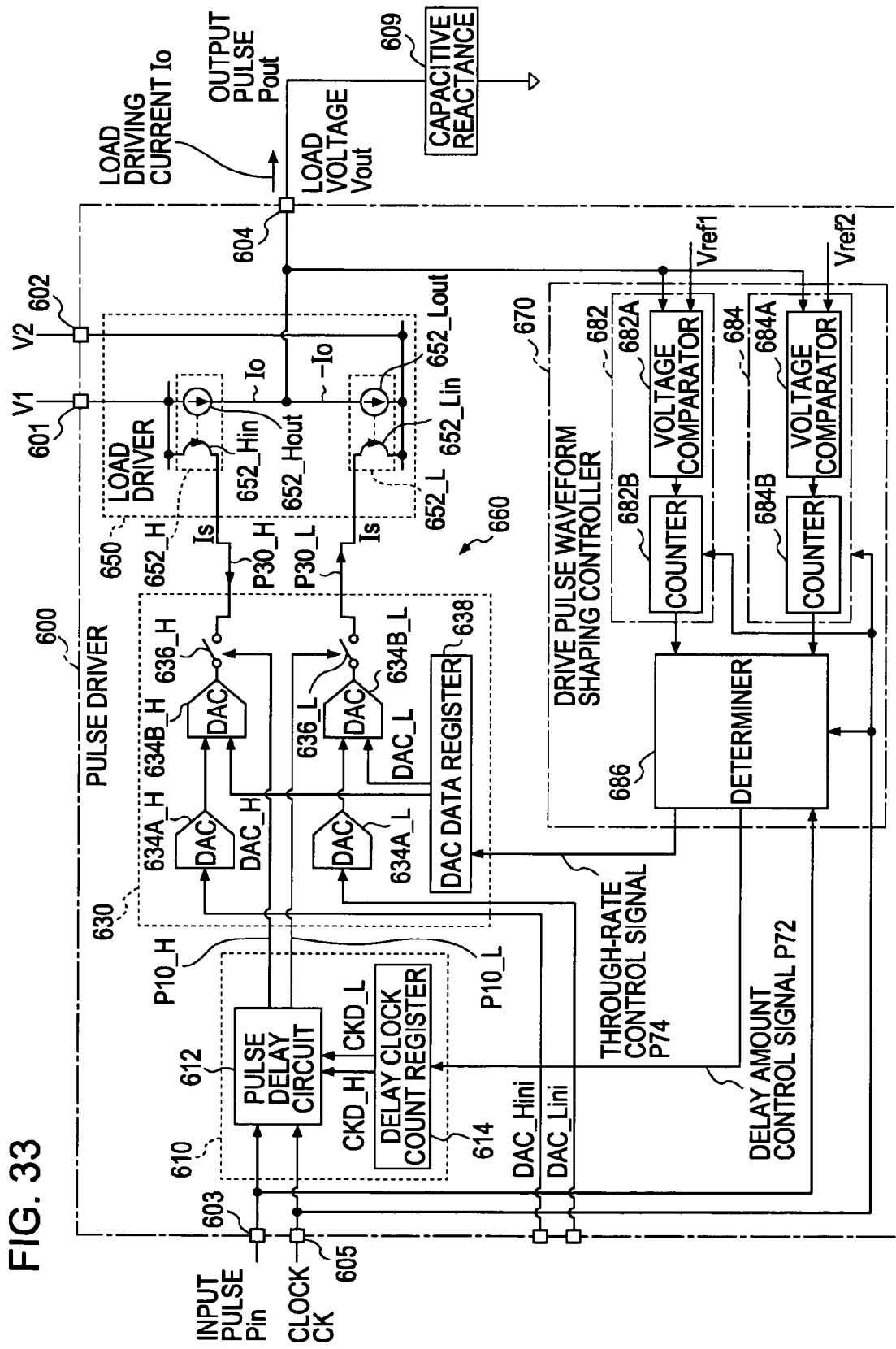
FIG. 33 illustrates in detail the a drive pulse waveform shaping controller in the pulse driver of FIG. 23.

FIG. 33 illustrates mainly a drive pulse waveform shaping controller 670 of the pulse driver 600 of FIG. 23. FIG. 34 is a timing diagram illustrating the operation of the pulse driver 600 of FIG. 33.

The phase delay adjuster 610 and the through rate adjuster 630 herein are identical to the counterparts of FIG. 32. The load driver 650 is identical to the counterpart of FIG. 26 for driving the load 609 having the capacitive reactance, or the counterpart of FIG. 28 for driving the load 609 having the inductive reactance. The previous discussion of the phase delay adjuster 610 and the through rate adjuster 630 is also equally applicable.

The drive pulse waveform shaping controller 670 includes two comparators 682 and 684 and a determiner 686 forming the phase delay controller 672 and the through rate controller 674. The two comparators 682 and 684 and a delay amount control function part of the determiner 686 constitute the phase delay controller 672. The two comparators 682 and 684 and a through rate control function part of the determiner 686 constitute the through rate controller 674. Alternatively, the two comparators 682 and 684 and the determiner 686 may be separately arranged from the phase delay controller 672 and the through rate controller 674.

The comparators 682 and 684 serve as a voltage comparator for comparing the load voltage Vout with a reference voltage Vref. One input terminal of each of the comparators 682 and 684 receives the output pulse Pout at a terminal 604.

A first reference voltage Vref1 corresponding to a predetermined voltage between the high level voltage and the low level voltage of the output pulse Pout at the terminal 604 is input to the other input terminal of the comparator 682. A second reference voltage Vref2 (>Vref1) corresponding to a predetermined voltage between the high level voltage and the low level voltage of the output pulse Pout at the terminal 604 is input to the other input terminal of the comparator 684.

Figure 34A:
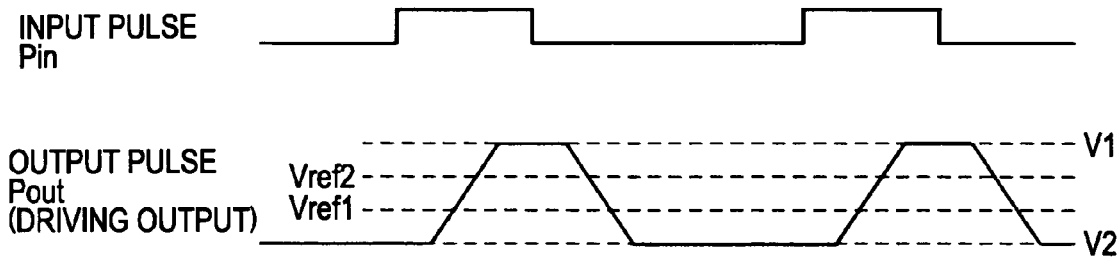
FIGS. 34A-34C are timing diagrams illustrating the operation of the pulse driver of FIG. 33.

As shown in FIG. 34A, the two reference voltages Vref1 and Vref2 are set to appropriate voltages between voltages taken by the load voltage Vout (upper power supply voltage V1 and lower power supply voltage V2). For example, the first reference voltage Vref1 is at the level of about one-third of the voltage swing from V1 between V1 and V2, and the second reference voltage Vref2 is at the level of about two-thirds of the voltage swing from V1 between V1 and V2.

The comparators 682 and 684 compare the two voltage inputs in response to the clock signal CK input from the outside via a terminal 605, and supplies the comparison result to the determiner 686. More specifically, the comparators 682 and 684 compare the reference voltage Vref1 and Vref2 to convert the analog voltage signal of the output pulse Pout into a digital signal. Along with the comparison process, the comparators 682 and 684 perform a counting process using the clock signal CK. In response to the count at the moment the comparison process has ended, the comparators 682 and 684 acquire digital data representing two points in the transition process of the output pulse Pout. This process is referred to as a single slop integration type AD conversion or a ramp signal comparison type AD conversion.

The comparators 682 and 684 include, respectively, voltage comparators 682A and 684A for comparing the reference voltages Vref1 and Vref2 with the output pulse Pout, and counters (CNTs) 682B and 864B for counting the clock signal CK until the voltage comparators 682A and 684A end the comparison process.

In the comparators 682 and 684 thus constructed, the voltage comparators 682A and 684A compare the reference voltages Vref1 and Vref2 with the slope portion of the output pulse Pout. If the two voltages become equal to each other, the comparator outputs of the voltage comparators 682 and 684 are reversed.

The counters 682B and 684B start the counting process in synchronization with the clock signal CK at the rising edge or the falling edge of the input pulse Pin input to the terminal 603. When the voltage comparators 682A and 684A notify of information indicating the reversal of the comparator outputs, the counting process stops. The count at that moment is latched as comparison data. In other words, the time of the slope of the output pulse Pout is measured using the two voltage comparators 682A and 684A.

Obtained as counts are a count Nsr2 identifying a voltage point Tsr2 (corresponding to the reference voltage Vref1), a count Ner2 identifying a voltage point Ter2 (corresponding to the reference voltage Vref2) in the rising edge process of the output pulse Pout, a count Nsf2 identifying a voltage point Tsf2 (corresponding to the reference voltage Vref2) and a count Nef2 identifying a voltage point Tef2 (corresponding to the reference voltage Vref1) in the falling edge process of the output pulse Pout.

Measured in this way are the clock counts (counts Nsr2, Ner2, Nsf2, and Nef2) within the period from the rising edge or the falling edge of the input pulse Pin until the output reversal of the two comparators 682A and 684A, namely, until the load voltage Vout generated by the load 609 in response to the input pulse Pin reaches each of the reference voltages Vref1 and Vref2. The comparators 682 and 684 supplies the measured counts to the determiner 686.

The determiner 686 calculates, by clock periods, a delay amount to a predetermined voltage point along the slope of the output pulse Pout (load voltage Vout) and time required to transition between the reference voltages Vref1 and Vref2 based on the relationship of each of the counts Nsr2, Ner2, Nsf2, and Nef2 to the input pulse Pin calculated by the comparators 682 and 684. The determiner 686 thus identifies the delay amount and the through rate of the active output pulse Pout with respect to the input pulse Pin, and controls the phase delay adjuster 610 using the delay amount control signal P72 and the through rate adjuster 630 using the through rate control signal P74 so that the delay amount and the through rate converge to the target values thereof.

Figure 34B:
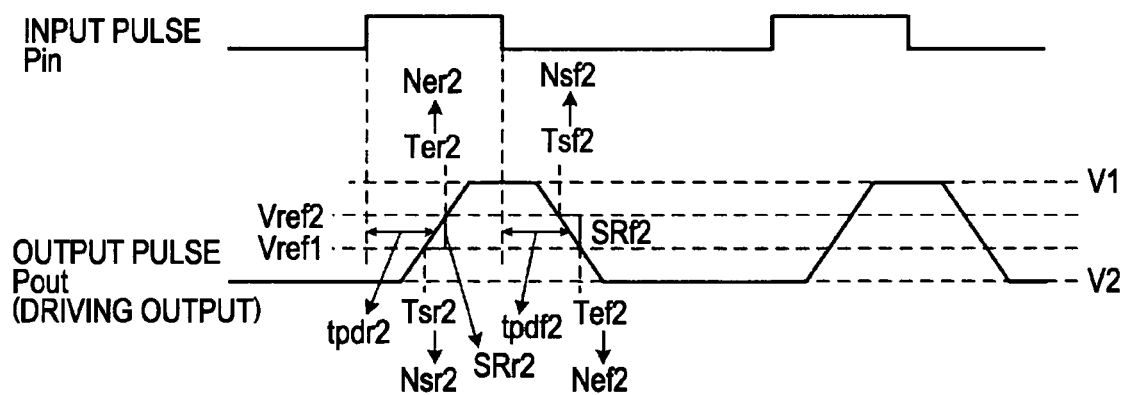

As shown in FIG. 34B, the average of the counts Nsr2 and Ser2 becomes a delay clock count CKD_H (=NH) representing time from the rising edge of the input pulse Pin to a middle voltage point between the reference voltages Vref1 and Vref2 of the output pulse Pout. The delay amount tpdr2 is obtained by dividing the delay clock count CKD_H by the frequency fCLK of the clock signal CK (NH/fCLK).

The average of the counts Nsf2 and Nef2 becomes a delay clock count CKD_L (=NL) representing time from the falling edge of the input pulse Pin to a middle voltage point between the reference voltages Vref1 and Vref2 of the output pulse Pout. The delay amount tpdf2 is obtained by dividing the delay clock count CKD_L by the frequency fCLK of the clock signal CK (NL/fCLK).

The difference between the counts Nsr2 and Ner2 represents the through rate SRr2 at the rising edge, and the difference between the counts Nsf2 and Nef2 represents the through rate SRf2 at the falling edge.

Figure 34C:
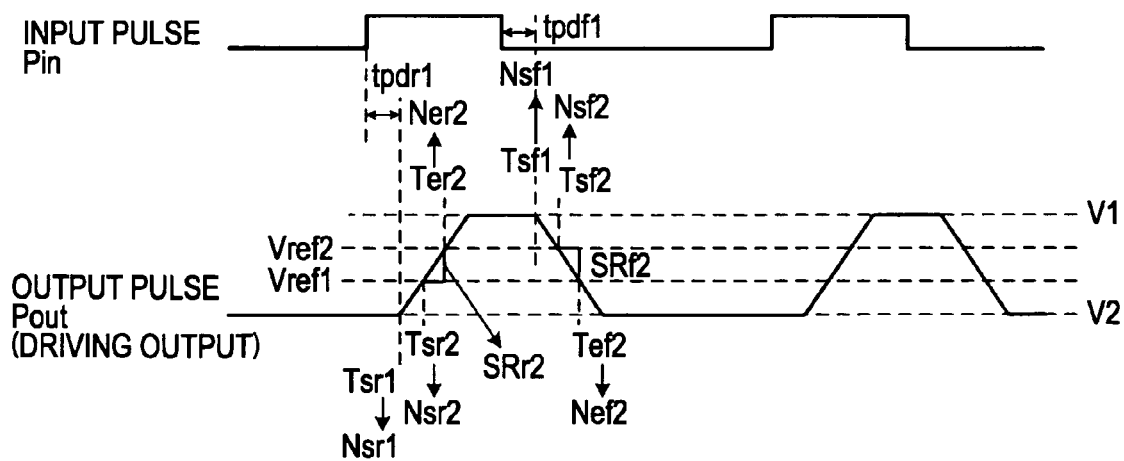

Counts representing the upper side power supply voltage V1 and the lower side power supply voltage V2 along an extension line of two points representing the two reference voltages Vref1 and Vref2 defining the through rate SRr2 can be estimated using the counts Nsr2 and Ner2 as shown in FIG. 34C. In other words, the count Nsr1 identifying the rising edge start point Tsr1 and the count Ner1 identifying the rising edge end point Ter1 can be estimated. The count Nsr1 becomes the delay clock count CKD_H (=N1) representing time from the rising edge of the input pulse Pin to the rising edge start point Tsr1 of the output pulse Pout. The delay amount tpdr1 at the rising edge is obtained by dividing the delay clock count CKD_H by the frequency fCLK of the clock signal CK (N1/fCLK).

As shown in FIG. 34C, counts representing the upper side power supply voltage V1 and the lower side power supply voltage V2 along an extension line of two points representing the two reference voltages Vref1 and Vref2 defining the through rate SRf2 can be estimated using the counts Nsf2 and Nef2. In other words, the count Nsf1 identifying the rising edge start point Tsf1 and the count Nef1 identifying the rising edge end point Tef1 can be estimated. The count Nsf1 becomes the delay clock count CKD_L (=N2) representing time from the falling edge of the input pulse Pin to the falling edge start point Tsf1 of the output pulse Pout. The delay amount tpdf1 at the falling edge is obtained by dividing the delay clock count CKD_L by the frequency fCLK of the clock signal CK (N2/fCLK).

The determiner 686 increases or decreases set values of the delay clock count register 614 (delay clock counts CKD_H and CKD_L) using the delay amount control signal P72 and increases or decreases the set values of the DAC data register 638 (reference data DAC_H and DAC_L) using the through rate control signal P74 so that the transition characteristics of the identified active output pulse Pout (the delay amount and the through rate to the input pulse Pin) converge to the target values stated in the specifications.

The control information to control the phase delay adjuster 610 and the through rate adjuster 630 is handled as digital data. Furthermore, the transition characteristics of the activated output pulse Pout are also digitally measured or digitally estimated. Since the entire feedback control system is handled using digital data, measurement and adjustment are easy.

First Configuration Applied to Vertical Driver

Figure 35:
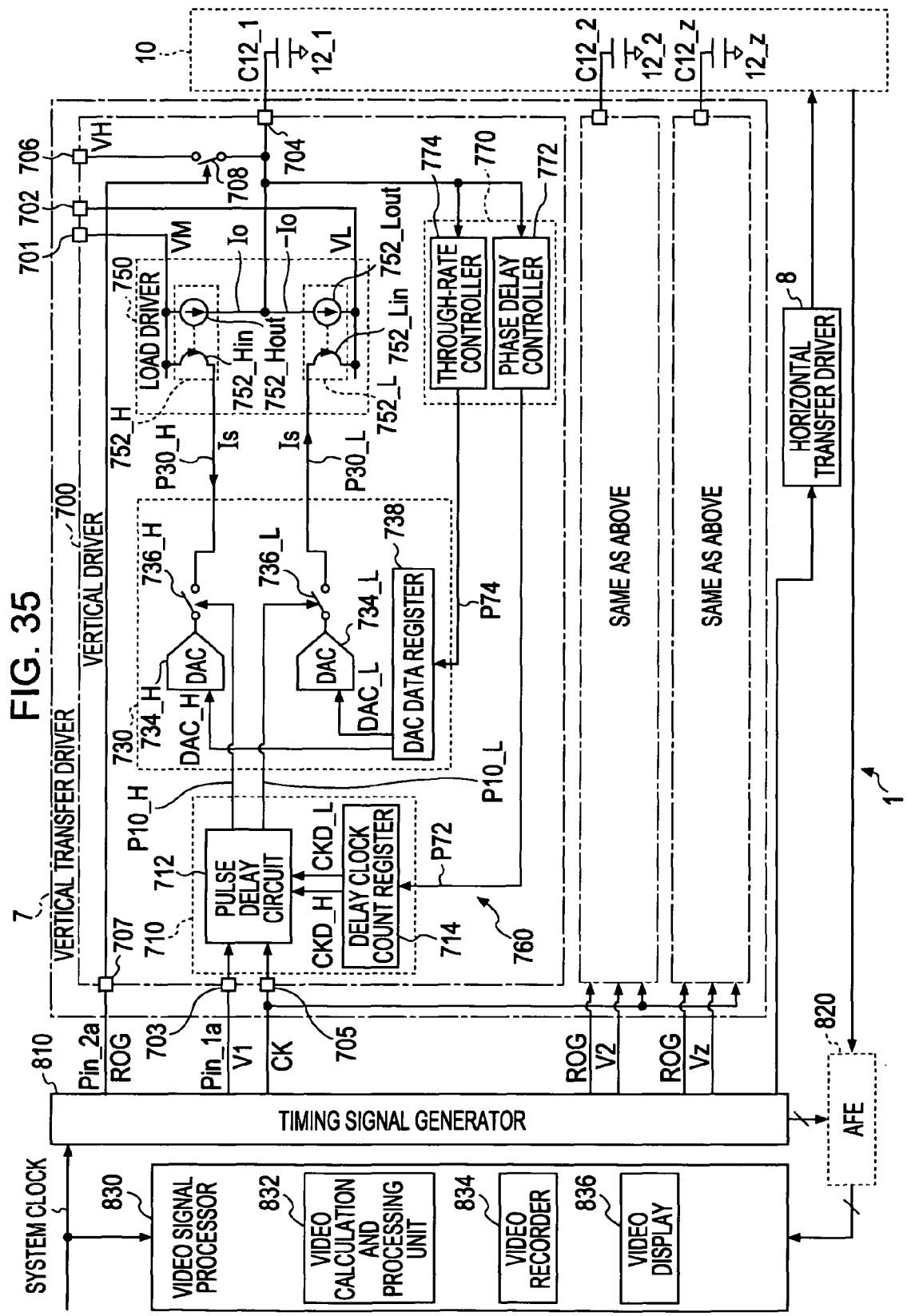
FIG. 35 illustrates a first configuration of a vertical driver implementing the pulse driver.

FIG. 35 illustrates a first configuration in which the above-described pulse driver 600 is applied to a vertical driver 50 driving the vertical transfer electrode 12 of the CCD solid-state image pickup element 10. Since the load driver 650 drives the vertical transfer electrode 12 of the capacitive reactance in this case, the structure of FIG. 26 is used. The phase delay adjuster 610 and the through rate adjuster 630 are the ones of FIG. 30.

As shown in FIG. 35, the image pickup device 1 includes a CCD solid-state image pickup element 10, a vertical transfer driver 7 for driving a plurality of vertical transfer electrodes 12 as a capacitive reactance, a horizontal transfer driver 8 for driving a plurality of horizontal transfer registers 14 as a capacitive reactance in the CCD solid-state image pickup element 10.

The vertical transfer driver 7 includes vertical drivers 700 of the same number as the vertical transfer electrodes 12 for separately driving the vertical transfer electrodes 12_1 through 12_z (z is the number of phases, and for example, z=4 for four phases). The vertical transfer driver 7 thus includes the vertical drivers 700 of the same number as the number of vertical transfer electrodes 12. The vertical transfer electrodes 12 are thus driven on a phase by phase basis. The vertical drivers 700 are supplied in a single package semiconductor IC.

As shown in FIG. 35, vertical transfer electrodes 12_1 through 12_z arranged in the CCD solid-state image pickup element 10 are respectively represented by equivalent input capacitances C12_1 through C12_z (each within a range of 100 to 1000 pF, for example). The CCD solid-state image pickup element 10 is a capacitive reactance load if viewed from the vertical driver 700.

The equivalent input capacitance C12 shows one electrode only in FIG. 4A. More in detail, a serial circuit of the equivalent input capacitance 12 with a wiring resistance (of several tens of Ω to several hundreds of Ω) and a grounding resistance (of several tens of Ω) is formed.

The image pickup device 1 includes a timing signal generator 810 for generating a pulse signal controlling the each vertical driver 700 in the vertical transfer driver 7 and the horizontal transfer driver 8, an analog front end (AFE) section 820 for performing an analog signal process, and a video signal processor 830. The video signal processor 830 includes a video calculation and processing unit 832 including a digital signal processor (DSP) for performing a predetermined video process on pickup data, a video recorder 834 for storing, on a predetermined memory, video picked up by the CCD solid-state image pickup element 10, and a video display 836 for displaying the video picked up by the CCD solid-state image pickup element 10.

FIG. 35 illustrates the most appropriate example of the image pickup device 1 (CCD image pickup system). The structure of the image pickup device 1 may be subject to change depending on requirement of semiconductor process and design requirement of the entire camera. The present invention is not limited to this example. All functional elements illustrated in FIG. 35 may or may not be included in the image pickup device 1. Part of functional elements (for example, the video display 836 for monitoring) may be removed from the system. Functional responsibility may be freely organized among the functional elements. For example, the horizontal transfer driver 8 and the timing signal generator 810 may be integrated into one unit.

The image pickup device 1 may further include a mechanism shutter for stopping the storage of signal charge in the sensor section (charge generator) in the CCD solid-state image pickup element 10, an optical system including a lens for collecting an optical image of a subject and an image capturing lens having an aperture diaphragm adjusting the amount of light of the optical image, and a controller for controlling the entire image pickup device 1 (although these elements are not shown). The timing signal generator 810 may contain the controller.

The controller includes a central processing unit (CPU). The CPU reads a control program stored on a magnetic disk, an optical disk, a magneto-optical disk, or a semiconductor memory by controlling a drive (not shown), and generally controls the image pickup device 1 in accordance with the read control program or a command input by a user.

The controller includes an exposure controller for controlling the shutter and the aperture diaphragm keeping the brightness of an image transferred to the video signal processor 830 to an optimum level, and an operation unit through which the user enters a shutter timing and other commands.

The CPU controls the timing signal generator 810 connected to a bus of the image pickup device 1, the video signal processor 830 and the exposure controller. The timing signal generator 810 and the video signal processor 830 receive a system clock and other control signals from the CPU.

The timing signal generator 810 supplies the vertical transfer driver 7 and the horizontal transfer driver 8 with a variety of pulse signals required to drive the CCD solid-state image pickup element 10 for transfer operation while supplying the analog front end section 820 with pulse signals for correlated double sampling and AD conversion.

In response to the pulse signal supplied from the timing signal generator 810, the analog front end section 820 performs predetermined analog signal processes such as correlated double sampling on the captured image signal output from the output amplifier 16 in the CCD solid-state image pickup element 10, converts the processed analog image signal into digital data, and supplies the resulting digital data to the video signal processor 830.

The video calculation and processing unit 832 includes the digital signal process (DSP) for performing the predetermined digital video process on the captured image data input from the analog front end section 820.

The video recorder 834 includes a memory (storage medium) such as flash memory storing the video data, and a CODEC (code/decode or compression/decompression) for encoding the video data processed by the video calculation and processing unit 832, and storing the encoded video data on the memory, or reading the video data, decoding the read video data, and supplying the decoded video data to the video calculation and processing unit 832 (although these element are not shown).

The video display 836 includes a digital-to-analog converter for converting the video data processed by the video calculation and processing unit 832 into an analog signal, a video monitor composed of a liquid-crystal display (LCD) functioning as a viewfinder displaying the image corresponding to the input video signal, and a video encoder for encoding the analog video signal into a video signal compatible with the subsequent stage video monitor.

The vertical driver 700 for the vertical transfer electrode 12 has substantially the same structure as the pulse driver 600 of FIG. 33. The vertical driver 700 includes a phase delay adjuster 710 corresponding to the phase delay adjuster 610, a through rate adjuster 730 corresponding to the through rate adjuster 630, a load driver 750 corresponding to the load driver 650, a phase delay controller 772 corresponding to the phase delay controller 672, and a through rate controller 774 corresponding to the through rate controller 674. A drive pulse waveform shaping controller 770 includes the phase delay controller 772 and the through rate controller 774.

The phase delay adjuster 710, the through rate adjuster 730, and the load driver 750 constitute a waveform shaping processor 760 for performing a predetermined waveform shaping process on the input pulse signal.

The vertical driver 700 includes terminals 701, 702, 703, 704, and 705 corresponding to the terminals 601, 602, 603, 604, and 605 of the pulse driver 600, respectively. The terminal 703 receives any of z phase vertical transfer clocks V1 through Vz, and the terminals 704 are connected to respective vertical transfer electrodes 12_1 through 12_z.

The vertical driver 700 further includes terminals 706 and 707 and a switch 708 as a particular mechanism for driving the vertical transfer electrode 12. The terminal 706 receives a voltage VH defining the voltage at high level of the vertical transfer pulses $\Phi V1$-$\Phi Vz$. The terminal 701 receives a voltage VM defining a middle level voltage of the vertical transfer pulse $\Phi V1$ through $\Phi Vz$. The terminal 702 receives a voltage VL defining a low level voltage of the vertical transfer pulse $\Phi V1$ through $\Phi Vz$. The timing signal generator 810 supplies the terminals 703 with vertical transfer clocks V1 through Vz of the input pulse Pin and the terminal 707 with a read clock ROG.

The vertical transfer clocks V1 through Vz are related to the transition between the voltages VM and VL of the vertical transfer pulse $\Phi V1$ through $\Phi Vz$ output from the vertical driver 700, and the read clocks ROG are related to the transition between the voltages VM and VH of the vertical transfer pulse $\Phi V1$ through $\Phi Vz$.

The switch 708 is arranged between the terminal 704 and the terminal 706. In response to the read clock ROG as a control pulse input via the terminal 707, the switch 708 connects the terminal 704 to the terminal 706 during field shift so that the load voltage Vout at the terminal 704 becomes the high-level voltage VH. More specifically, the switch 708 supplies the high level voltage VH to the terminal 704 in order to supply to the vertical transfer electrode 12 the pulse voltage which is required to transfer the signal charge from the photo sensor 11 in the CCD solid-state image pickup element 10 to the vertical transfer register 13.

When the vertical transfer electrodes 12 are driven by vertical transfer clocks of different phases in this arrangement, the pulse output signal of the vertical transfer electrode 12 in the active state thereof is monitored and the feedback control is performed so that each output pulse signal has predetermined transition characteristic. Even if there are variations in load characteristic of the vertical transfer electrode 12 (equivalent input capacitance C12, in particular) from element to element, variations in driving characteristics of the load drivers 750 from element to element, and environmental changes, constant transition characteristic is continuously obtained.

Appropriate driving is continuously performed in a manner free from the variations in the manufacture of the capacitive load and the environmental changes. Since the variations in the transition characteristic of the driving output pulse can be reduced to almost zero, high speed driving can be performed. If there are variations in the transition characteristic, driving needs to be performed with a margin taking into account the variations. Since the driving can be performed with the margin almost reduced to zero, high speed driving is permitted.

The logic relationship of the vertical transfer clocks V1 through Vz, the read clocks ROG, and the voltage levels VH, VM, and VL of the vertical transfer pulse ΦV1 through ΦVz are illustrated for exemplary purposes only. The present invention is not limited to this logic relationship, and any logic relationship may be set depending on system requirements.

In the arrangement of the vertical driver 700, the above-referenced pulse driver 600 is used to generate a low speed pulse signal having a slow variation characteristic between the low level voltage VL and the middle level voltage VM of the vertical transfer pulse ΦV1 through ΦVz based on the vertical transfer clocks V1 through Vz supplied to the terminals 703. The switch 708 for the high level voltage VH directly results in the transition between the middle level voltage VM and the high level voltage VH based on the read clock ROG, and this arrangement does not necessarily provide a low speed pulse having a slow variation characteristic.

In the characteristic and the driving method of the CCD solid-state image pickup element 10, the mild slope in the transition between the middle level voltage VM and the high level voltage VH and the transition between the low level voltage VL and the high level voltage VH may be achieved using the mechanism of the pulse driver 600.

As shown in FIG. 35, identical vertical drivers 700 supplied in the semiconductor IC are used to individually drive the vertical transfer electrodes 12 with the respective terminals 707 supplied with the read clocks ROG. Not all vertical transfer electrodes 12 need the read clock ROG, and in fact, the timing signal generator 810 does not supply all vertical drivers 700 at the terminals 707 thereof with the read clocks ROG.

For example, in the interline CCD solid-state image pickup element 10, V1 and V3 of the four phase vertical transfer clocks V1-V4 and the read clocks ROG are combined to form the vertical transfer pulses ΦV1 and ΦV3 taking one of three levels VL, VM, and VH. The vertical transfer pulses ΦV1 and ΦV3 are used not only for the originally intended vertical transfer operation but also signal charge reading. In all pixel reading type CCD solid-state image pickup element 10, V1 of the three phase vertical transfer clocks V1-V3 and the read clock ROG are combined to form a vertical transfer pulse ΦV taking one of the three levels VL, VM, and VL. The vertical transfer pulse ΦV1 is used not only in the originally intended vertical transfer operation but in the signal charge reading operation.

Second Configuration Applied to the Vertical Driver

Figure 36:
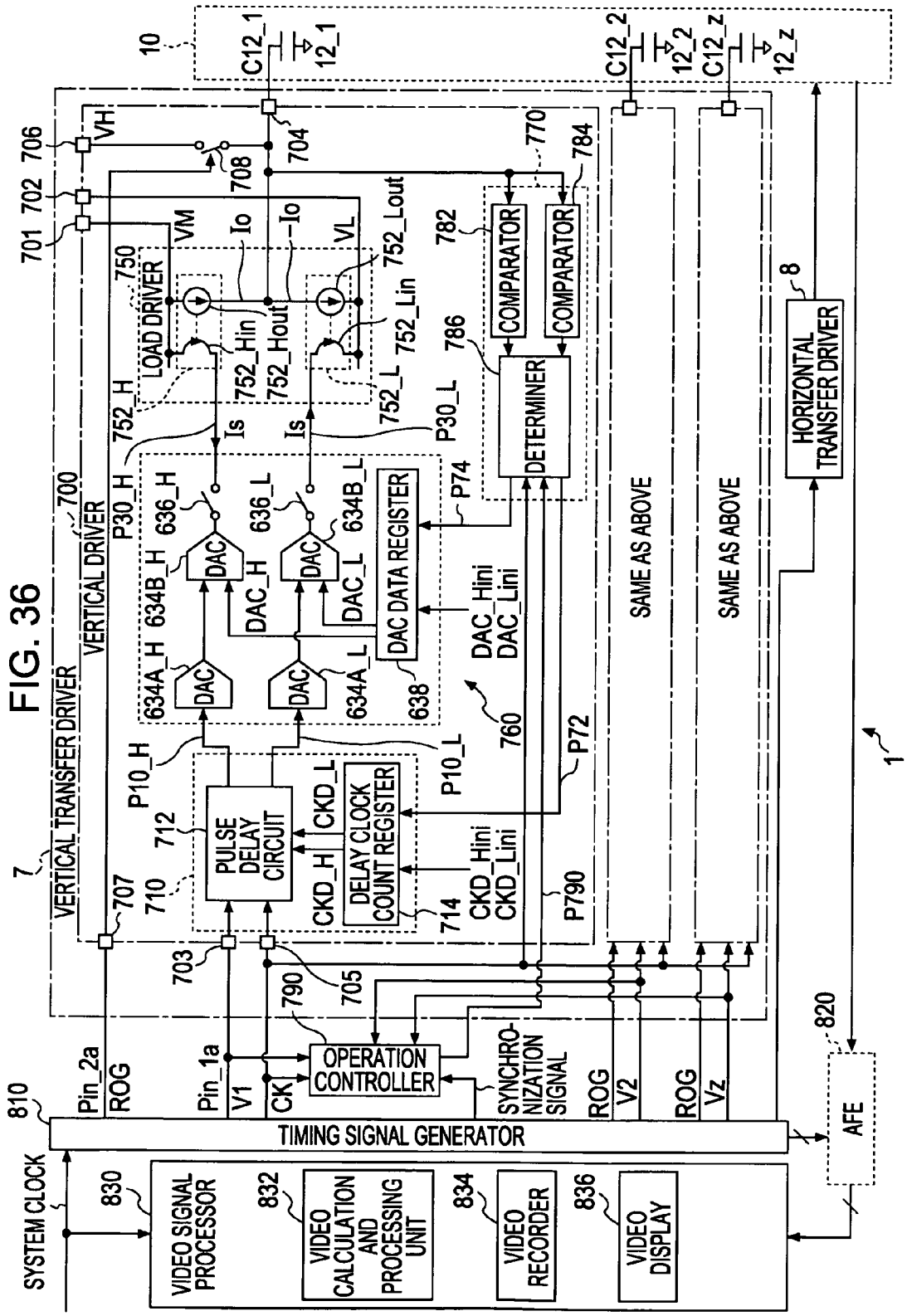
FIG. 36 illustrates a second configuration of the vertical driver implementing the pulse driver.

FIG. 36 illustrates a second configuration in which the above-referenced pulse driver 600 is applied to the vertical driver 50 driving the vertical transfer electrode 12 in the CCD solid-state image pickup element 10. In the second configuration, the pulse driver 600 of the vertical driver 700 in the first configuration of FIG. 35 is the one shown in FIG. 33 rather than the one shown in FIG. 30. A drive pulse waveform shaping controller 770, corresponding to the drive pulse waveform shaping controller 670, includes comparators 782 and 784 and a determiner 786. The comparators 782 and 784 are simplified in FIG. 36.

A timing signal generator 810 sets register initial set values CKD_Hini and CKD_Lini in a delay clock count register 714, a driving capability coarse tuning value (coarse DAC data) in a DA converter 734A for coarse tuning, and register initial set values DAC_Hini and DAC_Lini in a DAC data register 738.

An operation controller 790 is added to control the operation of the image pickup device 1 depending on operational status. For example, the operation controller 790 performs control operation of the drive pulse waveform shaping controller 770 in the vertical driver 700 (corresponding to the pulse driver 600) performed to the waveform shaping processor 760.

The operation controller 790 may be mounted external to the vertical transfer driver 7 as shown in FIG. 36. Alternatively, the operation controller 790 may be mounted internal to the vertical transfer driver 7. In this case, if a single package IC containing each vertical driver 700 is used, the operation controller 790 is contained in the same package IC. If the vertical drivers 700 driving the vertical transfer electrodes 12 are supplied in separate ICs, the operation controller 790 is mounted in each of the vertical drivers 700. One of the operation controllers 790 may be selected.

The operation controller 790 receives the vertical transfer clocks V1 through Vz as the input pulse Pin, clock signal CK, and video synchronization signals from the timing signal generator 810 while supplying to the drive pulse waveform shaping controller 770 an output waveform shaping permit signal P790 controlling the operation of the drive pulse waveform shaping controller 770. The video synchronization signals include a horizontal synchronization signal, a vertical synchronization signal, and control signals controlling a variety of image pickup modes.

The operation controller 790 permits or stops the operation of the drive pulse waveform shaping controller 770 in response to the video synchronization signal. A logic input specifying the polarity of the output pulse may be used to assist the video synchronization signal.

During standard pickup mode, the image pickup device 1 minimizes noise component appearing in images by stopping the feedback control using the drive pulse waveform shaping controller 770 within the effective pixel period of the CCD solid-state image pickup element 10 and by activating the feedback control using the drive pulse waveform shaping controller 770 during only a vertical blanking period that does not directly appear on screen. The image pickup device 1 thus adjusts the delay amount and the through rate so that the active transition characteristic of the vertical transfer pulse driving the vertical transfer electrode 12 meets the specifications.

At least time for one screen is available for system stabilization when the pickup mode is switched. During the effective pixel period of the one screen, the feedback control using the drive pulse waveform shaping controller 770 is activated. The delay time and the through rate are adjusted so that the active transition characteristic of the vertical transfer pulse driving the vertical transfer electrode 12 meets the specifications. Steady state can thus be quickly restored.

In addition to the video synchronization signals, the signal for controlling the system is supplied to the vertical driver 700 to be used for calculation and determination. Flexible system is easily provided.

Third Configuration Applied to the Vertical Driver (First Circuit Sharing Technique to a Plurality of Loads)

Figure 37:
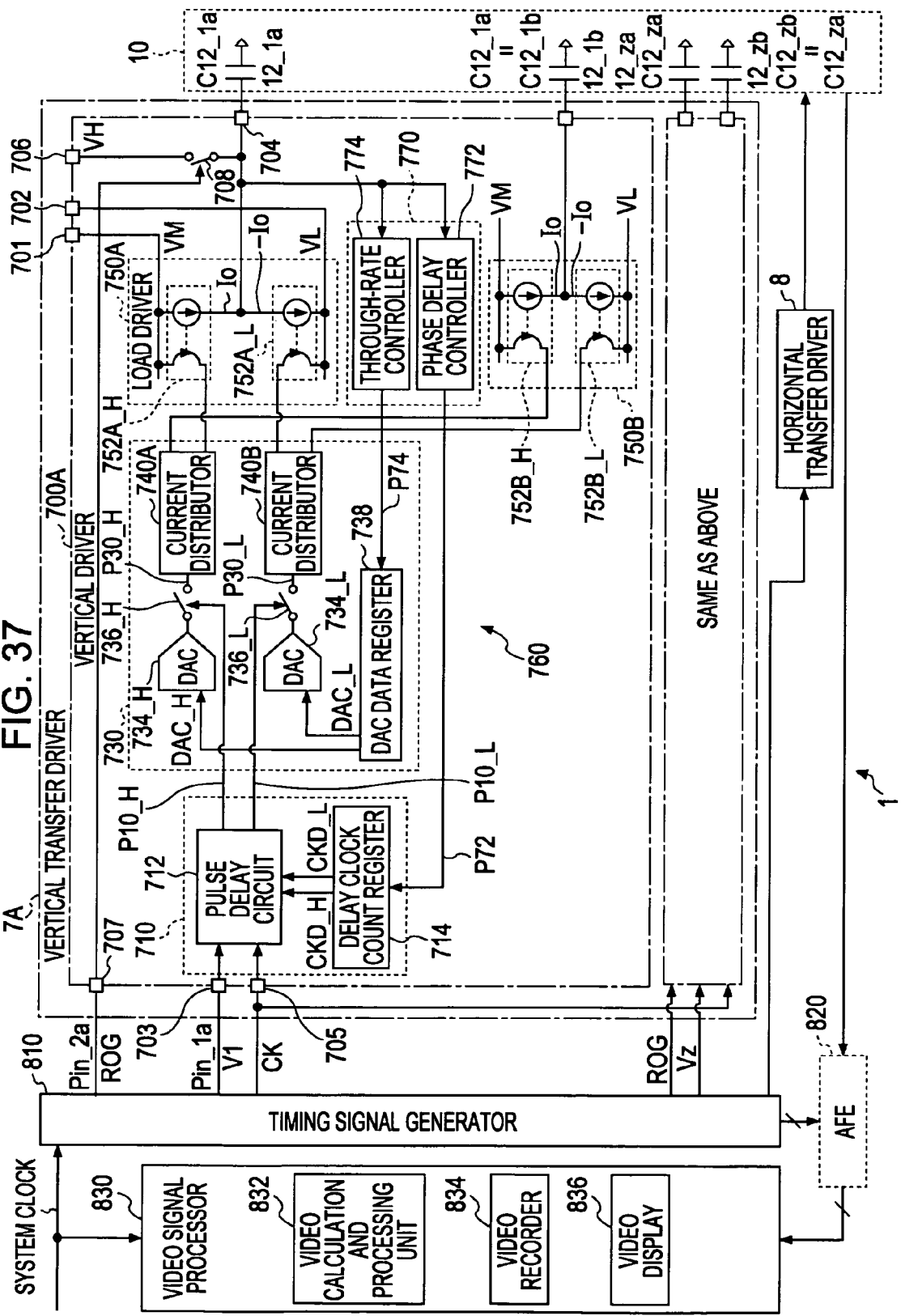
FIG. 37 illustrates a third configuration of the vertical driver implementing the pulse driver.

FIG. 37 illustrates a third configuration in which the above-referenced pulse driver 600 is applied to the vertical driver 50 driving the vertical transfer electrode 12 in the CCD solid-state image pickup element 10. As the first configuration of FIG. 35, the third configuration incorporates the structure of FIG. 30 as the pulse driver 600. The third configuration employs a first technique that reduces hardware by sharing part of function to the plurality of vertical transfer electrodes 12.

The first sharing technique is based on the concept that in connection with a logic input for driving one vertical transfer electrode 12 and a logic input for driving another vertical transfer electrode 12, adjustment values to the delay amount and the through rate to the logic inputs can be equalized if the vertical transfer electrodes 12 have the same equivalent input capacitance C12. The drive pulse waveform shaping controller 770 controls the phase delay adjuster 710 and the through rate adjuster 730 while monitoring the delay amount of the output pulse Pout to the input pulse Pin and the variation characteristic (through rate) of the output pulse Pout. That drive pulse waveform shaping controller 770 is shared by a plurality of vertical transfer electrodes 12 having the identical equivalent input capacitance C12.

More specifically, in a vertical transfer driver 7A performing the first sharing technique, vertical transfer electrodes 12 having identical equivalent input capacitances C12 from among the plurality of vertical transfer electrodes 12 used in the CCD solid-state image pickup element 10 may share the structure corresponding to the pulse driver 600 except the load driver 650.

More specifically, in a vertical driver 700A of the vertical transfer driver 7A, the drive pulse waveform shaping controller 770 monitors the pulse output signal on one of the plurality of vertical transfer electrodes 12 having the same characteristic, and then controls the waveform shaping processors 760 corresponding to the plurality of vertical transfer electrodes 12 so that the pulse output signals of the plurality of vertical transfer electrodes 12 having the same characteristic have the same transition characteristic.

For example, although individual load drivers 750A and 750B respectively connected to two vertical transfer electrodes 12 having the same equivalent input capacitance C12 are employed, the other elements, such as the phase delay adjuster 710, the through rate adjuster 730, and the drive pulse waveform shaping controller 770 are shared by the vertical transfer electrodes 12. The through rate adjuster 730 includes, at the junctions thereof with load drivers 750A and 750B, current distributors 740A and 740B for distributing to the load drivers 750A and 750B the reference current Is represented by the prior stage driving signal P30 output from the DA converter 734.

The current distributor 740 is used to distribute the reference current Is defined by the DA converter 734 for output driving capability setting into prior stage driving signal P30_Ha and P30_La for one vertical transfer electrode 12_a and prior stage driving signal P30_Hb and P30_Lb for the other vertical transfer electrode 12_b.

The current Is is distributed into two with the two vertical transfer electrodes 12 having the same capacitance. Alternatively, if a plurality of vertical transfer electrodes 12 are used, the current Is may be distributed among the same number of electrodes.

For example, the four types of vertical transfer electrodes 12_1 through 12_4 for four phase driving are arranged in FIG. 1. It is contemplated that the four types of vertical transfer electrodes 12_1 through 12_4 are respectively driven by the respective four phase vertical drivers. Alternatively, each vertical transfer electrode may be divided into a plurality of lines, and each line may be driven by a respective vertical driver.

For example, a functionally one vertical transfer electrode may be physically divided into an upper half and a lower half of the image pickup section 10a, two output stages of the vertical driver (corresponding to the load driver 750 herein) are mounted on an upper side and a lower side of the image pickup section 10a. The upper vertical transfer electrode is driven by the upper side output stage and the lower vertical transfer electrode is driven by the lower side output stage.

Since the lines of the four types of vertical transfer electrodes 12_1 through 12_4 (line _a and line _b) are originally one in this case, one target driving timing works. A signal originated from a single input pulse may be distributed among two output stages. The load capacitance of distribution destinations may be different. If the signals to be supplied to the two lines (corresponding to the prior stage driving signal P30 to be supplied to the load driver 750 herein) are set to the same timing, managing the driving timings subsequent to distribution is difficult.

The lines, having originally the same pattern, also have the same equivalent input capacitances C12_a and C12_b. When the signals derived from one input pulse are distributed among the output stages of two lines, the signals to be supplied to the output stages (corresponding to the prior stage driving signal P30 to be supplied to the load driver 750) are substantially equalized.

With the first sharing technique, a vertical transfer clock V1 as a logic input 1a is supplied to a pulse delay circuit 712 to drive two line vertical transfer electrode 12_1a and 12_1b of the vertical transfer electrode 12_1 in the vertical driver 700A in the vertical transfer driver 7A. A read clock ROG as a logic input 2a (if necessary) is supplied to the switch 708.

The vertical transfer driver 7A includes the same mechanism (not shown) as the vertical driver 700A to drive the other vertical transfer electrodes 12_2, 12_3, and 12_4.

The drive pulse waveform shaping controller 770 in the vertical driver 700A monitors the activation state of each of the load voltage Vout having the same equivalent input capacitance C12 (for example, a load voltage Vout1a at a vertical transfer electrode 12_1a), and adjusts the delay amount and the through rate responsive to the logic input.

A single waveform shaping processor 760 monitors the output of one line of two lines, namely, the load voltage Vout1a at the vertical transfer electrode 12_1a (or the load voltage Vout1b at the vertical transfer electrode 12_1b). Adjustment is made so that the load voltage Vout1a at the vertical transfer electrode 12_1a has a predetermined delay amount and a predetermined through rate in response to the vertical clock V1 supplied from the timing signal generator 810 as the logic input 1a. Also adjustment is made so that the load voltage Vout1b at the vertical transfer electrode 12_1b has a predetermined delay amount and a predetermined through rate.

The logic input 1a (vertical transfer clock V1) is commonly used to drive the two line physically separated vertical transfer electrodes 12_1a and 12_1b. Since the vertical transfer electrodes 12_1a and 12_1b have the same equivalent input capacitance C12, the adjustment amounts in the delay amount responsive to the delay amount control signal P72 to the phase delay adjuster 710 (more specifically the delay clock count register 714), and the through rate responsive to the through rate control signal P74 to the through rate adjuster 730 (more specifically the DAC data register 738) are also the same.

The arrangement employed in the vertical transfer driver 7A for performing the first sharing technique is effective because of the symmetrical structure of the electrodes in the CCD solid-state image pickup element 10. Since one equivalent input capacitance C12 is designed to be equal to the other equivalent input capacitance C12, circuit redundancy on the drive pulse waveform shaping controller 670 is effectively eliminated.

When there are vertical transfer electrodes 12 having the same equivalent input capacitance C12 in the vertical transfer driver 7A for performing the first sharing technique, not only the drive pulse waveform shaping controller 770 but also the phase delay adjuster 710 and the through rate adjuster 730 are shared. Circuits that can be shared are not limited to these elements. A variety of modifications may be applied to the sharing technique in the system configuration of the image pickup device 1 and the structure and characteristic of the CCD solid-state image pickup element 10. Such modifications are described below.

Modification of the Third Configuration to the Vertical Driver

When the complementary driving of FIGS. 6A and 6B is performed, the first sharing technique is applicable. The drive pulse waveform shaping controller 770 monitors the pulse output signal occurring on one line of the plurality of vertical transfer electrodes 12 having the same characteristic. The drive pulse waveform shaping controller 770 controls the waveform shaping processor 760 corresponding to the plurality of vertical transfer electrodes 12 so that the pulse output signals of the plurality of vertical transfer electrodes 12 having the same characteristic have the same transition characteristic.

When the interline type CCD solid-state image pickup element 10 is four phase driven as described with reference to FIG. 2, the CCD solid-state image pickup element 10 includes the four types of vertical transfer electrodes 12_1 through 12_4 corresponding to the respective phases. The first layer vertical transfer electrodes (second electrode) 12_2 and the first layer vertical transfer electrode (fourth electrode) 12_4 are substantially identical in pattern shape, and the second layer vertical transfer electrode (first electrode) 12_1 and the second layer vertical transfer electrode (third electrode) 12_3 are substantially identical in pattern shape. The first layer electrodes are different from the second layer electrodes in pattern shape. The equivalent input capacitances C12_1 and C12_3 of the vertical transfer electrodes 12_1 and 12_3 are substantially equal to each other, and the equivalent input capacitance C12_2 and C12_4 of the vertical transfer electrodes 12_2 and 12_4 are substantially equal to each other. Each of the equivalent input capacitances C12_1 and C12_3 is not equal to each of the equivalent input capacitances C12_2 and C12_4.

If the vertical transfer electrodes 12 having the same equivalent input capacitances C12 are driven in the complementary driving method, the vertical transfer electrodes 12 having the same equivalent input capacitances C12 are supplied with the vertical transfer pulses changing in opposite phases. For example, in the vertical transfer driver 7A, one of the logic inputs 1a (vertical transfer clock V1) and 1b (vertical transfer clock V2) is supplied to the pulse delay circuit 612, and DA converters 734_H and 734_L supply the outputs thereof to current distributors 740A and 740B. The current distributors 740A and 740B supply the output currents thereof to load drivers 750A and 750B. When the current distributors 740A and 740B supply the output currents thereof to the load drivers 750A and 750B, the phase of the currents may be inverted.

More specifically, the output of the DA converter 734_H is supplied to a current mirror circuit 752_H in the load driver 750A and a current mirror circuit 752_L in the load driver 750B. The output of the DA converter 734_L is supplied to a current mirror circuit 752_L in the load driver 750A and a current mirror circuit 752_H in the load driver 750B.

With this mechanism, the reference current Is generated in response to a single input pulse Pin using the same phase delay adjuster 710 and the same through rate adjuster 730 is distributed in equal amounts between the load driver 750A and the load driver 750B for a plurality of vertical transfer electrodes 12. If there are no variations from one equivalent input capacitances C12 to another during the complementary driving, the rising edge characteristic and the falling edge characteristic of the two lines are accurately equalized.

Two load drivers 750, namely, a load driver 750A and a load driver 750B may be arranged to work with two vertical transfer electrodes 12 having the same equivalent input capacitance C12. Two pulse delay circuits 712 in the phase delay adjuster 710, namely, pulse delay circuits 712A and 712B may be arranged. Two DA converters 734, namely, DA converters 734A and 734B, and two switches 736, namely, switches 736A and 736B may be arranged in the through rate adjuster 730.

The delay clock counts CKD_H and CKD_L set in the delay clock count register 714 are commonly set in the individual pulse delay circuits 712A and 712B in response to the delay amount control signal P72 from the phase delay controller 772. The reference data DAC_H and DAC_L set in the DAC data register 738 is commonly set in the individual DA converters 734A and 734B in response to the through-rate control signal P74 from the through-rate controller 774.

In such a modification, the drive pulse waveform shaping controller 770 in the vertical driver 700B monitors the activated state of one load voltage Vout of the vertical transfer electrodes 12 having the same equivalent input capacitance C12 (for example, a load voltage Vout1 of the vertical transfer electrode 12_1). The drive pulse waveform shaping controller 770 then adjusts the delay amount and the through rate in response to the logic inputs (for example, a combination of vertical transfer clocks V1 and V3) based on the monitoring result.

Adjustment is made so that the load voltage Vout1a at the vertical transfer electrode 12_1 has a predetermined delay amount and a predetermined through rate in response to the vertical clock V1 supplied from the timing signal generator 810 as the logic input 1a. Also adjustment is made so that the load voltage Vout1b at the vertical transfer electrode 12_3 has a predetermined delay amount and a predetermined through rate in response to the vertical clock V3 supplied from the timing signal generator 810 as the logic input 1b.

The logic input 1a for driving the vertical transfer electrode 12_1 (vertical transfer clock V1) and the logic input 1b for driving the vertical transfer electrode 12_3 (vertical transfer clock V3) different in phase are separately input. The vertical transfer electrodes 12_1 and 12_3 have the same equivalent input capacitance C12. In the vertical transfer electrodes 12_1 and 12_3, the same phase delay adjustment quantity and the same through rate as the same load current adjustment quantity (adjustment amount of Io) result.

The phase delay amounts at the pulse delay circuits 712A and 712B in response to the delay amount control signal P72 to the phase delay adjuster 710 (more specifically, the delay clock count register 714) are controlled to be of the same amount. The through rates at the DA converters 734A and 734B in response to the through rate control signal P74 to the through rate adjuster 730 (more specifically, the DAC data register 738) are controlled to be of the same amount. For the vertical transfer electrodes 12_1 and 12_3, the output pulses having the phase delay amount and the through rate satisfying the specifications thus result.

Fourth Configuration to the Vertical Driver (Second Circuit Sharing Technique to a Plurality of Loads)

Figure 38:
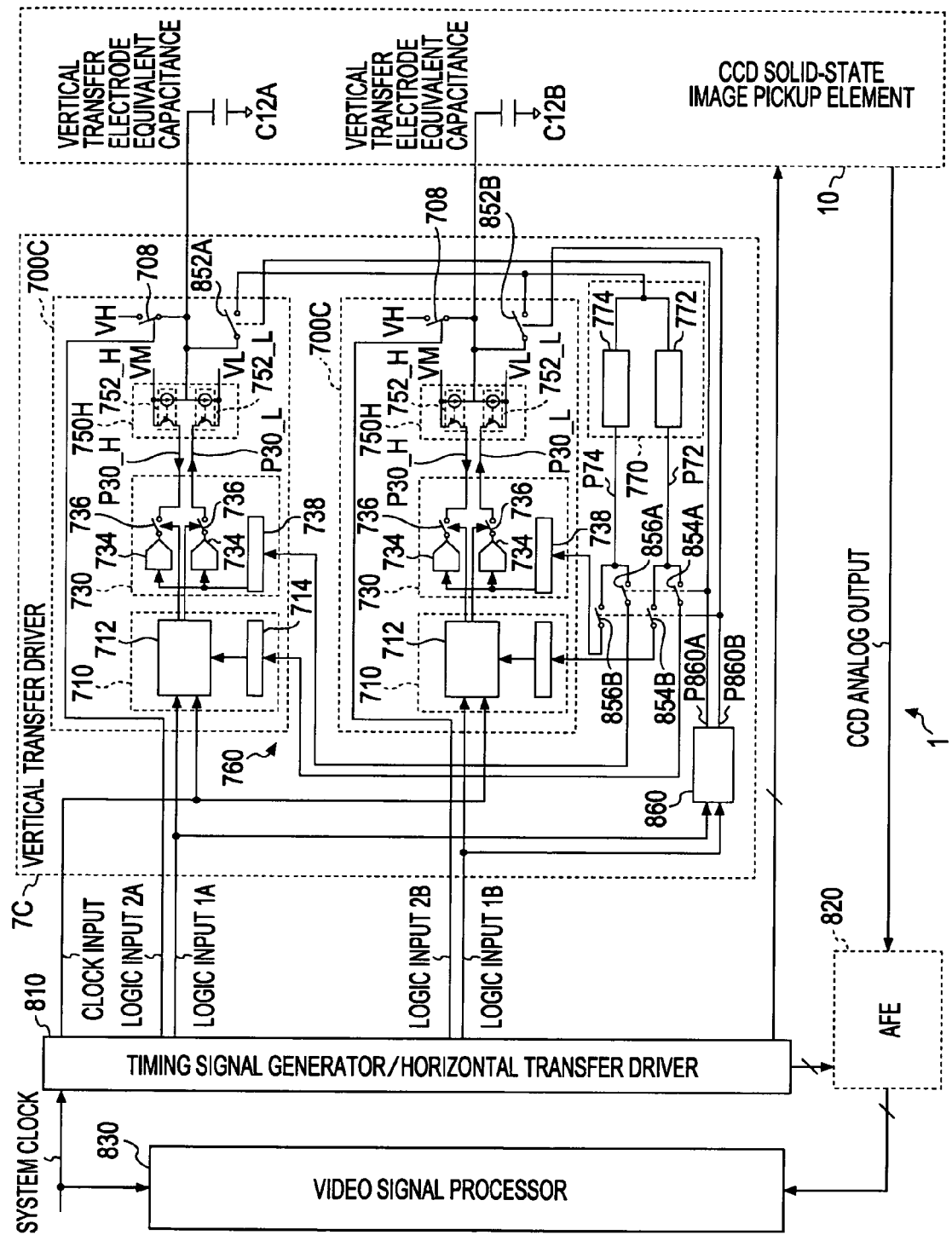
FIG. 38 illustrates a fourth configuration of the vertical driver implementing the pulse driver.
Figure 39A:
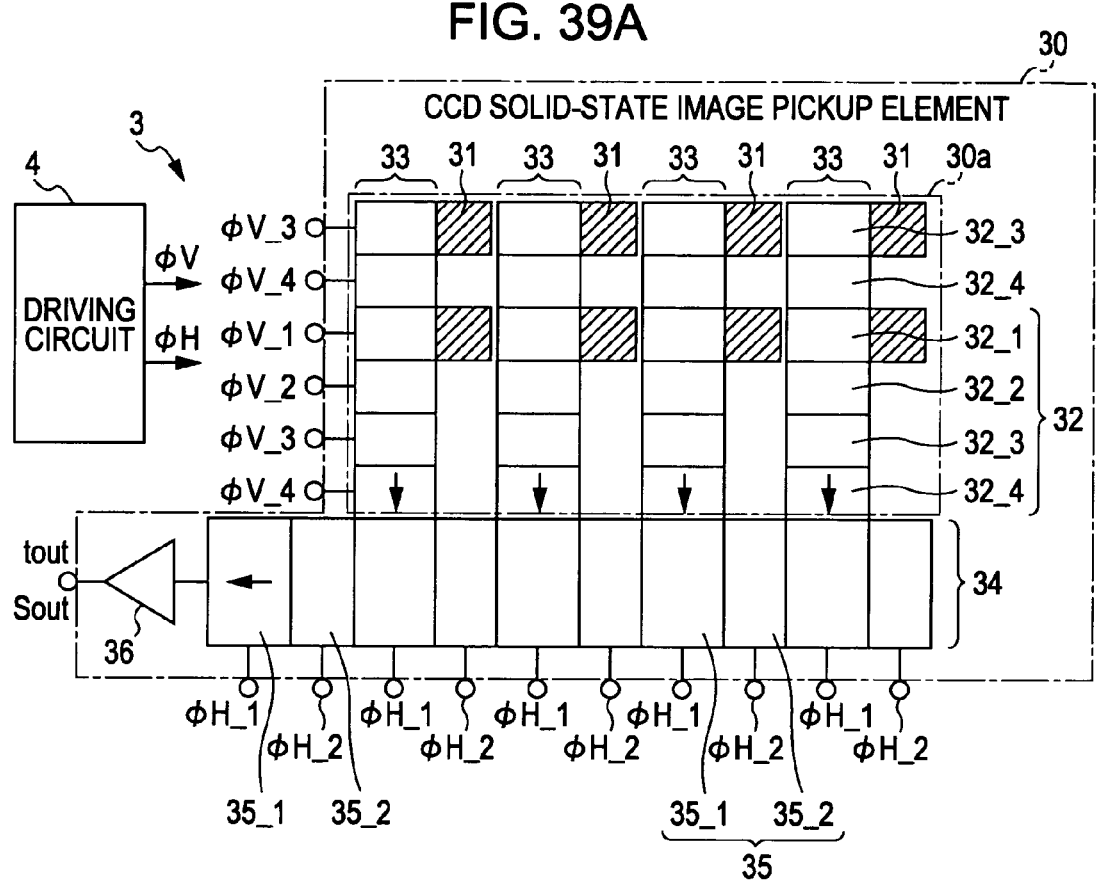
FIGS. 39A and 39B illustrate a mechanism of a known image pickup device.
Figure 39B:
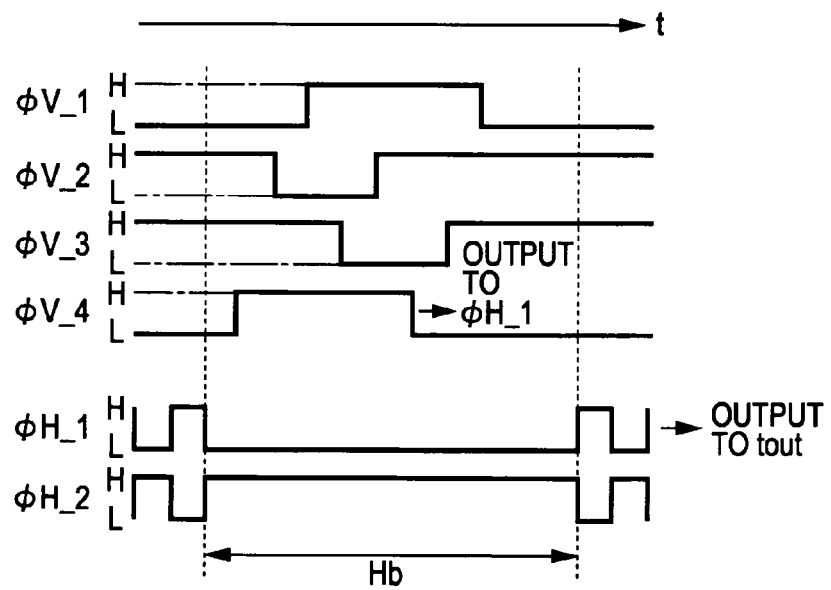

FIG. 38 illustrates a fourth configuration in which the above-referenced pulse driver 600 is applied to the vertical driver 50 driving the vertical transfer electrode 12 in the CCD solid-state image pickup element 10. Like the first configuration of FIG. 35, the fourth configuration employs the arrangement of FIG. 30 for the pulse driver 600. The fourth configuration also provides a second circuit sharing technique to a plurality of vertical transfer electrodes 12.

With the second circuit sharing technique, like the first circuit sharing technique, the drive pulse waveform shaping controller 770 monitors the delay amount of the output pulse Pout with reference to the input pulse Pin and the variation characteristic (through rate) of the output pulse to control the phase delay adjuster 710 and the through rate adjuster 730. The drive pulse waveform shaping controller 770 is shared by a plurality of vertical transfer electrodes 12 to reduce hardware. The second circuit sharing technique is different from the first circuit sharing technique in that regardless of whether the equivalent input capacitances C12 are the same, the drive pulse waveform shaping controller 770 is shared and used in a time-division manner.

In a vertical driver 700C in a vertical transfer driver 7C for embodying the second circuit sharing technique, the drive pulse waveform shaping controller 770 monitors, in a time-division manner, pulse output signals occurring at a plurality of vertical transfer electrodes 12. The drive pulse waveform shaping controller 770 controls the waveform shaping processor 760 corresponding to the respective vertical transfer electrodes 12 so that the pulse output signals of the vertical transfer electrodes 12 have predetermined transition characteristics.

To use the drive pulse waveform shaping controller 770 with the plurality of vertical transfer electrodes 12 in a time-division manner, a switch 852 for selectively inputting the output of the load driver 750 to the drive pulse waveform shaping controller 770 is arranged. The input of the switch 852 is connected to an output line extending between the load driver 750 and the terminal 704, and the output of the switch 852 is connected to the phase delay controller 772 and the through rate controller 774 in the drive pulse waveform shaping controller 770.

The drive pulse waveform shaping controller 770 further includes a switch 854 and a switch 856. The switch 854 selectively supplies the delay amount control signal P72 from the phase delay controller 772 to the delay clock count register 714 in the phase delay adjuster 710. The switch 856 selectively supplies the through rate control signal P74 from the through rate controller 774 to the DAC data register 738 in the through rate adjuster 730.

The vertical transfer driver 7C includes a selection signal generator 860 for generating selection signals P860A and P860B controlling the selection operation of the switches 852, 854, and 856. The selection signal generator 860 receives, from the timing signal generator 810, the logic input 1a (vertical transfer clock VA) for driving one vertical transfer electrode 12A and a logic input 1b (vertical transfer clock VB) for driving the other vertical transfer electrode 12B.

The selection signal generator 860 selects a channel to be controlled by the drive pulse waveform shaping controller 770 (as to which vertical transfer electrodes 12A and 12B to be waveform shaped) by activating one of the selection signals P860A and P860B in response to the logic inputs 1a and 1b.

More specifically, the selection signal generator 860 outputs the selection signals P860A and P860B to the switches 852, 854, and 856 to perform the selection process onto the vertical transfer electrodes 12. The selection signal P860A is input to control input terminals of the switches 852A, 854A, and 856A related to the one vertical transfer electrode 12A. The selection signal 860B is input to control input terminals of the switches 852B, 854B, and 856B related to the other vertical transfer electrode 12B.

The selection signal generator 860 references the logic input 1a (vertical transfer clock VA) and the logic input 1b (vertical transfer clock VB) supplied from the timing signal generator 810 and activates only the selection signal P860A when the drive pulse waveform shaping controller 770 adjusts the delay amount and the through rate for the vertical transfer electrode 12A in the feedback control. The switches 852A, 854A, and 856A are thus turned on. The selection signal generator 860 activates only the selection signal P860B when the drive pulse waveform shaping controller 770 adjusts the delay amount and the through rate for the vertical transfer electrode 12B in the feedback control. The switches 852B, 854B, and 856B are thus turned on.

In the configuration of the vertical transfer driver 7C for performing the second circuit sharing technique, the switches 852, 854, and 856 are arranged. The drive pulse waveform shaping controller 770 switches the channel to be controlled in a time-division manner. The drive pulse waveform shaping controller 770 thus monitors the delay amount of the output pulse Pout with respect to the input pulse Pin and the variation characteristic of the output pulse Pout (through rate) to control the phase delay adjuster 710 and the through rate adjuster 730. The drive pulse waveform shaping controller 770 is shared by a plurality of vertical transfer electrodes 12. Hardware is thus reduced.

It should be understood by those skilled in the art that various modifications, combinations, sub-combinations and alterations may occur depending on design requirements and other factors insofar as they are within the scope of the appended claims or the equivalents thereof.

What is claimed is:

1. A method of driving a semiconductor device for physical quantity distribution sensing, the semiconductor device including, in a semiconductor substrate, charge generating sections arranged in a matrix for generating signal charge responsive to an input electromagnetic wave, a first charge transfer section for successively transferring in one direction the signal charge generated by the charge generating section, a second charge transfer section for successively transferring the signal charge, transferred by the first charge transfer section, in another direction different from the one direction, an output section for converting the signal charge transferred by the second charge transfer section into an electrical signal, and a charge storage section arranged between the first charge transfer section and the second charge transfer section, the method comprising the steps of:

transferring the signal charge of a predetermined unit in the other direction generated by the charge generating section to the charge storage section by driving the signal charge in the one direction within an effective transfer period of the other direction, and transferring the signal charge of a predetermined unit in the other direction transferred to the charge storage section to the second charge transfer section by driving the signal charge outside the effective transfer period of the other direction; and supplying a predetermined location of the semiconductor substrate with a noise correction signal reverse in phase from noise on the semiconductor substrate by driving the signal charge within the effective transfer period of the other direction.

2. The method according to claim 1, wherein the semiconductor substrate in the first charge transfer section is supplied with the noise correction signal.

3. The method according to claim 1, wherein the output section is arranged on a second semiconductor substrate arranged on a first semiconductor substrate, and the second semiconductor substrate of the output section is supplied with the noise correction signal.

4. A method of driving a semiconductor device for physical quantity distribution sensing, the semiconductor device including, in a semiconductor substrate, charge generating sections arranged in a matrix for generating signal charge responsive to an input electromagnetic wave, a first charge transfer section for successively transferring in one direction the signal charge generated by the charge generating section, a second charge transfer section for successively transferring the signal charge, transferred by the first charge transfer section, in another direction different from the one direction, and a charge storage section arranged between the first charge transfer section and the second charge transfer section the method comprising the steps of:

supplying the semiconductor substrate with a driving signal via a noise control circuit; and transferring signal charge of a predetermined unit in the other direction generated by the charge generating section to the charge storage section by driving the signal charge in the one direction within an effective transfer period of the other direction, and transferring the signal charge of a predetermined unit in the other direction transferred to the charge storage section to the second charge transfer section by driving the signal charge outside the effective transfer period of the other direction.

5. A driving device for driving a semiconductor device for physical quantity distribution sensing, the semiconductor device including, in a semiconductor substrate, charge generating sections arranged in a matrix for generating signal charge responsive to an input electromagnetic wave, a first charge transfer section for successively transferring in one direction the signal charge generated by the charge generating section, a second charge transfer section for successively transferring the signal charge, transferred by the first charge transfer section, in another direction different from the one direction, a charge storage section arranged between the first charge transfer section and the second charge transfer section and an output section for converting the signal charge transferred from the second charge transfer section into an electrical signal, the driving device comprising:

a driver circuit for transferring, to the charge storage section, signal charge of a predetermined unit in the other direction generated by the charge generating section, by driving the signal charge in the one direction within an effective transfer period of the other direction, with the semiconductor device supplied with a driving signal, and transferring, to the second charge transfer section, the signal charge of a predetermined unit in the other direction transferred to the charge storage section by driving the signal charge outside the effective transfer period of the other direction; and a noise correction signal supply circuit for generating a noise correction signal reverse in phase from noise on the semiconductor by driving the signal charge within the effective transfer period of the other direction and for supplying a predetermined location of the semiconductor substrate with the noise correction signal.

6. An electronic apparatus comprising:

a semiconductor device for physical quantity distribution sensing, including, in a semiconductor substrate, charge generating sections arranged in a matrix for generating signal charge responsive to an input electromagnetic wave, a first charge transfer section for successively transferring in one direction the signal charge generated by the charge generating section, a second charge transfer section for successively transferring the signal charge, transferred by the first charge transfer section, in another direction different from the one direction, a charge storage section arranged between the first charge transfer section and the second charge transfer section and an output section for converting the signal charge transferred from the second charge transfer section into an electrical signal; and a driving device including a driver circuit and a noise correction signal supply circuit, the driver circuit transferring, to the charge storage section, signal charge of a predetermined unit in the other direction generated by the charge generating section, by driving the signal charge in the one direction within an effective transfer period of the other direction, with the semiconductor device supplied with a driving signal and transferring, to the second charge transfer section, the signal charge of a predetermined unit in the other direction transferred to the charge storage section by driving the signal charge outside the effective transfer period of the other direction, and the noise correction signal supply circuit generating a noise correction signal reverse in phase from noise on the semiconductor by driving signal charge within the effective transfer period of the other direction and for supplying a predetermined location of the semiconductor substrate with the noise correction signal.

* * * * *